US 12,514,912 B2

(12) United States Patent
Bézay et al.

(10) Patent No.: US 12,514,912 B2
(45) Date of Patent: Jan. 6, 2026

(54) COMPOSITIONS COMPRISING THREE OspA FUSION PROTEINS FOR MEDICAL USE

(71) Applicants: Valneva Austria GmbH, Vienna (AT); Pfizer Inc., New York, NY (US)

(72) Inventors: Nicole Bézay, Hinterbrühl (AT); Romana Hochreiter, Vienna (AT); Urban Lundberg, Pressbaum (AT); Steven Russell Bailey, Bryn Mawr, PA (US); Annaliesa Sybil Anderson, Upper Saddle River, NJ (US); Kathrin Ute Jansen, New York, NY (US); Daniel Alfred Scott, Spring City, PA (US)

(73) Assignees: Valneva Austria GmbH, Vienna (AT); Pfizer Inc., New York, NY (US)

( * ) Notice: Subject to any disclaimer, the term of this patent is extended or adjusted under 35 U.S.C. 154(b) by 555 days.

(21) Appl. No.: 17/917,624

(22) PCT Filed: Apr. 9, 2021

(86) PCT No.: PCT/US2021/026599
§ 371 (c)(1),
(2) Date: Oct. 7, 2022

(87) PCT Pub. No.: WO2021/207615
PCT Pub. Date: Oct. 14, 2021

(65) Prior Publication Data
US 2023/0173051 A1 Jun. 8, 2023

Related U.S. Application Data

(60) Provisional application No. 63/152,582, filed on Feb. 23, 2021.

(30) Foreign Application Priority Data

| Apr. 9, 2020 | (EP) | 20169147 |
| Apr. 9, 2020 | (EP) | 20169148 |
| Apr. 15, 2020 | (EP) | 20169642 |
| Jul. 22, 2020 | (EP) | 20187283 |
| Oct. 20, 2020 | (EP) | 20202816 |

(51) Int. Cl.
*A61K 39/02* (2006.01)
*A61P 37/04* (2006.01)
*A61K 39/00* (2006.01)

(52) U.S. Cl.
CPC .......... *A61K 39/0225* (2013.01); *A61P 37/04* (2018.01); *A61K 2039/545* (2013.01); *A61K 2039/55505* (2013.01)

(58) Field of Classification Search
None
See application file for complete search history.

(56) References Cited

U.S. PATENT DOCUMENTS

| 6,248,562 | B1 | 6/2001 | Dunn et al. |
| 7,008,625 | B2 | 3/2006 | Dattwyler et al. |
| 8,466,259 | B2 | 6/2013 | Liu et al. |
| 8,986,704 | B2 | 3/2015 | Comstedt et al. |
| 9,926,343 | B2 | 3/2018 | Comstedt et al. |
| 9,975,927 | B2 | 5/2018 | Lundberg et al. |
| 10,406,221 | B2 | 9/2019 | Leng et al. |
| 10,544,194 | B2 | 1/2020 | Comstedt et al. |
| 10,766,931 | B2 | 9/2020 | Lundberg et al. |
| 10,787,501 | B1 | 9/2020 | Babb et al. |
| 11,208,439 | B2 | 12/2021 | Comstedt et al. |
| 11,466,058 | B2 | 10/2022 | Comstedt et al. |
| 11,572,392 | B2 | 2/2023 | Lundberg et al. |
| 12,018,054 | B2 | 6/2024 | Lundberg et al. |
| 12,195,501 | B2 | 1/2025 | Comstedt et al. |
| 2004/0023325 | A1 | 2/2004 | Luft et al. |
| 2009/0176273 | A1 | 7/2009 | Leng et al. |
| 2011/0053244 | A1 | 3/2011 | Oyler et al. |
| 2011/0293652 | A1 | 12/2011 | Crowe et al. |
| 2014/0010835 | A1 | 1/2014 | Comstedt et al. |
| 2015/0232517 | A1 | 8/2015 | Comstedt et al. |
| 2015/0250865 | A1 | 9/2015 | Comstedt et al. |
| 2016/0045591 | A1 | 2/2016 | Campos-Neto et al. |
| 2016/0333056 | A1 | 11/2016 | Lundberg et al. |
| 2017/0101446 | A1 | 4/2017 | Comstedt et al. |

(Continued)

FOREIGN PATENT DOCUMENTS

| CN | 103118701 A | 5/2013 |
| EP | 2753352 B1 | 1/2017 |

(Continued)

OTHER PUBLICATIONS

[No Author Listed] Clinical Trials Identifier: NCT03010228. Study assessing the safety, immunogenicity and dose response of VLA15, a new vaccine candidate against Lyme borreliosis. Jan. 4, 2017. retrieved Mar. 2, 20186 from https://clinicaltrials.gov/ct2/show/study/NCT03010228.

(Continued)

*Primary Examiner* — Jennifer E Graser
(74) *Attorney, Agent, or Firm* — Wolf, Greenfield & Sacks, P.C.

(57) ABSTRACT

The present invention relates to a composition comprising the OspA fusion protein of SEQ ID NO: 1 (LipS1D1-S2D1), the OspA fusion protein of SEQ ID NO: 2 (Lip-S4D1-SShybD1) and the OspA fusion protein of SEQ ID NO: 3 (Lip-S5D1-S6D1) for use in a vaccine or for use in a method for eliciting an immune response in a human against Lyme disease.

24 Claims, 35 Drawing Sheets

Specification includes a Sequence Listing.

(56) References Cited

U.S. PATENT DOCUMENTS

| | | | |
|---|---|---|---|
| 2017/0107263 | A1 | 4/2017 | Comstedt et al. |
| 2017/0239340 | A1 | 8/2017 | Ellingsworth et al. |
| 2018/0327460 | A1 | 11/2018 | Comstedt et al. |
| 2018/0362593 | A1 | 12/2018 | Lundberg et al. |
| 2020/0239525 | A1 | 7/2020 | Comstedt et al. |
| 2021/0054032 | A1 | 2/2021 | Lundberg et al. |
| 2022/0185851 | A1 | 6/2022 | Comstedt et al. |
| 2023/0151063 | A1 | 5/2023 | Lundberg et al. |
| 2023/0295245 | A1 | 9/2023 | Comstedt et al. |
| 2023/0322869 | A1 | 10/2023 | Lundberg et al. |
| 2023/0398210 | A1 | 12/2023 | Schlegl et al. |
| 2024/0026412 | A1 | 1/2024 | Schlegl et al. |

FOREIGN PATENT DOCUMENTS

| | | |
|---|---|---|
| EP | 2869839 B1 | 9/2018 |
| JP | 4810428 B2 | 11/2011 |
| JP | 2019-070007 A | 5/2019 |
| KR | 10-2013-0062954 A | 6/2013 |
| RU | 2017138652 A | 2/2019 |
| WO | WO 2002/016421 A2 | 2/2002 |
| WO | WO 2008/031133 A2 | 3/2008 |
| WO | WO 2011/143617 A1 | 11/2011 |
| WO | WO 2011/143623 A1 | 11/2011 |
| WO | WO 2012/028741 A1 | 3/2012 |
| WO | WO 2012/066420 A1 | 5/2012 |
| WO | WO 2012/066423 A1 | 5/2012 |
| WO | WO 2013/083726 A1 | 6/2013 |
| WO | WO 2013/083729 A2 | 6/2013 |
| WO | WO 2014/006226 A1 | 1/2014 |
| WO | WO 2015/104396 A1 | 7/2015 |
| WO | WO 2015/169271 A1 | 11/2015 |
| WO | WO 2018/189372 A1 | 10/2018 |
| WO | WO 2019/092002 A1 | 5/2019 |
| WO | WO 2020/234300 A1 | 11/2020 |
| WO | WO 2021/205017 A1 | 10/2021 |
| WO | WO 2021/205022 A1 | 10/2021 |

OTHER PUBLICATIONS

[No Author Listed] ECDC; Meeting Report: Second expert consultation on tick-borne diseases with emphasis on Lyme borreliosis and tick-borne encephalitis, Stockholm, Sweden, Nov. 22-23, 2011.
[No Author Listed] pET System Manual. May 2003. Novagen.
[No Author Listed] Valneva Completes Recruitment for Phase 2 Studies of its Lyme Disease Vaccine Candidate VLA15. Valneva SE. Sep. 30, 2019. 3 pages.
[No Author Listed] Valneva report positive phase I interim results for its Lyme vaccine candidate VLA15. Valneva. Mar. 19, 2018.
[No Author Listed], Analysis of Fatty Acids in Infant Formulas Using an Agilent J&W HP-88 Capillary GC Column. Agilent Technologies. Jun. 17, 2011. 8 pages.
[No Author Listed], CDC provides estimate of Americans diagnosed with Lyme disease each year. CDC Press Release. Accessible at www.cdc.gov/media. 2 pages.
[No Author Listed], Lyme Borreliosis in Europe. WHO Europe. 2020. 1 page.
[No Author Listed], Lyme Disease Charts and Figures: Historical Data. Accessible at www.cdc.gov/lyme/stats/graphs.html. Retrieved on May 4, 2020. 1 page.
[No Author Listed], Press release: Valneva Reports Positive Initial Booster Data and Final Phase 1 Data for its Lyme Disease Vaccine Candidate. Jan. 31, 2019.
[No Author Listed], Report 9: Impact of non-pharmaceutical interventions (NPIs) to reduce COVID-19 mortality and healthcare demand. Imperial College COVID-19 Response Team. Mar. 16, 2020. 20 pages.
[No Author Listed], Valneva and Pfizer Report Further Positive Phase 2 Results, Including Booster Response, for Lyme Disease Vaccine Candidate. Valneva SE and Pfizer Press Release. 2021. 1 page.

Altschul et al., Gapped BLAST and PSI-BLAST: a new generation of protein database search programs. Nucleic Acids Res. Sep. 1, 1997;25(17):3389-402. doi: 10.1093/nar/25.17.3389.
Altschul, et al. Basic Local Alignment Search Tool (1990) J. Mol. Biol. 215:403-410.
Andrews et al., Bacterial iron homeostasis. FEMS Microbiol Rev. Jun. 2003;27(2-3):215-37. doi: 10.1016/S0168-6445(03)00055-X.
Baker et al., Electrostatics of nanosystems: application to microtubules and the ribosome. Proc Natl Acad Sci U S A. Aug. 28, 2001;98(18):10037-41.
Barroso et al., Nucleotide sequence of Clostridium difficile toxin B gene. Nucleic Acids Res. Jul. 11, 1990;18(13):4004. doi: 10.1093/nar/18.13.4004.
Bessler et al. Synthetic lipopeptides as novel adjuvants. Res Immunol. Jun. 1992;143(5):548-53; discussion 579-80.
Betz, Disulfide bonds and the stability of globular proteins. Protein Sci. Oct. 1993;2(10):1551-8.
Bockenstedt et al., Identification of a Borrelia burgdorferi OspA T cell epitope that promotes anti-OspA IgG in mice. J Immunol. Dec. 15, 1996;157(12):5496-502.
Bockenstedt et al., Inability of truncated recombinant Osp A proteins to elicit protective immunity to Borrelia burgdorferi in mice. J Immunol. Jul. 15, 1993;151(2):900-6.
Bouchon et al., Analysis of the lipidated recombinant outer surface protein A from Borrelia burgdorferi by mass spectrometry. Anal Biochem. Mar. 1, 1997;246(1):52-61.
Bunikis et al. A Surface-Exposed Region of a Novel Outer Membrane Protein (P66) of *Borrelia* spp. is Variable in Size and Sequence (1998) Journal of Bacteriology 180(7):1618-1623.
Caruthers et al., New chemical methods for synthesizing polynucleotides. Nucleic Acids Symp Ser. 1980;(7):215-23.
Chakrabarti et al., Dissecting Protein-Protein Recognition Sites; PROTEINS: Structure, Function, and Genetics 47:334-343 (2002).
Compton et al., Introduction of a Disulfide Bond Leads to Stabilization and Crystallization of a Ricin Immunogen (2011) Proteins 79(4):1048-1060. doi:10.1002/prot.22933.
Comstedt et al. Characterization and optimization of a novel vaccine for protection against Lyme borreliosis (2015) Vaccine 33:5982-5988.
Comstedt et al., Design and development of a novel vaccine for protection against Lyme borreliosis. PLoS One. Nov. 19, 2014;9(11):e113294. doi: 10.1371/journal.pone.0113294.
Comstedt et al., Efficacy testing of a novel OspA based Lyme borreliosis vaccine. Gordon Research Conference: "Biology of Spirochetes", Ventura, California. Jan. 19-24, 2014. Abstract.
Comstedt et al., Investigation of a vaccine targeting Lyme borreliosis in Europe. Gordon Research Conference: "Biology of Spirochetes". Ventura, California. Jan. 19-24, 2014. Abstract.
Comstedt et al., The novel Lyme borreliosis vaccine VLA15 shows broad protection against *Borrelia* species expressing six different OspA serotypes. PLoS One. Sep. 1, 2017;12(9):e0184357. doi: 10.1371/journal.pone.0184357. eCollection 2017.
Corpet, Multiple sequence alignment with hierarchical clustering. Nucleic Acids Res. Nov. 25, 1988;16(22):10881-90. doi: 10.1093/nar/16.22.10881.
Creighton et al., Mechanisms and catalysts of disulfide bond formation in proteins. Trends Biotechnol. Jan. 1995;13(1):18-23.
Crowe, A Lyme borreliosis vaccine for Europe and beyond. Climate change impact on ticks and tick-borne diseases. Brussels. Feb. 6, 2009.
Cutler, et al. Emerging borreliae—Expanding beyond Lyme borreliosis (2017) Molecular and Cellular robes 31:22e27.
Davies et al., Interactions of protein antigens with antibodies (1996) Proc. Natl. Acad. Sci. USA 93:7-12.
De Silva, et al. Borrelia burgdorferi OspA Is an Arthropod-specific Transmission-blocking Lyme Disease Vaccine (1996) J. Exp. Med. 183:271-275.
Devereux, et al. A comprehensive set of sequence analysis programs for the VAX (1984) Nucleic Acids Research 12(1):387-395.
Ding et al., Structural identification of a key protective B-cell epitope in Lyme disease antigen OspA. J Mol Biol. Oct. 6, 2000;302(5):1153-64.

(56) References Cited

OTHER PUBLICATIONS

Dolinsky et al., PDB2PQR: expanding and upgrading automated preparation of biomolecular structures for molecular simulations. Nucleic Acids Res. Jul. 2007;35(Web Server issue):W522-5.

Dove et al., Molecular characterization of the Clostridium difficile toxin A gene. Infect Immun. Feb. 1990;58(2):480-8. doi: 10.1128/iai.58.2.480-488.1990.

Dykhuizen et al., Borrelia burgdorferi is clonal: Implications for taxonomy and vaccine development. Proc. Natl. Acad. Sci. 1993;90:10163-7.

Edelman et al., Degeneracy and complexity in biological systems. Proc Natl Acad Sci U S A. Nov. 20, 2001;98(24):13763-8. doi: 10.1073/pnas.231499798. Epub Nov. 6, 2001.

Egan et al., Relationship between tightness of binding and immunogenicity in an aluminum- containing adjuvant-adsorbed hepatitis B vaccine. Vaccine. May 21, 2009;27(24):3175-80. doi: 10.1016/j.vaccine.2009.03.054. Epub Apr. 7, 2009.

Embers et al., Vaccination against Lyme disease: past, present, and future. Frontiers in Cellular and Infection Microbiology 2013;3(6). www.frontiersin.org. doi:10.3389/fcimb.2013.00006.

Erdile et al., Role of attached lipid in immunogenicity of Borrelia burgdorferi OspA. Infect Immun. Jan. 1993;61(1):81-90.

Fass, Disulfide bonding in protein biophysics. Annu Rev Biophys. 2012;41:63-79. doi: 10.1146/annurev-biophys-050511-102321. Epub Dec. 20, 2011.

Feng et al., Progressive sequence alignment as a prerequisite to correct phylogenetic trees. J Mol Evol. 1987;25(4):351-60. doi: 10.1007/BF02603120.

Fingerle, et al. Epidemiological aspects and molecular characterization of Borrelia burgdorferi s.l. from southern Germany with special respect to the new species *Borrelia spielmanii* sp. nov. International Journal of Medical Microbiology 2008;298:279-290. doi:10.1016/j.ijmm.2007.05.002.

Friguet et al. Measurements of the true affinity constant in solution of antigen-antibody complexes by enzyme-linked immunosorbent assay. J Immunol Methods. Mar. 18, 1985;77(2):305-19.

Gern et al., Immunization with a polyvalent OspA vaccine protects mice against Ixodes ricinus tick bites infected by *Borrelia burgdorferi* ss, *Borrelia garinii* and *Borrelia afzelii*. Vaccine. Oct. 1997;15(14):1551-7.

Golde et al., Reactivity with a specific epitope of outer surface protein A predicts protection from infection with the Lyme disease spirochete, Borrelia burgdorferi. Infect Immun. Mar. 1997;65(3):882-9.

Greenspan et al., Defining epitopes: It's not as easy as it seems. Nat Biotechnol. Oct. 1999;17(10):936-7.

Gross et al., Identification of LFA-1 as a candidate autoantigen in treatment-resistant Lyme arthritis. Science. Jul. 31, 1998;281(5377):703-6. doi: 10.1126/science.281.5377.703.

Grygorcauk et al., Assessment of the frequency of different Borrelia burgdorferi sensu lato species in patients with Lyme borreliosis from north-east Poland by studying preferential serologic response and DNA isolates. Annals of Agricultural and Environmental Medicine. 2013;20(1):21-29.

Hansen et al., Effect of the strength of adsorption of hepatitis B surface antigen to aluminum hydroxide adjuvant on the immune response. Vaccine. Feb. 5, 2009;27(6):888-92. doi: 10.1016/j.vaccine.2008.11.078. Epub Dec. 9, 2008.

Hansen et al., Relationship between the strength of antigen adsorption to an aluminum-containing adjuvant and the immune response. Vaccine. Sep. 4, 2007;25(36):6618-24. doi: 10.1016/j.vaccine.2007.06.049. Epub Jul. 16, 2007.

Henikoff et al., Amino acid substitution matrices from protein blocks. Proc Natl Acad Sci U S A. Nov. 15, 1992;89(22):10915-9. doi: 10.1073/pnas.89.22.10915.

Hertadi et al., Unfolding mechanics of multiple OspA substructures investigated with single molecule force spectroscopy. J Mol Biol. Nov. 7, 2003;333(5):993-1002.

Higgins et al., CLUSTAL: a package for performing multiple sequence alignment on a microcomputer. Gene. Dec. 15, 1988;73(1):237-44. doi: 10.1016/0378-1119(88)90330-7.

Higgins et al., Fast and sensitive multiple sequence alignments on a microcomputer. Comput Appl Biosci. Apr. 1989;5(2):151-3. doi: 10.1093/bioinformatics/5.2.151.

Hinckley, et al. Lyme Disease Testing by Large Commercial Laboratories in the United States. Clin Infect Dis. 2014;59(5):676-681. doi:10.1093/cid/ciu397.

Ho et al., Crystal structure of receptor-binding C-terminal repeats from Clostridium difficile toxin A. Proc Natl Acad Sci U S A. Dec. 20, 2005;102(51):18373-8. doi: 10.1073/pnas.0506391102. Epub Dec. 12, 2005.

Horn et al., Synthesis of oligonucleotides on cellulose. Part II: Design and synthetic strategy to the synthesis of 22 oligodeoxynucleotides coding for gastric inhibitory polypeptide (GIP). Nucleic Acids Symp Ser. 1980;(7):225-32.

Huang et al., Parallelization of a local similarity algorithm. Comput Appl Biosci. Apr. 1992;8(2):155-65. doi: 10.1093/bioinformatics/8.2.155.

Iyer et al., Stage-specific global alterations in the transcriptomes of Lyme disease spirochetes during tick feeding and following mammalian host adaptation. Molecular Microbiology. 2015;95(3):509-538. doi:10.1111/mmi.12882. Epub Dec. 30, 2014.

Jiang et al., Purification of Borrelia burgdorferi Outer Surface Protein A (OspA) and Analysis of Antibody Binding Domains Clinical and Diagnostic Laboratory Immunology. 1994;1(4):406-412.

Kiefer et al., The SWISS-MODEL Repository and associated resources. Nucleic Acids Res. Jan. 2009;37(Database issue):D387-92. doi: 10.1093/nar/gkn750.

Koide et al., Multistep denaturation of Borrelia burgdorferi OspA, a protein containing a single-layer beta-sheet. Biochemistry. Apr. 13, 1999;38(15):4757-67.

Koide et al., Structure-based design of a second-generation Lyme disease vaccine based on a C-terminal fragment of Borrelia burgdorferi OspA. J Mol Biol. Jul. 8, 2005;350(2):290-9.

Lathrop et al., Adverse event reports following vaccination for Lyme disease: Dec. 1998-Jul. 2000. Vaccine. Feb. 22, 2002;20(11-12):1603-8. doi: 10.1016/s0264-410x(01)00500-x.

Legros et al., Characterization of an anti-Borrelia burgdorferi OspA conformational epitope by limited proteolysis of monoclonal antibody-bound antigen and mass spectrometric peptide mapping. Protein Science 2000;9:1002-1010.

Li et al., Crystal structure of Lyme disease antigen outer surface protein A complexed with an Fab. Proc Natl Acad Sci U S A. Apr. 15, 1997;94(8):3584-9.

Liang et al., An immunodominant conserved region within the variable domain of VlsE, the variable surface antigen of Borrelia burgdorferi. J Immunol. Nov. 15, 1999;163(10):5566-73.

Lindgren et al., Lyme borreliosis in Europe: influences of climate and climate change, epidemiology, ecology and adaptation measures. World Health Organization. 2006. 34 pages.

Lingelbach, Developing a vaccine against Lyme disease Progress update post Phase 1 interim results. World Vaccine Congress. Apr. 4, 2018. Valneva.

Lingellbach, World Vaccine Congress presentation, Apr. 16, 2019 entitled: "Developing a vaccine against Lyme disease; Phase 1 results and next steps".

Livey et al., A new approach to a Lyme disease vaccine. Clin Infect Dis. Feb. 2011;52 Suppl 3:S266-70. doi: 10.1093/cid/ciq118.

Livey et al., Development of a novel Lyme disease vaccine. The International Conference on Lyme Borreliosis and other Tick Borne Diseases. 2010. Poster.

Lo Conte et al., The Atomic Structure of Protein-Protein Recognition Sites. J. Mol. Biol. 1999;285:2177-2198.

Makabe et al., Atomic-resolution crystal structure of Borrelia burgdorferi outer surface protein A via surface engineering. Protein Sci. Aug. 2006;15(8):1907-14. Epub Jul. 5, 2006.

Marshall et al., Safety and immunogenicity of a meningococcal B bivalent rLP2086 vaccine in healthy toddlers aged 18-36 months: a; phase 1 randomized-controlled clinical trial. Pediatr Infect Dis J. 2012; Oct. 31(10):1061-8.

(56) References Cited

OTHER PUBLICATIONS

Mead, Epidemiology of Lyme disease. Infect Dis Clin North Am. Jun. 2015;29(2):187-210. doi: 10.1016/j.idc.2015.02.010.

Melero et al., The Pneumovirinae fusion (F) protein: a common target for vaccines and antivirals. Virus Res. Nov. 2, 2015;209:128-35. doi: 10.1016/j.virusres.2015.02.024. Epub Mar. 1, 2015.

Montgomery et al., Direct Demonstration of Antigenic Substitution of Borrelia burgdorferi Ex Vivo: Exploration of the Paradox of the Early Immune Response to Outer Surface Proteins A and C in Lyme Disease. J. Exp. Med. 1996;183:261-269.

Nadolski et al., Protein lipidation. FEBS J. Oct. 2007;274(20):5202-10. doi: 10.1111/j.1742-4658.2007.06056.x. Epub Sep. 24, 2007.

Nakagawa et al., Calorimetric dissection of thermal unfolding of OspA, a predominantly beta-sheet protein containing a single-layer beta-sheet. J Mol Biol. Nov. 1, 2002;323(4):751-62.

Nayak et al., Broadly Protective Multivalent OspA Vaccine against Lyme Borreliosis, Developed Based on Surface Shaping of the C-Terminal Fragment. Infect Immun. Mar. 23, 2020;88(4):e00917-19. doi: 10.1128/IAI.00917-19.

Needleman et al., A general method applicable to the search for similarities in the amino acid sequence of two proteins. J Mol Biol. Mar. 1970;48(3):443-53. doi: 10.1016/0022-2836(70)90057-4.

Nelson et al., Incidence of Clinician-Diagnosed Lyme Disease, United States, 2005-2010. Emerging Infectious Diseases 2015;21(9):1625-1631. DOI: http://dx.doi.org/10.3201/eid2109.150417.

Nissen et al., A randomized, controlled, phase ½ trial of a Neisseria meningitidis serogroup B bivalent rLP2086 vaccine in healthy children and adolescents. Pediatr Infect Dis J. Apr. 2013;32(4):364-71. doi: 10.1097/INF.0b013e31827b0d24.

Noe et al., Mechanism of immunopotentiation by aluminum-containing adjuvants elucidated by the relationship between antigen retention at the inoculation site and the immune response. Vaccine. Apr. 30, 2010;28(20):3588-94. doi: 10.1016/j.vaccine.2010.02.085. Epub Mar. 5, 2010.

O'Fallon et al., A direct method for fatty acid methyl ester synthesis: application to wet meat tissues, oils, and feedstuffs. J Anim Sci. Jun. 2007;85(6):1511-21. doi: 10.2527/jas.2006-491. Epub Feb. 12, 2007.

Ornstein et al., Characterization of Lyme Borreliosis Isolates from Patients with Erythema Migrans and Neuroborreliosis in Southern Sweden. J. Clin. Microbiol 2001;39(4):1294-1298. DOI: 10.1128/JCM.39.4.1294-1298.

Ornstein et al., Differential Immune Response to the Variable Surface Loop Antigen of P66 of Borrelia burgdorferi Sensu Lato Species in Geographically Diverse Populations of Lyme Borreliosis Patients. Clin. Diagnost. Lab. Immunol. 2002;9(6):1382-1384. DOI: 10.1128/CDLI.9.6.1382-1384.2002.

Pal et al., Attachment of Borrelia burgdorferi within Ixodes scapularis mediated by outer surface protein A. J. Clin. Invest. 2000;106:561-569.

Pantoliano et al., High-density miniaturized thermal shift assays as a general strategy for drug discovery. J Biomol Screen. Dec. 2001;6(6):429-40.

Parmley, Uptick for Lyme vaccine. Biocentury innovations. Jan. 2015;15-16.

Pawley et al., Backbone dynamics and thermodynamics of Borrelia outer surface protein A. J Mol Biol. Dec. 13, 2002;324(5):991-1002.

Pearson et al., Improved tools for biological sequence comparison. Proc Natl Acad Sci U S A. Apr. 1988;85(8):2444-8. doi: 10.1073/pnas.85.8.2444.

Pearson, Using the FASTA program to search protein and DNA sequence databases. Methods Mol Biol. 1994;25:365-89. doi: 10.1385/0-89603-276-0:365.

Pham et al., NMR studies of Borrelia burgdorferi OspA, a 28 kDa protein containing a single-layer beta-sheet. J Biomol NMR. May 1998;11(4):407-14.

Piesman et al., Lyme borreliosis in Europe and North America. Parasitology 2004;129, S191-S220. doi: 10.1017/S0031182003004694.

Poland, Vaccines against Lyme Disease: What Happened and What Lessons Can We Learn? Clinical Infectious Diseases 2011;52(S3):S253-S258. doi: 10.1093/cid/ciq116.

Pritt et al., Identification of a novel pathogenic Borrelia species causing Lyme borreliosis with unusually high spirochaetaemia: a descriptive study. Lancet Infect Dis. May 2016;16(5):556-564. doi: 10.1016/S1473-3099(15)00464-8. Epub Feb. 6, 2016. Erratum in: Lancet Infect Dis. Jun. 2016;16(6):636.

Pronk et al., GROMACS 4.5: a high-throughput and highly parallel open source molecular simulation toolkit. Bioinformatics. Apr. 1, 2013;29(7):845-54. doi: 10.1093/bioinformatics/btt055.

Radolf et al., Of ticks, mice and men: understanding the dual-host lifestyle of Lyme disease spirochaetes. Nat Rev Microbiol. 2012;10(2):87-99. doi: 10.1038/nrmicro2714.

Richmond et al., A bivalent Neisseria meningitidis recombinant lipidated factor H binding protein vaccine in young adults: results of a randomised, controlled, dose-escalation phase 1 trial. Vaccine. Sep. 21, 2012;30(43):6163-74. doi: 10.1016/j.vaccine.2012.07.065. Epub Aug. 5, 2012.

Richmond et al., Safety, immunogenicity, and tolerability of meningococcal serogroup B bivalent recombinant lipoprotein 2086 vaccine in healthy adolescents: a randomised, single-blind, placebo-controlled, phase 2 trial. Lancet Infect Dis. Aug. 2012;12(8):597-607. Epub May 7, 2012.

Rizzoli et al., Lyme borreliosis in Europe. Euro Surveill. 2011;16(27):pii=19906. Available online: http://www.eurosurveillance.org/ViewArticle.aspx?ArticleId=19906.

Roberge et al., A strategy for a convergent synthesis of N-linked glycopeptides on a solid support. Science. Jul. 14, 1995;269(5221):202-4.

Routledge, Beyond de-foaming: the effects of antifoams on bioprocess productivity. Comp and Struct Biotechnol J. Oct. 2012;3(4):e201210014. doi: 10.5936/csbj.201210014. 7 pages.

Scarselli et al., Rational Design of a Meningococcal Antigen Inducing Broad Protective Immunity. www.ScienceTranslationalMedicine.org. 2011;3(91):91ra62.

Schaible et al., Monoclonal antibodies specific for the outer surface protein A (OspA) of Borrelia burgdorferi prevent Lyme borreliosis in severe combined immunodeficiency (scid) mice. Proc. Natl. Acad. Sci. USA 1990;87:3768-3772.

Schildgen et al., Human Metapneumovirus: lessons learned over the first decade. Clin Microbiol Rev. Oct. 2011;24(4):734-54. doi: 10.1128/CMR.00015-11.

Schlegl et al., Influence of elemental impurities in aluminum hydroxide adjuvant on the stability of inactivated Japanese Encephalitis vaccine, IXIARO®. Vaccine. Nov. 4, 2015;33(44):5989-96. doi: 10.1016/j.vaccine.2015.05.103. Epub Jun. 19, 2015.

Schubach et al., Mapping Antibody-Binding Domains of the Major Outer Surface Membrane Protein (OspA) of Borrelia burgdorferi. Infect. And Immun. 1991;59(6):1911-1915.

Schuijt et al., Lyme borreliosis vaccination: the facts, the challenge, the future. Trends in Parasitology 2011;27(1):40-47. doi:10.1016/j.pt.2010.06.006.

Schwan et al., Temporal Changes in Outer Surface Proteins A and C of the Lyme Disease-Associated Spirochete, Borrelia burgdorferi, during the Chain of Infection in Ticks and Mice. J Clin Microbiol. Jan. 2000; 38(1):382-8.

Schwendinger et al., Evaluation of OspA vaccination-induced serological correlates of protection against Lyme borreliosis in a mouse model. PLoS One. Nov. 18, 2013;8(11):e79022. doi: 10.1371/journal.pone.0079022.

Sears et al., Molecular Mapping of Osp-A Mediated Immunity Against Borrelia burgdorferi, The Agent of Lyme Disease. J of Immunol 1991;147(6):1995-2000.

Sigal et al., A vaccine consisting of recombinant Borrelia burgdorferi outer surface protein A to prevent lyme disease. N Engl J Med 1998;339:216-22.

Smith et al., Comparison of Biosequences. Adv Appl Math. 1981;2:482-9.

Stanek et al., Lyme borreliosis. Lancet. 2012;379:461-73 doi:10.1016/S0140-6736(11)60103-7. EPub Sep. 7, 2011.

(56) References Cited

OTHER PUBLICATIONS

Steere et al., Vaccination against Lyme disease with recombinant Borrelia burgdorferi outer-surface lipoprotein A with adjuvant. Lyme Disease Vaccine Study Group. N Engl J Med. Jul. 23, 1998;339(4):209-15.

Stupica et al., Correlation of Culture Positivity, PCR Positivity, and Burden of Borrelia burgdorferi Sensu Lato in Skin Samples of Erythema Migrans Patients with Clinical Findings. PLoS One 2015;10(9): e0136600. doi:10.1371/journal.pone.0136600.

Todar, Todar's Online Textbook of Bacteriology; Nutrition and Growth of Bacteria. Accessible at texbookofbacteriology.net/nutgro.html. Retrieved on Mar. 11, 2021. 2 pages.

Ulbrandt et al., Conformational Nature of the Borrelia burgdorferi Decorin Binding Protein A Epitopes That Elicit Protective Antibodies. Infection and Immunity 2001;69(8)4799-4807. doi: 10.1128/IAI.69.8.4799-4807.2001.

Van Den Hoogen et al., Analysis of the genomic sequence of a human metapneumovirus. Virology. Mar. 30, 2002;295(1):119-32. doi: 10.1006/viro.2001.1355.

Van Den Hoogen et al., Antigenic and genetic variability of human metapneumoviruses. Emerg Infect Dis. Apr. 2004;10(4):658-66. doi: 10.3201/eid1004.030393.

Van Hoecke et al., Evaluation of the safety, reactogenicity and immunogenicity of three recombinant outer surface protein (OspA) lyme vaccines in healthy adults. Vaccine. Dec. 1996;14(17-18):1620-6.

Von Eichel-Streiber et al., Clostridium difficile toxin A carries a C-terminal repetitive structure homologous to the carbohydrate binding region of streptococcal glycosyltransferases. Gene. Nov. 30, 1990;96(1):107-13. doi: 10.1016/0378-1119(90)90348-u.

Voth et al., Clostridium difficile toxins: mechanism of action and role in disease. Clin Microbiol Rev. Apr. 2005;18(2):247-63. doi: 10.1128/CMR.18.2.247-263.2005.

Wilske et al., An OspA serotyping system for Borrelia burgdorferi based on reactivity with monoclonal antibodies and OspA sequence analysis. J Clin Microbiol. Feb. 1993;31(2):340-50.

Wormser et al., The clinical assessment, treatment, and prevention of lyme disease, human granulocytic anaplasmosis, and babesiosis: clinical practice guidelines by the Infectious Diseases Society of America. Clin Infect Dis. Nov. 1, 2006;43(9):1089-134. doi: 10.1086/508667. Epub Oct. 2, 2006. Erratum in: Clin Infect Dis. Oct. 1, 2007;45(7):941.

Wressnigg et al., A Novel multivalent OspA vaccine against Lyme borreliosis is safe and immunogenic in an adult population previously infected with Borrelia burgdorferi sensu lato. Clin Vaccine Immunol. Nov. 2014;21(11):1490-9. doi: 10.1128/CVI.00406-14. Epub Sep. 3, 2014.

Wressnigg et al., Safety and immunogenicity of a novel multivalent OspA vaccine against Lyme borreliosis in healthy adults: a double-blind, randomised, dose-escalation phase ½ trial. Lancet Infect Dis. Aug. 2013;13(8):680-9. doi: 10.1016/S1473-3099(13)70110-5. Epub May 10, 2013.

Yoder et al., Tripalmitoyl-S-glyceryl-cysteine-dependent OspA vaccination of toll-like receptor 2-deficient mice results in effective protection from Borrelia burgdorferi challenge. Infect Immun. Jul. 2003;71(7):3894-900.

Zhong et al., Plasmid DNA and protein vaccination of mice to the outer surface protein A of Borrelia burgdorferi leads to induction of T helper cells with specificity for a major epitope and augmentation of protective IgG antibodies in vivo. Eur. J. Immunol. 1996;26:2749-2757.

[No Author Listed], Clinical Trials Identifier: NCT03769194. Immunogenicity and Safety Study of a Vaccine Against Lyme Borreliosis, in Healthy Adults Aged 18 to 65 years. Randomized, Controlled, Observer-blind Phase 2 Study. Sep. 30, 2019. Retrieved Apr. 25, 2025 from https://clinicaltrials.gov/study/NCT03769194?term=NCT03769194&rank=1&tab=history&a=6#version-content-panel. 15 pages.

[No Author Listed], Press release: Valneva and Pfizer Announce Initiation of Phase 2 Study Vaccine Candidate. Mar. 8, 2021. 4 pages.

[No Author Listed], Press release: Valneva Announces Acceleration of Pediatric Development for Lyme Disease Vaccine Candidate. Dec. 2, 2020. 4 pages.

[No Author Listed], Press release: Valneva Announces Positive Initial Results for Phase 2 Study 0f Lvme Disease Vaccine Candidate. Jul. 22, 2020. 3 pages.

[No Author Listed], Press release: Valneva Announces Positive Initial Results for Second Phase 2 Study of Lyme Disease Vaccine Candidate VLA15. Oct. 20, 2020. 3 pages.

[No Author Listed], Press release: Valneva Initiates Secon Phase 2 Study for its Lyme Disease Vaccine Candidate VLA15. Jul. 1, 2019. 3 pages.

[No Author Listed], Press release: Valneva Reports Successful Outcome of Phase 2 Run- In for its Lyme Disease Vaccine Candidate. Jun. 12, 2019. 4 pages.

Chothia et al., The relation between the divergence of sequence and structure in proteins. EMBO J. Apr. 1986;5(4):823-6. doi: 10.1002/j.1460-2075.1986.tb04288.x.

Hogenesch et al., Optimizing the utilization of aluminum adjuvants in vaccines: you might just get what you want. NPJ Vaccines. Oct. 10, 2018;3:51. doi: 10.1038/s41541-018-0089-x.

Lawson et al., Chelators in Iron and Copper Toxicity. Curr Pharmacol Rep. Oct. 3, 2016;2:271-80. doi: 10.1007/s40495-016-0068-8.

Shamsheva, Vaccination and Human Health. Children's Infections. 2015:4;6-12. 8 pages.

Walpole et al., The weight of nations: an estimation of adult human biomass. BMC Public Health. Jun. 18, 2012;12:439. doi: 10.1186/1471-2458-12-439.

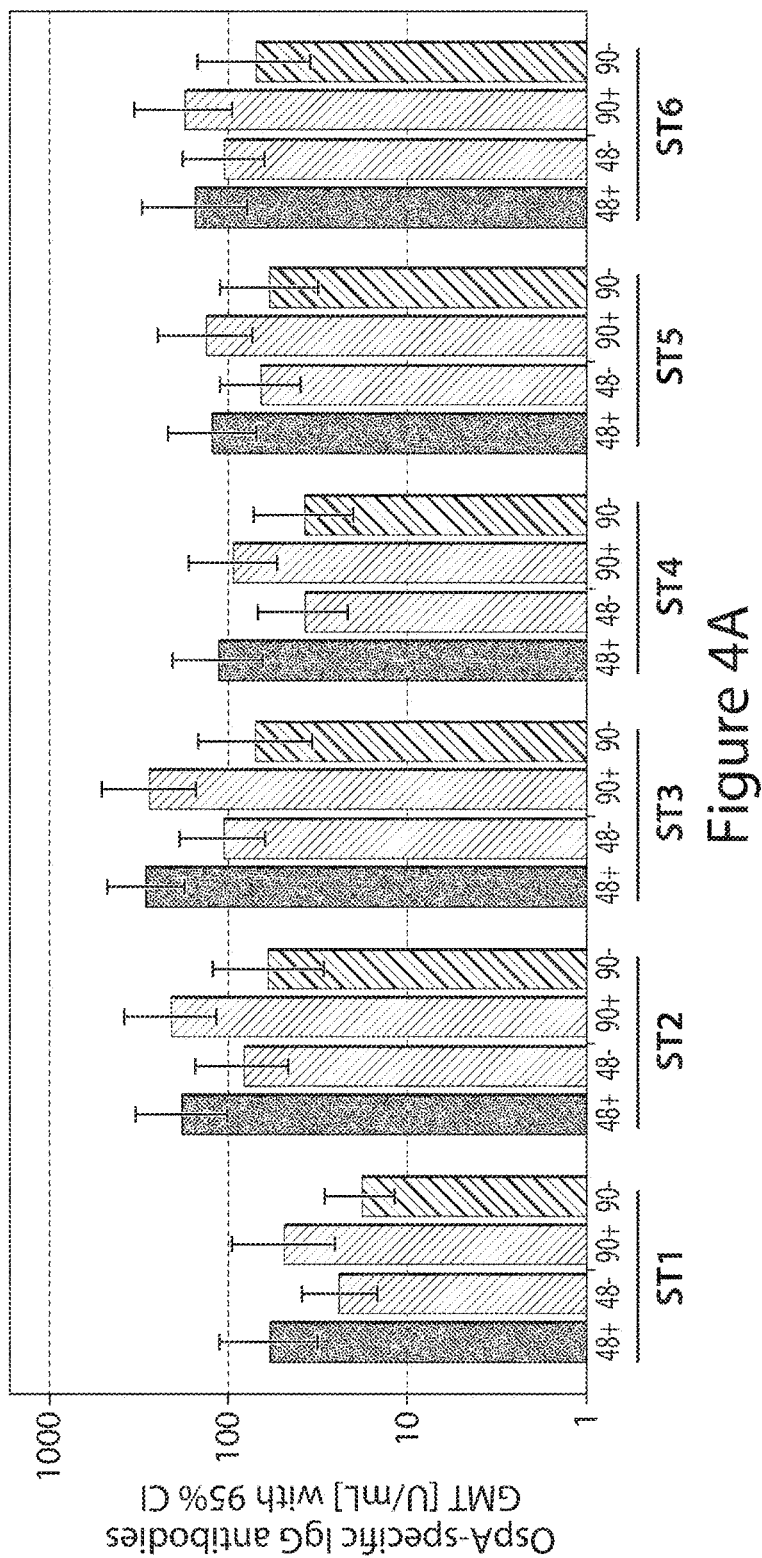

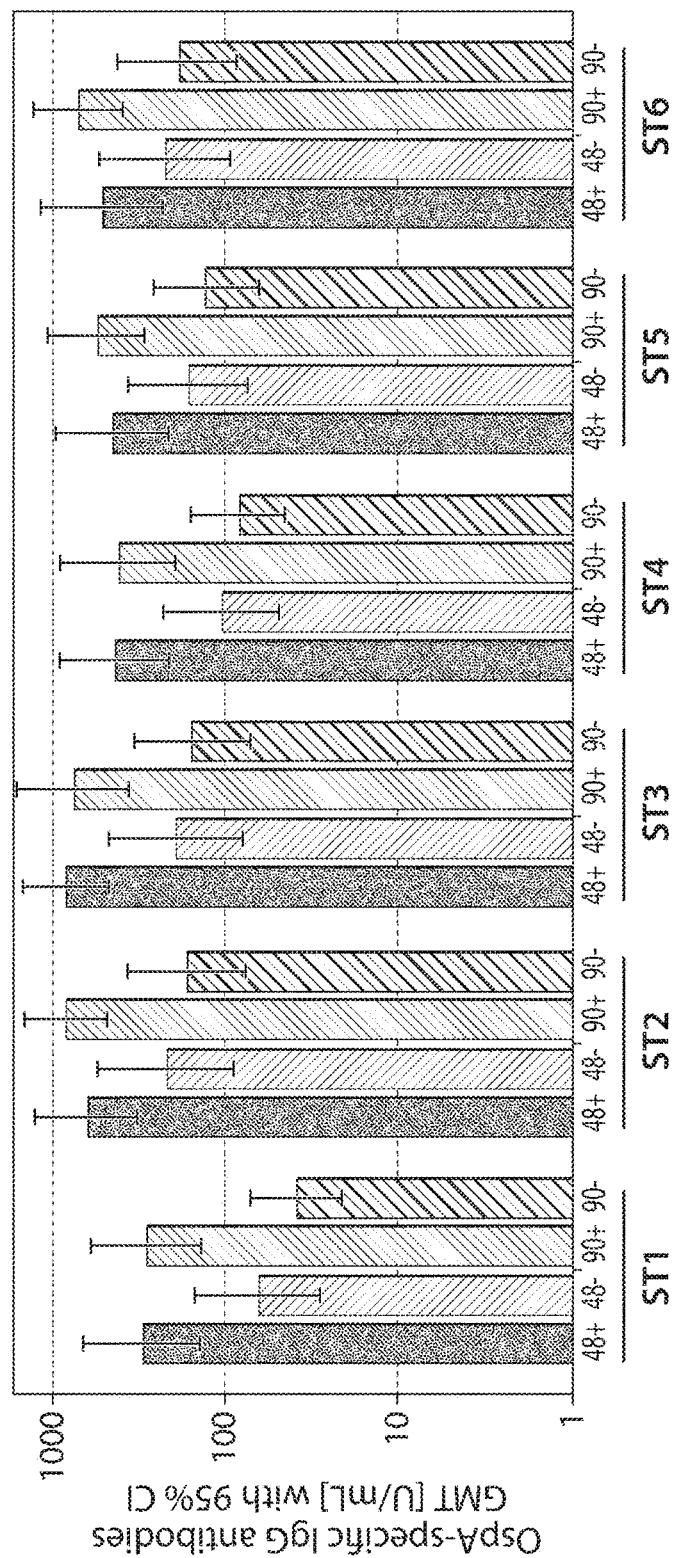

COMPOSITIONS COMPRISING THREE OspA FUSION PROTEINS FOR MEDICAL USE

RELATED APPLICATIONS

This application is a national stage filing under 35 U.S.C. 371 of International Patent Application Serial No. PCT/US2021/026599, filed Apr. 9, 2021, which claims priority to and the benefit of U.S. Application Ser. No. 63/152,582, filed Feb. 23, 2021. The entire contents of these applications are incorporated herein by reference in their entirety.

REFERENCE TO A SEQUENCE LISTING SUBMITTED AS A TEXT FILE VIA EFS-WEB

The instant application contains a Sequence Listing which has been submitted in ASCII format via EFS-Web and is hereby incorporated by reference in its entirety. Said ASCII copy, created on Jun. 1, 2023, is named I042270135US01-SUBSEQ-NTJ and is 14,170 bytes in size.

FIELD OF THE INVENTION

The present invention relates to a composition comprising the OspA fusion protein of SEQ ID NO: 1 (LipS1D1-S2D1), the OspA fusion protein of SEQ ID NO: 2 (Lip-S4D1-S3hybD1) and the OspA fusion protein of SEQ ID NO: 3 (Lip-S5D1-S6D1) for use in a vaccine or for use in a method for eliciting an immune response in a human against Lyme disease.

BACKGROUND OF THE INVENTION

Lyme borreliosis (herein also referred to as "LB"), also called Lyme disease (herein also referred to as "LD"), is an emerging, tick-borne zoonotic disease caused by several genospecies of the spirochete *Borrelia burgdorferi* sensu lato (s.l.). It is the most common vector-borne disease in Europe and North America [Mead P. S., Epidemiology of Lyme Disease, Infect Dis Clin N Am 29 (2015) 187-210]. In Europe, 65,000-85,000 cases are notified per year, however, due to inconsistent case reporting and the fact that LB is often undiagnosed, this number is certainly an underestimation [Rizzoli A, et al. Lyme borreliosis in Europe. Euro Surveill 16. (2011); Lindgren E, Jaenson T G T, Organization WHO Europe (2006) Lyme borreliosis in Europe: Influences of climate and climate change, epidemiology, ecology and adaptation measures, euro.who.int/_data/assets/pdf_file/0006/96819/E89522.pdf, last assessed March 2016]. The US Centers for Disease Control and Prevention (CDC) estimates about 300,000 cases annually in the United States, a number which is nearly 10-fold higher than reported cases [Hinckley A F, et al. Lyme disease testing by large commercial laboratories in the United States. Clin Infect Dis. 2014 Sep. 1; 59 (5): 676-81. doi: 10.1093/cid/ciu397. Epub 2014 May 30; Nelson C A, et al. Incidence of Clinician-Diagnosed Lyme Disease, United States, 2005-2010. Emerg Infect Dis. 2015 September; 21 (9): 1625-31. doi: 10.3201/eid2109.150417]. The incidence of LB has a bimodal distribution with respect to age. The two main target populations are children aged 5-14 years and adults aged 50-64 years [Rizzoli A, et al. 2011, supra; cdc.gov/lyme/stats/graphs.html, last assessed March 2016].

In Europe, most human infections are caused by four *Borrelia* genospecies, presenting six OspA serotypes (STs): *B. afzelii* (ST2), *B. garinii* (ST3, ST5 and ST6), *B. burgdorferi* sensu stricto (s.s.) (ST1) and *B. bavariensis* (ST4). In the US, *B. burgdorferi* s.s. (ST1) is found in almost 100% of cases. Recently, a new genospecies named *Borrelia* mayonii has been described, which was found in few clinical specimen isolated in the Upper Midwest of the US [Pritt B S, et al. Identification of a novel pathogenic *Borrelia* species causing Lyme borreliosis with unusually high spirochaetaemia: a descriptive study, Lancet Infect Dis 2016; 16:556-64].

The most common clinical manifestation of LD is a gradually expanding erythematous skin rash called erythema migrans (EM), a distinct sign of early localized *Borrelia* infection. An EM appears within days to weeks at the location of the tick bite and is often accompanied by symptoms of fatigue, fever, headache, mild stiff neck, arthralgia, or myalgia [Mead et al., 2015, supra]. In approximately 70%-80% of LD cases, patients develop EM [Stanek G, et al. Lyme borreliosis, Lancet 2012; 379:461-73; Wormser G P, et al, The Clinical Assessment, Treatment, and Prevention of Lyme Disease, Human Granulocytic Anaplasmosis, and Babesiosis: Clinical Practice Guidelines by the Infectious Diseases Society of America, Clinical Infectious Diseases 2006; 43:1089-134.]

If untreated or treated inadequately with antibiotics, the infection can disseminate to other parts of the body and can cause serious late-stage manifestations affecting the nervous system (facial palsy, meningitis, myelitis, and encephalitis), joints (recurrent or persistent large joint synovitis), or heart (e.g. conduction abnormalities and carditis).

The most common late stage clinical manifestations of LB that develops in about 30% of patients include musculoskeletal manifestations, such as Lyme arthritis. Lyme arthritis comprises recurrent attacks or long-lasting joint swelling (synovitis), usually in one or a few joints most commonly the knee, which develops months after a tick bite. Nervous system manifestations include Lyme neuroborreliosis, most commonly presented as cranial neuropathy with facial nerve palsy, possibly with bilateral involvement (bilateral Bell's palsy), within a few weeks of infection. In adults, the disease typically presents as painful meningoradiculoneuritis and facial palsy. In contrast, children most frequently develop headache due to meningitis, and facial palsy. In children there are shorter lasting symptoms and better outcomes. Cardiac manifestations in LD appear to be uncommon, and Lyme carditis usually presents within two months of infection as myocarditis with acute intermittent atrioventricular heart block. In Europe, more severe skin manifestations (e.g. acrodermatitis chronica atrophicans (ACA), borrelial lymphocytoma) can result from disseminated infection as late complications [Stanek, et al. 2012, supra].

Outer surface protein A (OspA) is one of the dominant proteins expressed by *Borrelia burgdorferi* s.l. when present in an unfed tick. During tick feeding the incoming blood signals the down regulation of OspA expression, allowing the spirochetes to penetrate the gut epithelium, migrate to the salivary glands and further into the blood of the host [Schwan T G and Piesman J. Temporal changes in outer surface proteins A and C of the Lyme disease-associated spirochete, *Borrelia burgdorferi*, during the chain of infection in ticks and mice. J Clin Microbiol 2000, 38:382-8]. OspA based LB vaccines induce antibodies that act on OspA expressing spirochetes within the tick gut, blocking transmission of the spirochete to the salivary glands and subsequently to the vertebrate host [de Silva A M and Telford S R 3rd, Brunet L R, Barthold S W, Fikrig E., J Exp Med. 1996, 183 (1): 271-5].

Two vaccines containing OspA from *B. burgdorferi* s.s. (ST1) have previously shown to be efficacious to prevent LB in humans: LYMErix (SmithKline Beecham) [Steere A C, et al., Lyme Disease Vaccine Study Group, Vaccination against Lyme disease with recombinant *Borrelia burgdorferi* outer-surface lipoprotein A with adjuvant, N Engl J Med. 1998; 339 (4): 209-15] and ImuLyme (Pasteur Mérieux Connaught) [Sigal L H, et al., A vaccine consisting of recombinant *Borrelia burgdorferi* outer-surface protein A to prevent Lyme disease, N Engl J Med. 1998; 339 (4): 216-22] LYMErix was licensed and available for costumers from 1998-2002, when it was voluntarily withdrawn from the market. After licensure of LYMErix, a possible relationship between the Lyme vaccine and joint reactions was hypothesized because of partial homology of OspA ST1 in the vaccine with hLFA-1 (human leukocyte function-associated antigen-1) that was claimed to induce antibiotic-refractory Lyme arthritis in a subset of naturally infected patients [Gross D M, et al., Identification of LFA-1 as a candidate autoantigen in treatment-resistant Lyme arthritis, Science. 1998 Jul. 31; 281 (5377): 703-6]. The hypothesis however could not be proven. On the contrary, a retrospective study of joint complaints reported to the Vaccine Adverse Event Reporting System (VAERS) after distribution of over 1,400, 000 doses during the first 19 months after licensure of the vaccine showed no unusual number of such complaints [Lathrop S L, et al., Adverse event reports following vaccination for Lyme disease: December 1998-July 2000, Vaccine 20 (2002) 1603-1608]. In the Phase III study of the vaccine, the incidence of transient arthralgia was non-significantly increased in vaccinees, but the incidence of arthritis was not increased as compared to the placebo group [Steere, et al., 1998, supra].

More recently, Baxter conducted a Phase I/II study of a similar multivalent OspA based vaccine candidate, which has shown to be safe, well tolerated and highly immunogenic [Wressnigg N, et al.; Safety and immunogenicity of a novel multivalent OspA vaccine against Lyme borreliosis in healthy adults: a double-blind, randomised, dose-escalation phase 1/2 trial, Lancet Infect Dis. 2013 August; 13 (8): 680-9; Wressnigg N, et al., A Novel multivalent OspA vaccine against Lyme borreliosis is safe and immunogenic in an adult population previously infected with *Borrelia burgdorferi* sensu lato, Clin Vaccine Immunol. 2014 November; 21 (11): 1490-9]. However, this vaccine is currently not being developed further. Currently, there is no LB vaccine on the market and no other LB vaccine candidate is in clinical development.

The multivalent Lyme borreliosis vaccine of the current invention comprises the immunodominant C-terminal part of the six most common OspA serotypes present in Europe (ST1 to ST6) and the US (ST1) and is designed to induce anti-OspA antibodies to neutralize the *Borrelia* within the tick gut, blocking its transmission to the host. The multimeric *Borrelia* vaccine has been shown to be highly protective against four *Borrelia* genospecies (*B. burgdorferi* s.s., *B. afzelii, B. bavariensis* and *B. garinii*), including five clinically relevant OspA serotypes (ST1, ST2, ST4 to ST6) in mouse models using either infected ticks or in vitro grown spirochetes for challenge.

OspA based vaccines have shown to be efficacious in humans in the past. Valneva's multivalent *Borrelia* vaccine could prevent infection with the most common *B. burgdorferi* s.l. and OspA serotypes present in Europe and the US.

OspA-based vaccines require high and sustained antibody titers because of their mechanism of action (outside of the body).

BRIEF DESCRIPTION OF THE DRAWINGS

FIGS. 4A-4D. Phase 1 data: IgG GMT values, Booster PP population (i.e., subjects enrolled in booster extension phase and received correct booster dose at correct timing according to protocol), for each serotype, at FIG. 4A) d84, FIG. 4B) M13, FIG. 4C) M14 and FIG. 4D) M19.

FIG. 6A) Serotype 1 (ST1)—samples with ELISA titers lower than 100 U/mL rarely tested positive in the SBA. In total, 116 valid SBA data points were collected. The ST1 SBA lower limit of quantification (LLOQ) was set to 20 and negative samples were given a value of 10. FIG. 6B) ST2—samples with ELISA titers lower than 200 U/mL rarely tested positive in the SBA. In total, 48 valid SBA data points were collected. The ST2 SBA LLOQ was set to 20 and negative samples were given a value of 10. FIG. 6C) ST3—samples with ELISA titers lower than 100 U/mL rarely tested positive in the SBA. In total, 122 valid SBA data points were collected. The ST3 SBA LLOQ was set to 160 and negative samples were given a value of 80.

(FIG. 9A) Spearman correlation coefficient: 0.7083, p-Value: <. 0001; (FIG. 9B) Spearman correlation coefficient: 0.8217, p-Value: <. 0001; (FIG. 9C) Spearman correlation coefficient: 0.9131, p-Value: <. 0001; (FIG. 9D) Spearman correlation coefficient: 0.6487, p-Value: <. 0001; (FIG. 9E) Spearman correlation coefficient: 0.6554, p-Value: <. 0001; (FIG. 9F) Spearman correlation coefficient: 0.7818, p-Value: <. 0001.

FIG. 18A) 135 µg group; FIG. 18B) 180 µg group.

DETAILED DESCRIPTION OF THE INVENTION

Figure 1:
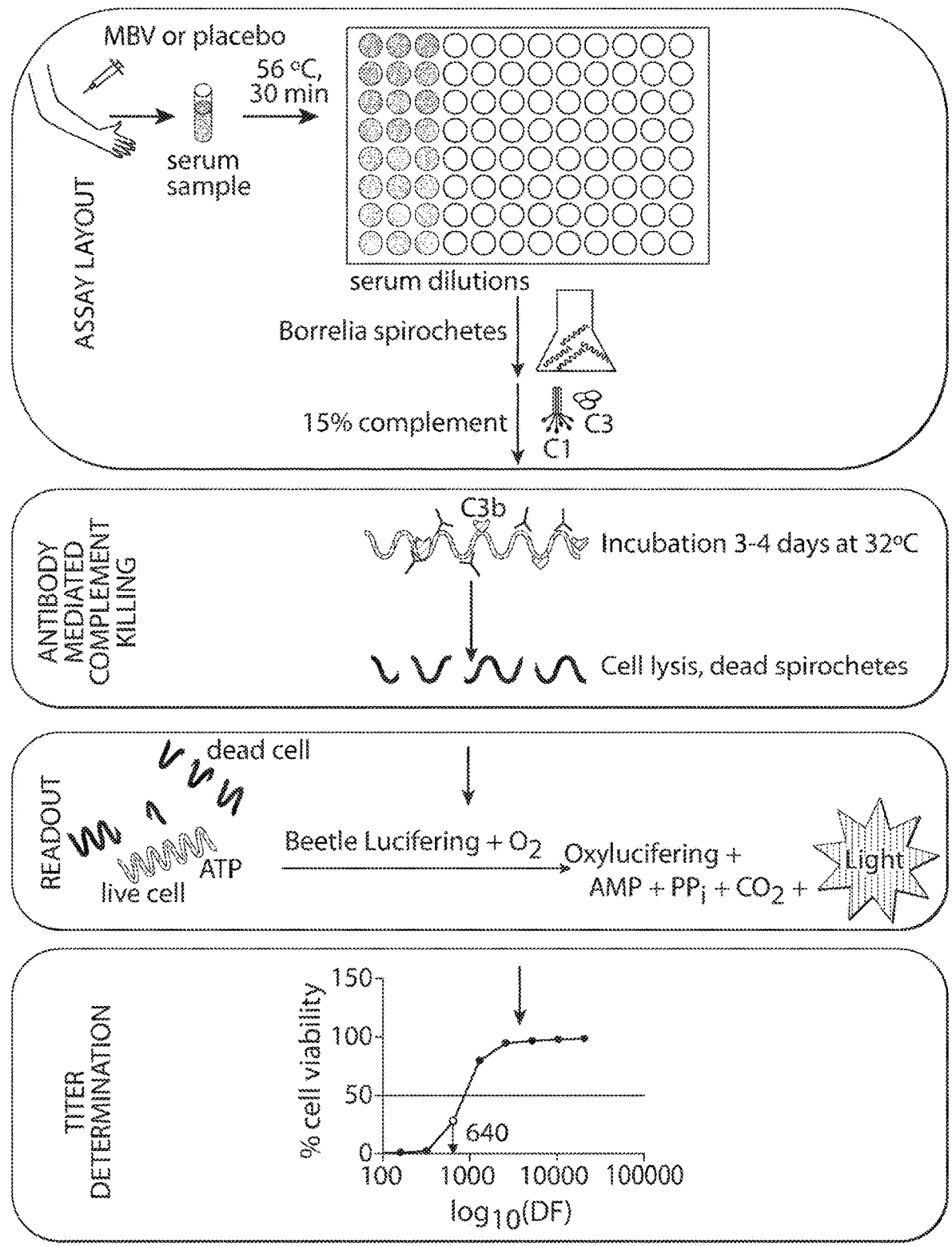
FIG. 1. Serum bactericidal assay used as an in vitro functional assay (see Materials and Methods).

Therefore, in a first aspect, the present invention provides a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1) for use as a vaccine, wherein the vaccine is to be administered i) to a human adult at least three times at a total protein content of said 3 fusion proteins in the range of from 60 to 200 µg per dose or more preferably from 120 to 200 µg per dose or ii) to a human child at least three times at a total protein content of said 3 fusion proteins in the range of from 60 to 200 µg per dose or from 120 to 200 µg per dose or from 60 to 100 µg per dose. Alternatively, the present invention provides a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1) for use as a vaccine, wherein the vaccine is to be administered i) to a human adult at least two times at a total protein content of said 3 fusion proteins in the range of from 60 to 200 µg per dose or more preferably 120 to 200 µg per dose or ii) to a human child at least two times at a total protein content of said 3 fusion proteins in the range of from 60 to 200 µg per dose or 120 to 200 µg per dose or from 60 to 100 µg per dose. Said composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1) is herein also referred to as "Vaccine A" or the multimeric *Borrelia* vaccine ("MBV"), interchangeably.

The above fusion proteins (sometimes also referred to as heterodimers) are derived from borrelial outer surface protein A (OspA). OspA is expressed by *Borrelia* only when it is in the gut of the tick vector. Thus, OspA antibodies produced by vaccination do not fight infection in the body, but enter the gut of the tick when it takes a blood meal. There, the antibodies likely neutralize the spirochetes and block the migration of bacteria from the midgut to the salivary glands of the tick, the route through which *Borrelia* enters the vertebrate host. Thus, OspA-specific antibodies prevent the transmission of *Borrelia* from the tick vector to the human host.

The above proteins are lipidated mutant OspA fragment fusion proteins comprising a hybrid C-terminal OspA fragment, wherein the hybrid fragment consists of a C-terminal domain of OspA of *Borrelia* that is comprised of a fragment derived from OspA of a *Borrelia* strain different than *B. garinii*, strain PBr, and a second fragment of OspA from *B. garinii*, strain PBr, and differs from the corresponding wild-type sequence at least by the introduction of at least one disulfide bond. The disulfide bonds are disulfide bonds Type 1, wherein cysteine residues are inserted at position 183+/−3 and 270+/−3 (for further details see WO 2015/104396 A1). S3hyb indicates a fusion of amino acids 125-176 of *B. valaisiana* and amino acids 177-274 of *B. garinii*, strain PBr. Lip means lipidation and indicates the N-terminal addition of glycerol and fatty acid residues. The "LN1" peptide linker is a fusion of two separate loop regions of the N-terminal half of OspA from *B. burgdorferi* s.s., strain B31 (aa 65-74 and aa 42-53, with an amino acid exchange at position 53 of D53S) which has the following sequence: GTSDKNNGSG-SKEKNKDGKYS (SEQ ID NO: 7).

Particularly, Lip-S1D1-S2D1 is a fusion protein of OspA serotype 1 and OspA serotype 2 with disulfide bond type 1 and comprises an N-terminal CSS for addition of lipids, a LN1 linker sequence and an N-terminal lipidation. Amino acids 164-174 of OspA serotype 1 are replaced by non-hLFA-1-like sequence NFTLEGKVAND (SEQ ID NO: 8). The sequence is shown as following SEQ ID NO: 1:

```
Lip-S1D1-S2D1-aa
                                                         SEQ ID NO: 1
LipCSSFNEKGEVSEKIITRADGTRLEYTGIKSDGSGKAKEVLKNFTLEGKVANDKTTLVVK

CGTVTLSKNISKSGEVSVELNDTDSSAATKKTAAWNSGTSTLTITVNSKKTKDLVFTKENTI

TVQQYDSNGTKLEGSAVEITKLDEICNALKGTSDKNNGSGSKEKNKDGKYSFNEKGELSAKT

MTRENGTKLEYTEMKSDGTGKAKEVLKNFTLEGKVANDKVTLEVKCGTVTLSKEIAKSGEVT

VALNDTNTTQATKKTGAWDSKTSTLTISVNSKKTTQLVFTKQDTITVQKYDSAGTNLEGTAV

EIKTLDELCNALK
``` the fusion protein of SEQ ID NO: 3 (Lip-S5D1-S6D1) for use as a vaccine, wherein the vaccine is to be administered Lip-S4D1-S3hybD1 is a fusion protein of OspA serotype 4 and OspA serotype 3, comprising amino acids 125-176 of

*B. valaisiana*, strain VS116 and amino acids 177-274 of *B. garinii*, strain PBr, serotype 3, with disulfide bond type 1 and comprises an N-terminal CSS for addition of lipids, an LN1 linker sequence and N-terminal lipidation. The sequence is shown as following SEQ ID NO: 2:

```
Lip-S4D1-S3hybD1-aa
                                                SEQ ID NO: 2
LipCSSFNAKGELSEKTILRANGTRLEYTEIKSDGTGKAKEVLKDFALEGTLAADKTTLKVT

CGTVVLSKHIPNSGEITVELNDSNSTQATKKTGKWDSNTSTLTISVNSKKTKNIVFTKEDTI

TVQKYDSAGTNLEGNAVEIKTLDELCNALKGTSDKNNGSGSKEKNKDGKYSFNEKGEVSEKI

LTRSNGTTLEYSQMTDAENATKAVETLKNGIKLPGNLVGGKTKLTVTCGTVTLSKNISKSGE

ITVALNDTETTPADKKTGEWKSDTSTLTISKNSQKTKQLVFTKENTITVQNYNRAGNALEGS

PAEIKDLAELCAALK
```

Lip-S5D1-S6D1 is a fusion protein of OspA serotypes 6 both with disulfide bond type 1, an N-terminal CSS for addition of lipids, LN1 linker sequence and an N-terminal lipidation. The sequence is shown as following SEQ ID NO: 3:

```
Lip-S5D1-S6D1-aa
                                                SEQ ID NO: 3
LipCSSFNEKGEISEKTIVRANGTRLEYTDIKSDKTGKAKEVLKDFTLEGTLAADGKTTLKV

TCGTVTLSKNISKSGEITVALDDTDSSGNKKSGTWDSGTSTLTISKNRTKTKQLVFTKEDTI

TVQNYDSAGTNLEGKAVEITTLKELCNALKGTSDKNNGSGSKEKNKDGKYSFNGKGETSEKT

IVRANGTRLEYTDIKSDGSGKAKEVLKDFTLEGTLAADGKTTLKVTCGTVVLSKNILKSGEI

TAALDDSDTTRATKKTGKWDSKTSTLTISVNSQKTKNLVFTKEDTITVQRYDSAGTNLEGKA

VEITTLKELCNALK
```

The nucleic acid sequences coding for the above fusion proteins are as follows:

```
Lip-S1D1-S2D1-nt
                                                SEQ ID NO: 4
ATGAAAGCTACTAAACTGGTACTGGGCGCGGTAATCCTGGGTTCTACTCTGCTGGCAGGTTG

CTCAAGCTTCAACGAAAAGGGCGAAGTCAGCGAAAAAATCATTACCCGCGCAGACGGCACCC

GCCTGGAATACACCGGCATCAAATCGGACGGCAGCGGCAAAGCGAAAGAAGTTCTGAAAAAC

TTTACCCTGGAAGGCAAAGTCGCAAATGATAAAACCACCCTGGTGGTGAAATGCGGCACCGT

TACGCTGAGCAAAAACATTAGTAAATCCGGTGAAGTCTCTGTGGAACTGAATGATACCGACA

GCTCTGCGGCCACCAAGAAAACCGCAGCTTGGAACTCAGGCACCTCGACGCTGACCATTACG

GTTAATAGCAAGAAAACCAAAGATCTGGTCTTCACGAAAGAAAACACCATCACGGTGCAGCA

ATATGACAGCAATGGTACCAAACTGGAAGGCTCCGCTGTGGAAATCACGAAACTGGATGAAA

TCTGTAATGCTCTGAAAGGTACTAGTGACAAAAACAATGGCTCTGGTAGCAAAGAGAAAAAC

AAAGATGGCAAGTACTCATTCAACGAAAAAGGCGAACTGTCGGCGAAACGATGACGCGTGA

AAACGGCACCAAACTGGAATATACGGAAATGAAAAGCGATGGCACCGGTAAAGCGAAAGAAG

TTCTGAAAAACTTTACCCTGGAAGGCAAAGTCGCCAATGACAAAGTCACCCTGGAAGTGAAA

TGCGGCACCGTTACGCTGTCAAAAGAAATTGCAAAATCGGGTGAAGTGACCGTTGCTCTGAA

CGATACGAATACCACGCAAGCGACCAAGAAACCGGCGCCTGGGACAGCAAAACCTCTACGC

TGACCATTAGTGTTAATAGCAAGAAAACCACGCAGCTGGTCTTCACCAAACAAGATACGATC
```

-continued
ACCGTGCAGAAATACGACAGTGCGGGTACCAACCTGGAAGGCACGGCTGTTGAAATCAAAAC

CCTGGACGAACTGTGTAACGCCCTGAAA

Lip-S4D1-S3hybD1-nt
SEQ ID NO: 5
ATGAAAGCTACTAAACTGGTACTGGGCGCGGTAATCCTGGGTTCTACTCTGCTGGCAGGTTG

CTCAAGCTTCAATGCTAAGGGCGAACTGAGCGAAAAAACGATCCTGCGTGCGAATGGCACCC

GTCTGGAATACACCGAAATCAAATCCGATGGTACGGGCAAAGCAAAGGAAGTCCTGAAAGAT

TTTGCTCTGGAAGGTACCCTGGCGGCCGACAAAACCACGCTGAAGGTGACGTGCGGCACCGT

GGTTCTGAGCAAACATATTCCGAACTCTGGTGAAATCACCGTTGAACTGAACGATAGCAATT

CTACGCAGGCAACCAAAAAGACGGGCAAATGGGACAGTAATACCTCCACGCTGACCATTTCA

GTCAACTCGAAAAAGACCAAAAATATTGTGTTCACGAAGGAAGATACGATCACCGTTCAAAA

ATATGACTCCGCGGGCACCAACCTGGAAGGCAATGCCGTCGAAATCAAAACCCTGGATGAAC

TGTGTAACGCCCTGAAGGGTACTAGTGACAAAAACAATGGCTCTGGTAGCAAAGAGAAAAAC

AAAGATGGCAAGTACTCATTCAACGAAAAAGGCGAAGTGAGCGAAAAAATTCTGACCCGTAG

CAATGGCACCACCCTGGAATATAGCCAGATGACCGATGCAGAAAATGCAACCAAAGCAGTTG

AAACCCTGAAAAACGGTATTAAACTGCCTGGTAATCTGGTTGGTGGTAAAACCAAACTGACC

GTTACCTGTGGCACCGTTACCCTGAGCAAAAACATTAGCAAAAGCGGTGAAATTACCGTGGC

ACTGAATGATACCGAAACCACACCGGCAGACAAAAAAACCGGTGAATGGAAAAGCGATACCA

GCACCCTGACCATTAGTAAAAATAGCCAGAAAACAAAACAGCTGGTGTTTACCAAAGAAAAC

ACCATTACCGTGCAGAATTATAACCGTGCAGGTAATGCACTGGAAGGTAGTCCGGCAGAAAT

TAAAGATCTGGCAGAACTGTGTGCAGCCCTGAAATAA

Lip-S5D1-S6D1-nt
SEQ ID NO: 6
ATGAAAGCTACTAAACTGGTACTGGGCGCGGTAATCCTGGGTTCTACTCTGCTGGCAGGTTG

CTCAAGCTTCAACGAAAAGGGCGAAATCTCAGAAAAAACCATCGTCCGCGCTAACGGCACCC

GCCTGGAATACACCGACATCAAATCAGACAAGACCGGTAAAGCGAAGGAAGTTCTGAAAGAT

TTTACGCTGGAAGGTACCCTGGCAGCAGACGGTAAAACCACGCTGAAGGTGACCTGCGGTAC

CGTTACGCTGTCCAAAAACATTAGTAAGTCCGGCGAAATCACGGTCGCCCTGGATGACACCG

ATAGCTCTGGCAACAAAAGAGCGGTACCTGGGATTCAGGCACCTCGACGCTGACCATTTCT

AAAAATCGTACGAAAACCAAGCAGCTGGTCTTCACGAAAGAAGATACGATCACCGTGCAAAA

CTATGACAGCGCAGGTACCAATCTGGAAGGCAAAGCTGTGGAAATTACCACGCTGAAAGAAC

TGTGTAATGCTCTGAAAGGTACTAGTGACAAAAACAATGGCTCTGGTAGCAAAGAGAAAAAC

AAAGATGGCAAGTACTCATTCAACGGCAAAGGTGAAACGAGCGAAAAAGACCATCGTGCGTGC

GAACGGTACCCGCCTGGAATATACGGACATTAAATCGGACGGCAGCGGCAAAGCAAAGGAAG

TCCTGAAAGATTTTACGCTGGAAGGTACCCTGGCAGCAGACGGTAAAACCACGCTGAAGGTG

ACGTGCGGCACCGTGGTTCTGTCAAAAAACATTCTGAAGTCGGGTGAAATCACCGCAGCTCT

GGATGACAGCGATACCACGCGTGCTACGAAAAAGACCGGTAAATGGGATAGCAAGACCTCTA

CGCTGACCATTAGTGTCAACTCCCAGAAAACGAAGAATCTGGTGTTCACCAAAGAAGATACG

ATCACCGTTCAACGCTATGACAGTGCGGGCACCAACCTGGAAGGCAAAGCCGTTGAAATTAC

CACGCTGAAAGAACTGTGTAATGCTCTGAAA

Further information on the fusion proteins and their production is derivable from WO 2015/104396 A1, wherein Lip-S1D1-S2D1, Lip-S4D1-S3hybD1 and Lip-S5D1-S6D1 correspond to SEQ ID NOs: 29, 27 and 33, respectively.

As detailed above, the fusion proteins are lipidated proteins, wherein the lipid moieties, along with the glycerol group, is also referred to as "Lip". According to the invention, Lip comprises one to three lipids such as $C_{14-20}$ alkyl and/or $C_{14-20}$ alkenyl attached to a glycerol and an amino group of the N-terminal cysteine of the polypeptide of the invention, or preferably wherein Lip is a moiety of formula (I) below,

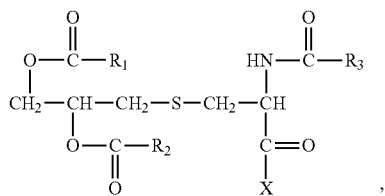

Formula (I)

in which one of $R_1$, $R_2$ or $R_3$ is $C_{14}$-$C_{20}$ alkyl or alkenyl, and each of the others, independently is $C_{14}$-$C_{20}$ alkyl or $C_{14}$-$C_{20}$ alkenyl, and X is an amino acid sequence attached to the cysteine residue shown in Formula (I). More preferably, Lip plus the N-terminal cysteine of the polypeptide is N-palmitoyl-S-(2RS)-2,3-bis-(palmitoyloxy) propyl cysteine (referred to herein as "Pam$_3$Cys") and is connected via the carbonyl C of the cysteine to said amino acid sequence of the invention. In Formula (I) above $R_1$, $R_2$ and $R_3$ would be palmitoyl moieties and X is an amino acid sequence attached to the cysteine residue.

The fusion proteins are encompassed in a composition. The composition is pharmaceutically acceptable, which allows for administration to a human. It may optionally contain any pharmaceutically acceptable carrier or excipient, such as buffer substances, stabilizers or further active ingredients, especially ingredients known in connection with pharmaceutical compositions and/or vaccine production. The composition may comprise sodium phosphate, sodium chloride, L-methionine, sucrose and Polysorbate-20 (Tween-20) at a pH of 6.7+/−0.2. Preferably, the pharmaceutical composition also comprises aluminium hydroxide, preferably at a concentration of 0.15%. Also the composition may comprise between 5 mM and 50 mM sodium phosphate, between 100 and 200 mM sodium chloride, between 5 mM and 25 mM L-methionine, between 2.5% and 10% Sucrose, between 0.01% and 0.1% Tween 20 and between 0.1% and 0.2% (w/v) aluminium hydroxide. More preferably, the formulation comprises 10 mM sodium phosphate, 150 mM sodium chloride, 10 mM L-methionine, 5% Sucrose, 0.05% Tween 20 and 0.15% (w/v) aluminium hydroxide at pH 6.7±0.2. In a preferred embodiment, the excipient is L-methionine.

In some embodiments, the composition comprising the fusion proteins is administered to a subject in a volume of about 0.25 milliliter (ml) to about 1.0 ml or greater, such as 0.25 ml, 0.3 ml, 0.4 ml, 0.5 ml, 0.6 ml, 0.7 ml, 0.8 ml, 0.9 ml, or 1.0 ml. In one embodiment, the volume administered to a subject is in the range of 0.25 ml to 1.0 ml, or 0.25 ml to 0.5 ml, or 0.5 ml to 1.0 ml. In one embodiment, the volume administered to a subject is about 0.25 ml, about 0.5 ml or about 1.0 ml. In one embodiment, the volume administered to a subject is 0.25 ml, 0.5 ml, or 1.0 ml. In one embodiment, the volume administered to a subject is 0.25 ml. In one embodiment, the volume administered to a subject is 0.5 ml. In one embodiment, the volume administered to a subject is 1.0 ml. In a preferred embodiment, the volume administered to a subject who is 5 years or older (such as 5-17 years old, 5-11 years old, 12-17 years old, 18 years or older, 18-65 years old, or 50 years or older) is 0.5 ml or 1.0 ml. In a preferred embodiment, the volume administered to a subject who is 5 years or older (such as 5-17 years old, 5-11 years old, 12-17 years old, 18 years or older, 18-65 years old, or 50 years or older) is 1.0 ml. In a further preferred embodiment, the volume administered to a subject who is 5 years or older (such as 5-17 years old, 5-11 years old, 12-17 years old, 18 years or older, 18-65 years old, or 50 years or older) is 0.5 ml. In a further preferred embodiment, the volume administered to a subject who is 0-4 years old (such as 1-4 years old, or 2-4 years old) is 0.25 ml.

According to the invention, the composition is used as a vaccine, particularly against an infection caused by Borrelia species, more preferably pathogenic Borrelia species as disclosed herein more preferably comprising B. burgdorferi s.s., B. afzelii, B. bavariensis and B. garinii, and/or other pathogens against which the antigens have been included in the vaccine. Preferably, the Borrelia species is selected from B. burgdorferi s.s., B. garinii, B. afzelii, B. andersoni, B. bavariensis, B. bissettii, B. valaisiana, B. lusitaniae, B. spielmanii, B. japonica, B. tanukii, B. turdi or B. sinica infection, preferably a B. burgdorferi s.s., B. afzelii and B. garinii.

It has been found that a specific administration schedule is advantageous, particularly in obtaining a sustained protective effect against all Borrelia OspA serotypes. This relates to the minimal number of administrations as well as the dose range. In accordance with that the vaccine is to be administered to a human adult at least three times at a total protein content of said 3 fusion proteins in the range of from 60 to 200 µg per dose or more preferably from 120 to 200 µg per dose or to a human child at least three times at a total protein content of said 3 fusion proteins in the range of from 60 to 200 µg per dose or from 120 to 200 µg per dose or from 60 to 100 µg per dose. In some embodiments, the vaccine is to be administered to a human adult at least two times at a total protein content of said 3 fusion proteins in the range of from 60 to 200 µg per dose or more preferably from 120 to 200 µg per dose or to a human child at least two times at a total protein content of said 3 fusion proteins in the range of from 60 to 200 µg per dose or from 120 to 200 µg per dose or from 60 to 100 µg per dose.

First data demonstrate that vaccines of the present invention such as Vaccine A at doses of 135 µg and 180 µg total protein content of the fusion proteins per dose were more effective than a dose of 90 µg (see Example 2). Accordingly, the total protein content of the 3 fusion protein is in the range of from 120 to 200 µg per dose for a human adult (adult dose). For children, half of the above doses may be applied, i.e. 60-100 µg (half dose), but the adult dose may also be appropriate i.e. 120 to 200 µg (adult dose). In context of administering half doses, a human child is typically a young child from birth until age 4 (0-4 years old), 1-4 years old, or 2-4 years old. Older children (age 5 to 17), including adolescents (age 12-17), receive the dose of an adult.

In view of the special mode of action of this vaccine which happens outside the human body, a need of constantly relatively high antibody titers throughout the tick seasons are of utmost importance. In addition, no natural boosting effect for present OspA-specific antibodies upon natural infection can be expected because OspA is only present on the surface of *Borrelia* as long as *Borrelia* are in the midgut of the tick and not after antibodies have possibly entered the human host. Therefore, high antibody titers are needed and the composition is to be administered at least three times, or alternatively two times. In accordance with this, the composition may be administered two times, three times, four times, five times or even more often.

The first primary immunization is referred herein to as the Month 0-2-6 immunization series. The further administrations are booster doses for re-exposure to the vaccine and are applied typically every 12 months after the $3^{rd}$ immunization of the primary immunization (i.e. first booster at month 18). Alternatively, the first primary immunization is referred herein to as the Month 0-6 immunization series. The further administrations are booster doses for re-exposure to the vaccine and are applied typically every 12 months after the $2^{nd}$ immunization of the primary immunization (i.e. first booster at month 18). Booster doses increase immunity back to protective levels, after titers have declined through time (see Example 1). It has been shown that boosters are needed in case of the composition according to the present invention in order to sustain high OspA antibody levels which are needed to confer protection.

While booster doses typically are applied every 12 months, booster doses can be administered within several months of the 12 month timing, such as between 9-15 months after the final dose of the primary immunization (e.g., at 9 months, 10 months, 11 months, 12 months, 13 months, 14 months, or 15 months), or subsequent booster doses (e.g., at 9 months, 10 months, 11 months, 12 months, 13 months, 14 months, or 15 months after the first or subsequent booster doses).

The composition according to the present invention may be administered to the human as an injectable composition, for example as a sterile aqueous dispersion, preferably isotonic. The composition may be administered via a systemic or mucosal route. These administrations may include injection via the intramuscular, intraperitoneal, intradermal or subcutaneous routes; or via mucosal administration to the oral/alimentary, respiratory or genitourinary tracts. Although the vaccine of the invention may be administered as a combination of the 3 fusion proteins, components thereof (i.e. the individual fusion proteins) may also be administered separately at the same time or sequentially or just as a one component vaccine (i.e. just Lip-S1D1-S2D1).

In a second aspect, the present invention provides a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1) for use in a method for eliciting an immune response in a human against Lyme borreliosis, the method comprising administering to a human the composition at least three times at a total protein content of said 3 fusion proteins is in the range of from 120 to 200 µg per dose for a human adult or child or in case of a human child (in particular a young child 0 to 4 years old, 1-4 years old, or 2-4 years old) only half a dose such as e.g. at least three times at a total protein content of said 3 fusion proteins in the range of from 60 to 100 µg per dose. Alternatively, the present invention provides a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1) for use in a method for eliciting an immune response in a human against Lyme borreliosis, the method comprising administering to a human the composition at least two times at a total protein content of said 3 fusion proteins is in the range of from 120 to 200 µg per dose for a human adult or child or in case of a human child (in particular a young child 0 to 4 years old, 1-4 years old, or 2-4 years old) only half a dose such as e.g. at least two times at a total protein content of said 3 fusion proteins in the range of from 60 to 100 µg per dose.

The above definitions and comments made with respect to the first aspect of the invention apply also to the second aspect of the invention.

In the second aspect, the composition is used in a method for eliciting an immune response in a human against Lyme disease caused by *Borrelia* species, more preferably pathogenic *Borrelia* species as disclosed herein more preferably comprising *B. burgdorferi* s.s., *B. afzelii*, *B. bavariensis* and *B. garinii*, and/or other pathogens against which the antigens have been included in the composition. Preferably, the composition is for use in a method of eliciting an immune response against *B. burgdorferi* s.s., *B. garinii*, *B. afzelii*, *B. andersoni*, *B. bavariensis*, *B. bissettii*, *B. valaisiana*, *B. lusitaniae*, *B. spielmanii*, *B. japonica*, *B. tanukii*, *B. turdi* or *B. sinica* infection, preferably a *B. burgdorferi* s.s., *B. afzelii* and/or *B. garinii*.

Lyme borreliosis, or Lyme disease, is the most commonly reported tick-borne disease in Europe and North America. The disease is caused by infection with the arthropod-borne gram-negative-like spirochete, *Borrelia burgdorferi* sensu lato (*B. burgdorferi* s.l.), and can involve multiple organs or tissues, resulting in skin, cardiac, musculoskeletal and neurological disorders. In most countries, Lyme borreliosis is not a notifiable disease; therefore, exact data regarding annual incident rates are not available. In the United States, the causative agent is *B. burgdorferi* sensu stricto (*B. burgdorferi* s.s.) and Lyme borreliosis is localized to northeastern, mid-Atlantic and upper north-central states. In 2010, a total of about 30,000 cases of Lyme borreliosis were reported to the US to the Centers for Disease Control and Prevention (CDC). An updated report by the CDC in 2013, which takes into account diagnostic data from other sources, estimates that the actual number of new cases per year in the United States is closer to 300,000 (cdc.gov/media/releases/2013/p0819-lyme-disease.html). In Europe, *B. afzelii* and *B. garinii* are the main causative agents of Lyme borreliosis, as well as *B. burgdorferi* s.s. and *B. bavariensis*, which contribute to a lesser extent depending on the geographic location. The prevalence of Lyme borreliosis varies considerably in different European countries with an overall increased prevalence from west to east. In much of Europe, the number of reported cases of Lyme borreliosis has increased since the early 1990s (e.g., the Czech Republic, Estonia, Lithuania; see Lyme borreliosis in Europe, WHO report of 2006), and the geographic distribution of cases has also expanded.

As detailed above, high antibody titers after primary immunization and after booster doses are needed to sustain high OspA antibody levels. Particularly, a broad primary immunization schedule (e.g. Month 0-2-6) has been found suitable in the context of the present invention (see Example 3). Alternatively, a two dose primary immunization schedule (e.g. Month 0-6) may be used.

Therefore, the above compositions for use according to the present invention are preferably characterized in that the second administration is in the period of at least 4 to 6 weeks to at most 3 months after the first administration and/or the third administration is in the period of at least 5 months to at most 7 months after the first administration. In accordance with this, the first administration occurs at time point zero (day 1), the second administration in the period of at least 6 weeks to at most 3 months thereafter and the third administration in the period of at least 5 months to at most 7 months after the first administration. Further booster may be every year, e.g. 12 months, 24 months, 36 months etc. after the 3$^{rd}$ vaccine administration (i.e. after the month 6 immunization). Alternatively, the second administration is in the period of at least 5 months to at most 7 months after the first administration. In accordance with this, the first administration occurs at time point zero (day 1), the second administration in the period of at least 5 months to at most 7 months after the first administration. Further booster may be every year, e.g. 12 months, 24 months, 36 months etc. after the second vaccine administration (i.e. after the month 6 immunization). Accordingly, compositions for use according to the present invention are preferably characterized in that further administrations are every year after the third administration (or alternatively, the second administration in a Month 0-6 two dose primary immunization schedule), particularly after 1 year, after 2 years and after 3 years, etc. Said booster doses may in general be administered prior to the tick season, i.e. around February to June in the Northern hemisphere and around September to December in the Southern hemisphere.

More preferably, the above compositions for use according to the present invention are characterized in that the second administration is in the period of at least 40 days to at most 80 days, particularly in the period of at least 50 days to at most 70 days, more particularly in the period of at least 50 days to at most 60 days, especially 56 days after the first administration.

Also more preferably, the above compositions for use according to the present invention are characterized in that the third administration is in the period of at least 120 days to at most 240 days, in the period of at least 175 days to at most 185 days, especially 180 days after the first administration. Alternatively, the above compositions for use according to the present invention are characterized in that the second administration is in the period of at least 120 days to at most 240 days, in the period of at least 175 days to at most 185 days, especially 180 days after the first administration.

In some cases, one or more further administrations may be needed or desirable. In accordance with this a fourth administration of the composition (or alternatively, a third administration in a Month 0-6 two dose primary immunization schedule) may be in the period of at least 15 months to at most 21 months, particularly in the period of at least 17 months to at most 19 months, especially 18 months, after the first administration.

Preferably, the above compositions for use according to the present invention are characterized in that for a human adult (age 18 or older, including age 18-65), the total protein content of said 3 fusion proteins is in the range of from 135 μg to 180 μg per dose, particularly 135 μg or 180 μg per dose. The doses of 135 μg and 180 μg total protein content of said 3 fusion proteins have been particularly suitable in effecting a sustained protective effect against all Borrelia OspA serotypes (see Examples 2 and 3). Accordingly, it can be concluded that the effect is present for the complete range of from 135 μg to 180 μg total protein content of said 3 heterodimers per dose. As detailed above, for a young child (birth to 4 years old) half of the doses may apply (but a full dose may also be suitable). Accordingly, for a human child (in particular, a young child of birth to 4 years old, e.g., 1-4 years old, or 2-4 years old), the total protein content of said 3 fusion proteins is in the range of from 67.5 μg to 90 μg per dose, particularly 67.5 μg or 90 μg per dose. For older children (age 5-17), including adolescents (age 12-17), a full dose of 135 μg to 180 μg total protein content of said 3 heterodimers per dose can be used.

Preferably, the above compositions for use according to the present invention are characterized in that the 3 fusion proteins comprise at least 60%, preferably at least 70%, more preferably 80% of all proteins in the composition. It is apparent to the person skilled in the art that the composition for use according to the present invention may also encompass further proteins different from the fusion proteins of SEQ ID NOs: 1, 2 and 3. However, the ratio of the fusion proteins should not be below the above limits, based on the weight. Other proteins may have a function, e.g. in stabilizing the composition or may be impurities.

In one embodiment, the pharmaceutical composition comprises 3 fusion proteins, preferably Lip-S1D1-S2D1 (SEQ ID NO: 1), Lip-S4D1-S3hybD1 (SEQ ID NO: 2) and Lip-S5D1-S6D1 (SEQ ID NO: 3) in a weight ratio of 1:2:1, 1:3:1, 1:1:2, 1:1:3, 1:2:2, 1:2:3, 1:3:2, 1:3:3, 2:1:1, 2:1:2, 2:1:3, 2:2:3, 2:2:1, 2:3:1, 2:3:2, 2:3:3, 3:1:1, 3:1:2, 3:1:3, 3:2:1, 3:2:2, 3:2:3, 3:3:1, or 3:3:2. Preferably, the above compositions for use according to the present invention are characterized in that the composition comprises the fusion proteins in a weight ratio of 1:1:1 (Lip-S1D1-S2D1: Lip-S4D1-S3hybD1: Lip-S5D1-S6D1).

Preferably, the above compositions for use according to the present invention are characterized in that the composition comprises an adjuvant, more preferably an aluminum adjuvant.

The choice of a suitable adjuvant to be mixed with bacterial proteins made using the processes of the invention is within the knowledge of the person skilled in the art. Suitable adjuvants include an aluminium salt such as aluminium hydroxide or aluminum phosphate, but may also be other metal salts such as those of calcium, magnesium, iron or zinc, or may be an insoluble suspension of acylated tyrosine, or acylated sugars, cationically or anionically derivatized saccharides, or polyphosphazenes. In a preferred embodiment, the composition is adjuvanted with an aluminium adjuvant, such as aluminium hydroxide. In a further preferred embodiment, the amount of copper associated in the aluminium adjuvant is less than 1.25 ppb in the vaccine composition.

Most preferably, the above compositions for use according to the present invention are characterized in that the total protein content of said 3 fusion protein is 135 μg per dose for a human subject, particularly an adult or a child, or may be only 67.5 μg per dose for a human child (in particular, a young child from birth to 4 years, 1-4 years old, or 2-4 years old), wherein the second administration is 56 days (2 months) after the first administration, wherein the third administration is 180 days (6 months) after the first administration, and wherein the optional fourth administration (1$^{st}$ booster dose) is 18 months after the first administration.

Also most preferably, the above compositions for use according to the present invention are characterized in that the total protein content of said 3 fusion proteins is 180 μg per dose for a human subject, particularly an adult or a child, or may be 90 μg per dose for a human child (in particular, a young child from birth to 4 years, 1-4 years old, or 2-4 years old), wherein the second administration is 56 days (2 months) after the first administration, wherein the third administration is 180 days (6 months) after the first administration, and wherein the optional fourth administration (first booster dose) is 18 months after the first administration.

Alternatively, the above compositions for use according to the present invention are characterized in that the total protein content of said 3 fusion protein is 135 µg per dose for a human subject, particularly an adult or a child, or may be only 67.5 µg per dose for a human child (in particular, a young child from birth to 4 years, 1-4 years old, or 2-4 years old), wherein the second administration is 180 days (6 months) after the first administration, and wherein the optional third administration ($1^{st}$ booster dose) is 18 months after the first administration.

Also alternatively, the above compositions for use according to the present invention are characterized in that the total protein content of said 3 fusion proteins is 180 µg per dose for a human subject, particularly an adult or a child, or may be 90 µg per dose for a human child (in particular, a young child from birth to 4 years, 1-4 years old, or 2-4 years old), wherein the second administration is 180 days (6 months) after the first administration, and wherein the optional third administration (first booster dose) is 18 months after the first administration.

Preferably, the above compositions for use according to the present invention are characterized in that the immune response elicited comprises an anti-OspA serotype 1, an anti-OspA serotype 2, an anti-OspA serotype 3, an anti-OspA serotype, anti-OspA serotype 5 and/or an anti-OspA serotype 6 antibody response with bactericidal activity.

Preferably, the above compositions for use according to the present invention are characterized in that the immune response elicited comprises antibodies with bactericidal activity against OspA serotypes 1, 2, 3, 4, 5 and 6 expressing spirochetes.

Preferably, the above compositions for use according to the present invention are characterized in that the immune response against OspA serotypes 1, 2, 3, 4, 5 and 6 is sustained for at least about 60 days, for at least about 180 days, for at least about 365 days or for at least about 540 days. Sustained immune response may be tested as described in Example 2.

In one embodiment the composition or vaccine of the invention further comprises at least one additional antigen (herein referred to generically as "combination vaccine"). In a preferred embodiment, the at least one additional antigen is derived from a *Borrelia* species causing Lyme borreliosis. In various aspects, the at least one additional antigen is derived from another pathogen, preferably a tick-borne pathogen. In a further aspect, the pathogen causes Rocky Mountain spotted fever, Human granulocytic ehrlichiosis (HGE), *Sennetsu* Fever, Human Monocytic Ehrlichiosis (HME), Anaplasmosis, Boutonneuse fever, *Rickettsia parkeri* Rickettsiosis, Southern Tick-Associated Rash Illness (STARI), Helvetica Spotted fever, 364D Rickettsiosis, African spotted fever, Relapsing fever, Tularemia, Colorado tick fever, Tick-borne encephalitis (TBE, also known as FSME), Crimean-Congo hemorrhagic fever, Q fever, Omsk hemorrhagic fever, Kyasanur forest disease, Powassan encephalitis, Heartland virus disease or Babesiosis. In a further aspect, the disease is Japanese encephalitis. In a further embodiment, the at least one additional antigen is derived from a vector-borne, preferably a tick-borne, pathogen selected from the group comprising *Borrelia hermsii*, *Borrelia parkeri*, *Borrelia duttoni*, *Borrelia miyamotoi*, *Borrelia turicatae*, *Rickettsia rickettsii*, *Rickettsia australis*, *Rickettsia conori*, *Rickettsia helvetica*, *Francisella tularensis*, *Anaplasma phagocytophilum*, *Ehrlichia sennetsu*, *Ehrlichia chaffeensis*, *Neoehrlichia mikurensis*, *Coxiella burnetii* and *Borrelia lonestari*, Tick-borne encephalitis virus (TBEV aka FSME virus), Colorado tick fever virus (CTFV), Crimean-Congo hemorrhagic fever virus (CCHFV), Omsk Hemorrhagic Fever virus (OHFV), Japanese encephalitis virus (JEV) and *Babesia* spp.

In one embodiment, the composition for use according to the present invention provides the use in an elderly subject with a similar immunogenic profile as in a younger subject, comprises wherein said human adult is an elderly subject who is older than 50 years. The invention surprisingly provides that older adults (age group 50-65 years) have shown similar immune responses compared to younger adults (age group 18-49 years), without statistical significant differences. Refer to the experimental part.

In one embodiment, the composition for use according to the present invention comprises less than 1.25 ppb copper or a sufficient amount of L-methionine. Aluminum is an adjuvant often used in vaccination. The aluminum adjuvants typically comprise impurities, particularly heavy metals, such as copper, nickel and iron. The presence of these, particularly of coppers, lowers the bioavailability of the OspA protein in the vaccine. Without being bound to the theory it is assumed that the OspA protein binds to the aluminum and the heavy metal, particularly the copper, prevents the release, thus decreasing the bioavailability of the OspA protein in the vaccine. Therefore, the composition and in particular the aluminum adjuvant comprises less than 1.25 ppb copper. The unit ppb (part per billion) is often used in the field of mass spectrometry to quantify impurities. In case of aqueous solutions, 1 ppb means that 1 ng of substance (impurity) is present in 1 g solution, which means that 1 ppb equals 1 µg/l (assuming that 1 liter of solution has a weight of 1 kg). Typically, copper is in form of an ion, particularly as $Cu^+$ or $Cu^{2+}$. In a preferred embodiment, the composition comprises less than 1.00 ppb, less than 0.75 ppb or less than less than 0.50 ppb copper based on the weight of the aqueous composition. It is known that L-methionine is capable of binding to copper. The amount of L-methionine required will evidently depend from the amount of copper in the composition. The person skilled in the art will be capable of selecting a suitable amount of L-methionine. L-methionine may be used to complex excess copper in the composition for use in the present invention. A typical suitable concentration of L-methionine in the composition is at least 10 mmol/l. Depending on the amount of copper in the composition, the concentration may be even higher such as at least 20 mmol/l, at least 30 mmol/l, at least 40 mmol/l or at least 50 mmol/l or lower such as at most 10 mmol/l, at most 5 mmol/l or at most 1 mmol/l. Alternatively, the concentration of L-methionine is determined based on the concentration of copper in the composition. Particularly, the concentration of L-methionine in mol/l is at least equivalent with the concentration of copper in the composition. Alternatively, the concentration of L-methionine in mol/l is at least twice, threefold, fourfold, fivefold, or even tenfold, the concentration of copper in the composition.

In one embodiment, composition for use further comprises a reactive compound, wherein the reactive compound is selected from the group consisting of a redox active compound, a radical building compound, a stabilizing compound and a combination of any thereof. Without being bound to theory, antigen degradation of protein vaccines in aqueous compositions comprising heavy metal ions present in an aluminium salt, such as aluminium hydroxide, might be explained with an underlying degradation pathway assuming free-radicals such as e.g. free-radicals of sulphite.

Heavy metal-catalysed oxidation is a degradation pathway resulting in covalent modification of proteins. The modified physicochemical properties of the oxidized/modified protein or antigen may result in loss of biological activity. Redox active compounds are suitable to prevent this modification. Preferably, the reactive compound is selected from the group consisting of formaldehyde, ethanol, chloroform, trichloroethylene, acetone, triton-X-100, deoxycholate, diethylpyrocarbonate, sulphite, $Na_2S_2O_5$, beta-proprio-lacton, polysorbate such as Tween 20®, Tween 80®, $O_2$, phenol, pluronic type copolymers, and a combination of any thereof.

Further Embodiments of the Present Invention are as Follows

1. A method for vaccinating a human, the method comprising administering a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1)
   to a human adult at least three times at a total protein content of said 3 fusion proteins in the range of from 120 to 200 μg per dose; or
   to a human child at least three times at a total protein content of said 3 fusion proteins in the range of from 120 to 200 μg per dose or from 60 to 100 μg per dose.
2. A method for eliciting an immune response in a human against Lyme disease, the method comprising administering a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1)
   to a human adult at least three times at a total protein content of said 3 fusion proteins in the range of from 120 to 200 μg per dose; or
   to a human child at least three times at a total protein content of said 3 fusion proteins in the range of from 120 to 200 μg per dose or from 60 to 100 μg per dose.
3. The method according to embodiment 1 or embodiment 2, wherein the second administration is in the period of at least 6 weeks to at most 3 months after the first administration and/or the third administration is in the period of at least 5 months to at most 7 months after the first administration.
4. The method according to any of embodiments 1 to 3, wherein the second administration is in the period of at least 50 days to at most 70 days, particularly in the period of at least 55 days to at most 60 days, especially 56 days after the first administration; and/or wherein the third administration is in the period of at least 170 days to at most 190 days, in the period of at least 175 days to at most 185 days, especially 180 day, after the first administration.
5. The method according to any of embodiments 1 to 4, wherein a fourth administration of the composition is in the period of at least 15 months to at most 21 months, particularly in the period of at least 17 months to at most 19 months, especially 18 months, after the first administration.
6. The method according to any of embodiments 1 to 5, wherein the total protein content of said 3 fusion proteins is in the range of from 135 μg to 180 μg per dose, particularly 135 μg or 180 μg per dose for a human adult or child, or wherein the total protein content of said 3 fusion proteins is in the range of from 67.5 μg to 90 μg per dose, particularly 67.5 μg or 90 μg per dose for a young child.
7. The method according to any of embodiments 1 to 6, wherein the 3 fusion proteins comprise at least 60%, preferably at least 70%, more preferably at least 80% of all proteins in the composition.
8. The method according to any of embodiments 1 to 7, wherein the composition comprises the fusion proteins in a weight ratio of 1:1:1 (Lip-S1D1-S2D1: Lip-S4D1-S3hybD1: Lip-S5D1-S6D1).
9. The method according to any of embodiments 1 to 8, wherein the composition comprises an adjuvant.
10. The method according to any of embodiments 1 to 9, wherein the composition comprises an aluminum adjuvant.
11. The method according to any of embodiments 1 to 10, wherein the total protein content of said 3 fusion proteins is 135 μg per dose for a human adult or child, wherein the second administration is 56 days after the first administration, wherein the third administration is 180 days after the first administration, and wherein the optional fourth administration is 18 months after the first administration and optionally thereafter every 12 months.
12. The method according to any of embodiments 1 to 10, wherein the total protein content of said 3 fusion proteins is 67.5 μg per dose for a young child, wherein the second administration is 56 days after the first administration, wherein the third administration is 180 days after the first administration, and wherein the optional fourth administration is 18 months after the first administration and optionally thereafter every 12 months.
13. The method according to any of embodiments 1 to 10, wherein the total protein content of said 3 fusion proteins is 180 μg per dose for a human adult or child, wherein the second administration is 56 days after the first administration, wherein the third administration is 180 days after the first administration, and wherein the optional fourth administration is 18 months after the first administration and optionally thereafter every 12 months.
14. The method according to any of embodiments 1 to 10, wherein the total protein content of said 3 fusion proteins is 90 μg per dose for a young child, wherein the second administration is 56 day after the first administration, wherein the third administration is 180 days after the first administration, and wherein the optional fourth administration is 18 months after the first administration and optionally thereafter every 12 months.
15. The method according to any of embodiments 1 to 10, wherein the total protein content of said 3 fusion proteins is 135 μg per dose for a human adult or child, wherein the second administration is 2 months after the first administration, wherein the third administration is 6 months after the first administration, and wherein the optional fourth administration is 18 months after the first administration and optionally thereafter every 12 months.
16. The method according to any of embodiments 1 to 10, wherein the total protein content of said 3 fusion proteins is 67.5 μg per dose for a young child, wherein the second administration is 2 months after the first administration, wherein the third administration is 6 months after the first administration, and wherein the optional fourth administration is 18 months after the first administration and optionally thereafter every 12 months.

17. The method according to any of embodiments 1 to 10, wherein the total protein content of said 3 fusion proteins is 180 µg per dose for a human adult or child, wherein the second administration is 2 months after the first administration, wherein the third administration is 6 months the first administration, and wherein the optional fourth administration is 18 months after the first administration and optionally thereafter every 12 months.

18. The method according to any of embodiments 1 to 10, wherein the total protein content of said 3 fusion proteins is 90 µg per dose for a young child, wherein the second administration is 2 months after the first administration, wherein the third administration is 6 months after the first administration, and wherein the optional fourth administration is 18 months after the first administration and optionally thereafter every 12 months.

19. The method according to any of embodiments 1 to 18, wherein further administrations are every year after the last primary immunization or at the beginning of each tick season, particularly after 1 year, after 2 years and after 3 years and so on.

20. The method according to any of embodiments 1 to 19, wherein the immune response elicited comprises an anti-OspA serotype 1, an anti-OspA serotype 2, an anti-OspA serotype 3, an anti-OspA serotype 4, anti-OspA serotype 5 and/or an anti-OspA serotype 6 antibody response with bactericidal activity.

21. The method according to any of embodiments 1 to 20, wherein the immune response elicited comprises antibodies with bactericidal activity against OspA serotypes 1, 2, 3, 4, 5 and 6 expressing spirochetes.

22. The method according to any of embodiments 1 to 21, wherein the immune response against OspA serotypes 1, 2, 3, 4, 5 and 6 is sustained for at least about 60 days, for at least about 180 days, for at least about 365 days or for at least about 540 days.

23. The method according to any of embodiments 1 to 22, wherein the composition comprises less than 1.25 ppb copper or a sufficient amount of L-methionine.

24. The method according to any of embodiments 1 to 23, wherein copper is in form of an ion, particularly as $Cu^+$ or $Cu^{2+}$.

25. The method according to any of embodiments 1 to 24, wherein L-methionine is present in a concentration of at least 10 mmol/l.

26. The method according to any of embodiments 23 to 25, wherein the concentration of L-methionine in mol/l is at least equivalent with the concentration of copper in the composition.

27. The method according to any of embodiments 1 to 26, wherein the composition further comprises a reactive compound, wherein the reactive compound is selected from the group consisting of a redox active compound, a radical building compound, a stabilizing compound and a combination of any thereof, especially wherein the reactive compound is selected from the group consisting of formaldehyde, ethanol, chloroform, trichloroethylene, acetone, triton-X-100, deoxycholate, diethylpyrocarbonate, sulphite, $Na_2S_2O_5$, beta-propriolacton, polysorbate such as Tween 20®, Tween 80®, $O_2$, phenol, pluronic type copolymers, and a combination of any thereof.

28. The method according to any of embodiments 1 to 27, wherein said human adult is a subject who is 18 years or older, such as 18-65 years old.

29. The method according to any of embodiments 1 to 27, wherein said human adult is an elderly subject who is 50 years or older.

30. The method according to any of embodiments 1 to 27, wherein said human child is a subject who is 5-17 years old, such as 12-17 years old or 5-11 years old.

31. The method according to any of embodiments 1 to 27, wherein said human child is a subject who is 0-4 years old, such as 1-4 years old, or 2-4 years old.

32. The method according to any of embodiments 1 to 31, wherein said composition is administered to a human adult or child in a volume of 0.25 milliliter (ml) to 1.0 ml, such as 0.25 ml, 0.3 ml, 0.4 ml, 0.5 ml, 0.6 ml, 0.7 ml, 0.8 ml, 0.9 ml, or 1.0 ml.

33. The method according to any of embodiments 1 to 32, wherein said composition is administered to a human adult or child in a volume of 0.25 ml, 0.5 ml, or 1.0 ml.

34. A method for vaccinating a human, the method comprising administering a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1)
to a human adult at least two times at a total protein content of said 3 fusion proteins in the range of from 120 to 200 µg per dose; or
to a human child at least two times at a total protein content of said 3 fusion proteins in the range of from 120 to 200 µg per dose or from 60 to 100 µg per dose.

35. A method for eliciting an immune response in a human against Lyme disease, the method comprising administering a composition comprising the fusion protein of SEQ ID NO: 1 (Lip-S1D1-S2D1), the fusion protein of SEQ ID NO: 2 (Lip-S4D1-S3hybD1) and the fusion protein of SEQ ID NO: 3 (Lip-S5D1-S6D1)
to a human adult at least two times at a total protein content of said 3 fusion proteins in the range of from 120 to 200 µg per dose; or
to a human child at least two times at a total protein content of said 3 fusion proteins in the range of from 120 to 200 µg per dose or from 60 to 100 µg per dose.

36. The method according to embodiment 34 or embodiment 35, wherein the second administration is in the period of at least 5 months to at most 7 months after the first administration.

37. The method according to any of embodiments 34 to 36, wherein the second administration is in the period of at least 170 days to at most 190 days, in the period of at least 175 days to at most 185 days, especially 180 days, after the first administration.

38. The method according to any of embodiments 34 to 37, wherein a third administration of the composition is in the period of at least 15 months to at most 21 months, particularly in the period of at least 17 months to at most 19 months, especially 18 months, after the first administration.

39. The method according to any of embodiments 34 to 38, wherein the total protein content of said 3 fusion proteins is in the range of from 135 µg to 180 µg per dose, particularly 135 µg or 180 µg per dose, or wherein the total protein content of said 3 fusion proteins is in the range of from 67.5 µg to 90 µg per dose, particularly 67.5 µg or 90 µg per dose for a young child.

40. The method according to any of embodiments 34 to 39, wherein the 3 fusion proteins comprise at least 60%, preferably at least 70%, more preferably at least 80% of all proteins in the composition.

41. The method according to any of embodiments 34 to 40, wherein the composition comprises the fusion proteins in a weight ratio of 1:1:1 (Lip-S1D1-S2D1: Lip-S4D1-S3hybD1: Lip-S5D1-S6D1).

42. The method according to any of embodiments 34 to 41, wherein the composition comprises an adjuvant.

43. The method according to any of embodiments 34 to 42, wherein the composition comprises an aluminum adjuvant.

44. The method according to any of embodiments 34 to 43, wherein the total protein content of said 3 fusion proteins is 135 µg per dose for a human adult or child, wherein the second administration is 180 days after the first administration, and wherein the optional third administration is 18 months after the first administration and optionally thereafter every 12 months.

45. The method according to any of embodiments 34 to 43, wherein the total protein content of said 3 fusion proteins is 67.5 µg per dose for a young child, wherein the second administration is 180 days after the first administration, and wherein the optional third administration is 18 months after the first administration and optionally thereafter every 12 months.

46. The method according to any of embodiments 34 to 43, wherein the total protein content of said 3 fusion proteins is 180 µg per dose for a human adult or child, wherein the second administration is 180 days after the first administration, and wherein the optional third administration is 18 months after the first administration and optionally thereafter every 12 months.

47. The method according to any of embodiments 34 to 43, wherein the total protein content of said 3 fusion proteins is 90 µg per dose for a young child, wherein the second administration is 180 days after the first administration, and wherein the optional third administration is 18 months after the first administration and optionally thereafter every 12 months.

48. The method according to any of embodiments 34 to 43, wherein the total protein content of said 3 fusion proteins is 135 µg per dose for a human adult or child, wherein the second administration is 6 months after the first administration, and wherein the optional third administration is 18 months after the first administration and optionally thereafter every 12 months.

49. The method according to any of embodiments 34 to 43, wherein the total protein content of said 3 fusion proteins is 67.5 µg per dose for a young child, wherein the second administration is 6 months after the first administration, and wherein the optional third administration is 18 months after the first administration and optionally thereafter every 12 months.

50. The method according to any of embodiments 34 to 43, wherein the total protein content of said 3 fusion proteins is 180 µg per dose for a human adult or child, wherein the second administration is 6 months the first administration, and wherein the optional third administration is 18 months after the first administration and optionally thereafter every 12 months.

51. The method according to any of embodiments 34 to 43, wherein the total protein content of said 3 fusion proteins is 90 µg per dose for a young child, wherein the second administration is 6 months after the first administration, and wherein the optional third administration is 18 months after the first administration and optionally thereafter every 12 months.

52. The method according to any of embodiments 34 to 51, wherein further administrations are every year after the last primary immunization or at the beginning of each tick season, particularly after 1 year, after 2 years and after 3 years and so on.

53. The method according to any of embodiments 34 to 52, wherein the immune response elicited comprises an anti-OspA serotype 1, an anti-OspA serotype 2, an anti-OspA serotype 3, an anti-OspA serotype 4, anti-OspA serotype 5 and/or an anti-OspA serotype 6 antibody response with bactericidal activity.

54. The method according to any of embodiments 34 to 53, wherein the immune response elicited comprises antibodies with bactericidal activity against OspA serotypes 1, 2, 3, 4, 5 and 6 expressing spirochetes.

55. The method according to any of embodiments 34 to 54, wherein the immune response against OspA serotypes 1, 2, 3, 4, 5 and 6 is sustained for at least about 60 days, for at least about 180 days, for at least about 365 days or for at least about 540 days.

56. The method according to any of embodiments 34 to 55, wherein the composition comprises less than 1.25 ppb copper or a sufficient amount of L-methionine.

57. The method according to any of embodiments 34 to 56, wherein copper is in form of an ion, particularly as $Cu^+$ or $Cu^{2+}$.

58. The method according to any of embodiments 34 to 57, wherein L-methionine is present in a concentration of at least 10 mmol/l.

59. The method according to any of embodiments 56 to 58, wherein the concentration of L-methionine in mol/l is at least equivalent with the concentration of copper in the composition.

60. The method according to any of embodiments 34 to 59, wherein the composition further comprises a reactive compound, wherein the reactive compound is selected from the group consisting of a redox active compound, a radical building compound, a stabilizing compound and a combination of any thereof, especially wherein the reactive compound is selected from the group consisting of formaldehyde, ethanol, chloroform, trichloroethylene, acetone, triton-X-100, deoxycholate, diethylpyrocarbonate, sulphite, $Na_2S_2O_5$, beta-propriolacton, polysorbate such as Tween 20®, Tween 80®, $O_2$, phenol, pluronic type copolymers, and a combination of any thereof.

61. The method according to any of embodiments 34 to 60, wherein said human adult is a subject who is 18 years or older, such as 18-65 years old.

62. The method according to any of embodiments 34 to 60, wherein said human adult is an elderly subject who is 50 years or older.

63. The method according to any of embodiments 34 to 60, wherein said human child is a subject who is 5-17 years old, such as 12-17 years old or 5-11 years old.

64. The method according to any of embodiments 34 to 60, wherein said human child is a subject who is 0-4 years old, such as 1-4 years old, or 2-4 years old.

65. The method according to any of embodiments 34 to 64, wherein said composition is administered to a human adult or child in a volume of 0.25 milliliter (ml) to 1.0 ml, such as 0.25 ml, 0.3 ml, 0.4 ml, 0.5 ml, 0.6 ml, 0.7 ml, 0.8 ml, 0.9 ml, or 1.0 ml.

66. The method according to any of embodiments 34 to 65, wherein said composition is administered to a human adult or child in a volume of 0.25 ml, 0.5 ml, or 1.0 ml.

The terms "comprising", "comprise" and "comprises" herein are intended by the inventors to be optionally substitutable with the terms "consisting of", "consist of" and "consists of", respectively, in every instance. The term "comprises" means "includes". Thus, unless the context requires otherwise, the word "comprises", and variations such as "comprise" and "comprising" will be understood to imply the inclusion of a stated compound or composition (e.g., nucleic acid, polypeptide, antibody) or step, or group of compounds or steps, but not to the exclusion of any other compounds, composition, steps, or groups thereof. The abbreviation, "e.g." is derived from the Latin exempli gratia, and is used herein to indicate a non-limiting example. Thus, the abbreviation "e.g." is synonymous with the term "for example".

Unless otherwise explained, all technical and scientific terms used herein have the same meaning as commonly understood by one of ordinary skill in the art to which this disclosure belongs. Definitions of common terms in molecular biology can be found in Benjamin Lewin, Genes V, published by Oxford University Press, 1994 (ISBN 0-19-854287-9); Kendrew et al. (eds.), The Encyclopedia of Molecular Biology, published by Blackwell Science Ltd., 1994 (ISBN 0-632-02182-9); and Robert A. Meyers (ed.), Molecular Biology and Biotechnology: a Comprehensive Desk Reference, published by VCH Publishers, Inc., 1995 (ISBN 1-56081-569-8).

The singular terms "a", "an", and "the" include plural referents unless context clearly indicates otherwise. Similarly, the word "or" is intended to include "and" unless the context clearly indicates otherwise. The term "plurality" refers to two or more. It is further to be understood that all base sizes or amino acid sizes, and all molecular weight or molecular mass values, given for nucleic acids or polypeptides are approximate, and are provided for description. Additionally, numerical limitations given with respect to concentrations or levels of a substance, such as an antigen, may be approximate.

The present invention is further illustrated by the following Figures, Tables and Examples, from which further features, embodiments and advantages may be taken. As such, the specific modifications discussed are not to be construed as limitations on the scope of the invention. It will be apparent to the person skilled in the art that various equivalents, changes, and modifications may be made without departing from the scope of the invention, and it is thus to be understood that such equivalent embodiments are to be included herein.

EXAMPLES

Materials and Methods

Tick challenge method The Tick Challenge Method is carried out by applying at least one tick nymph (e.g., *I. ricinus*) infected with *Borrelia* (e.g., *B. afzelii*, strain IS1), to a mouse that is immunized with the multivalent *Borrelia* vaccine of the invention or pretreated with human sera; and b) applying at least one infected tick nymph to a second mouse that is treated with an appropriate placebo (negative) control, such as buffer or adjuvant alone; and c) comparing the rates of infection in the two mice, generally four to six weeks after challenge. Preferably, groups of mice (e.g. 5-10 mice/groups) are used for each treatment. Assessment of infection status can be done using VIsE ELISA on sera and/or qPCR on collected tissues as described in WO2014006226, or using other suitable methods.

Needle challenge method The Needle Challenge Method is carried out for the desired *Borrelia* strain (e.g., *B. burgdorferi*, strain N40) by subcutaneously introducing *Borrelia* at a dose between 20-50× the Infectious Dose $(ID)_{50}$ to mice that are immunized with the multivalent *Borrelia* vaccine of the invention or pretreated with human sera, or with an appropriate placebo (negative) control, such as buffer or adjuvant alone and comparing the rates of infection in the challenged mice. The $ID_{50}$, measured in numbers of bacteria, is defined as the dose at which 50% of untreated challenged mice are infected. The challenge dose can vary widely and is strain-dependent; therefore, the virulence of the strain must first be assessed by challenge experiments for determination of $ID_{50}$. Four weeks after needle challenge, blood and tissues are collected for readout methods to determine the infection status. The readout methods can be e.g. VIsE ELISA on sera and/or qPCR on collected tissues for identification of *Borrelia*, as described in WO2014006226, or other methods.

Spirochete antibody binding assay Spirochetes $1\times10^5$-$1\times10^6$ are mixed with an equal volume of 4% paraformaldehyde and incubated for 20 minutes at room temperature in a 96-well plate (Nunclon 96U, Nunc). The plate is centrifuged for 5 minutes at 2,000 g and the supernatant discarded. Cells are washed with 150 µL Hanks' Balanced Salt Solution with 2% BSA (HBSS-B), centrifuged as above, and the supernatant is discarded. Sera are heat inactivated by incubating them at 56° C. for 35 minutes. Heat-inactivated sera are diluted in HBSS-B and sterile filtered by centrifuging at 17,000 g for 3 minutes using Costar spin-X centrifuge tube filters (0.22 µm, Corning, USA). Spirochetes are suspended in 100 µL serum and incubated for 45 minutes at room temperature. Plates are centrifuged for 5 minutes at 2,000 g and the supernatant discarded. The cells are washed once with 150 µL HBSS-B and resuspended in 100 µL HBSS-B with a PE-conjugated secondary antibody diluted 1:150. One microliter of an appropriate secondary antibody (e.g.— PE conjugated anti-mouse or anti-human IgG, available from Beckman Coulter, USA) is added to the cells and incubated at room temperature for 45 minutes in the dark. Spirochetes are washed once with 150 µL HBSS-B and resuspended in 200 µL HBSS containing 10 µg LDS 751 DNA dye and incubated for 10 minutes at room temperature in the dark. The stained spirochetes are pelleted by centrifuging for 5 minutes at 2,000 g and subsequently resuspended in 200 µL HBSS. Labelled spirochetes are measured with a CytoFlex (Beckman Coulter) flow cytometer, gated for LDS 751 positive events.

The serum bactericidal assay (SBA) measures vaccine-induced antibodies' ability to kill bacteria in conjunction with exogenously added complement (FIG. 1). Vaccine-induced antibodies recognize surface-exposed antigens on spirochetes and recruit complement, which is activated mostly via the classical pathway, resulting in the formation of membrane attacking complex, bacteriolysis and eventually death of the target bacteria. Serum samples are 2-fold serially diluted with BSK-II medium, subsequently mixed with *Borrelia* obtained from an overnight culture and guinea pig or baby rabbit complement (source and final concentration depending on the serotype 1-25%) in BSK-II medium, in a white 96-well assay plate. The plate is then incubated at +32° C., 5% $CO_2$ for 3-6 days (dependent on *Borrelia* serotype). The amount of live (metabolically active) *Borre-*

*lia* is determined at the end of the assay by measuring ATP dependent light emission with a luciferase-based reaction (BacTiter-Glo, Promega). Human serum pools serve as positive quality controls (QCs), while a commercially available naïve human serum serves as a negative control (NC). To calculate the sample titer, each sample dilution is compared to the corresponding dilution of the negative human serum (NC) for which relative light units are set to 100%. The SBA titer of a test sample is the reciprocal of the highest serum dilution to induce≤50% viability. For Serotype 1, 2, 4, 5, 6 values below the quantitation limit of the SBA (titer of 20) are replaced by titer of 10. For Serotype 3 values below the quantitation limit of the SBA (titer of 160) are replaced by titer of 80.

OspA serotype-specific Human Serum IgG Enzyme-linked immunosorbent assay (ELISA) The IgG geometric mean titers for OspA serotype-specific antibodies were determined by ELISA. Plates were coated with full-length lipidated OspA from ST1, ST2, ST3, ST4, ST5 or ST6. Serial dilutions of trial sera, reference substance (RS) and QC samples were prepared from human serum pool. A blank control was also used. Bound antibodies were detected with human IgG-specific secondary antibody conjugate. OspA-specific IgG concentrations were calculated using SoftMax Pro 5.2 GxP software. Parallel line analysis curves are created individually for each sample tested against the Reference Substance. The relative potency given in these curves is used for calculation of the IgG concentration (U/mL) of the sample compared to the Reference Substance concentration curve. Modifications were made in the ELISA assay from the Phase 1 trial to the Phase 2 trial (see Table A-1). The quantification limit of the ELISA used in the Phase 1 trial (Example 1) was 20 ELISA units (EU)/mL (also referred to herein as U/mL); values <20 EU/mL were replaced by a value of 10 EU/mL. The slightly altered ELISA used in the first Phase 2 trial (Example 2) had a quantification limit of 40 EU/mL; values <40 EU/mL were replaced by a value of 20 EU/mL.

TABLE A-1

Differences in IgG determination (ELISA) in Phase 1 and Phase 2 clinical trials

| | Phase 1 | Phase 2 |
|---|---|---|
| Coating antigen | His-tagged lipidated full length OspA (0.5 µg/mL) | lipidated full-length OspA (0.5 µg/mL) |
| QC | Monoclonal Ab | Polyclonal human serum pools |
| Reference Substance (RS) | Phase 1 serum pool | New RS prepared from Phase 1 booster samples |
| Lower limit of quantification (LLOQ) | 20 U/mL | 40 U/mL |
| Seroconversion (SC) | Seroconversion rate is defined as proportion of subjects achieving a ≥4-fold rise in IgG antibody titer from Day 0. | Seroconversion is defined as change from seronegative to seropositive (≥40 U/mL), or ≥4-fold rise in IgG antibody titer from Day 0. |

Example 1. Phase 1 Clinical Trial with Multivalent *Borrelia* Vaccine

Phase 1 Clinical Trial Design and Immunogenicity Results

Figure 2:
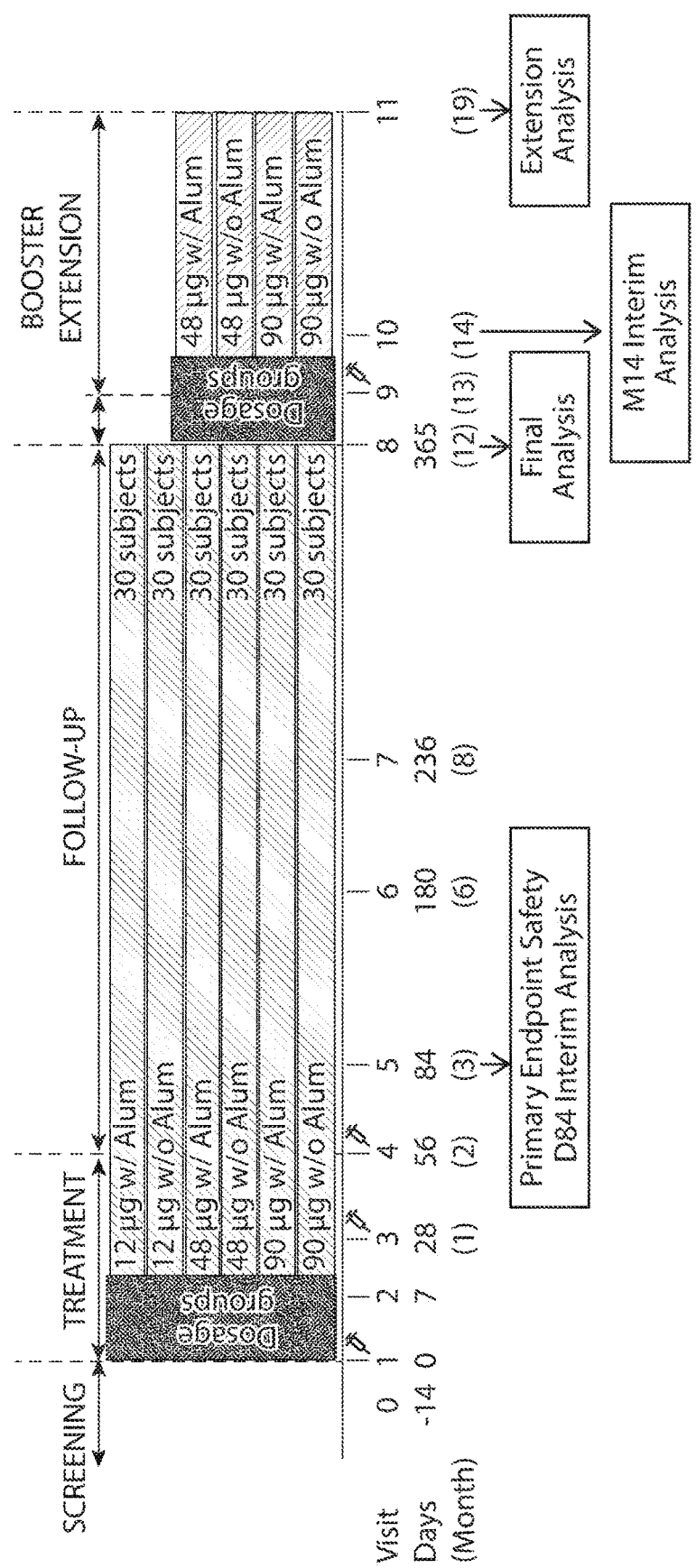
FIG. 2. Study design (First-in-human phase 1 study), including a booster at 13 months in selected subjects from the high-dose group (booster extension).

A first-in-human, observer-blinded, partially randomized, multi-center dose escalation Phase I clinical study was undertaken, with the aim to investigate the safety and immunogenicity of different doses of the multimeric *Borrelia* vaccine ("MBV") of the invention with and without aluminium hydroxide. The study was conducted in healthy adults aged 18 to 39 years who were baseline seronegative for *Borrelia burgdorferi* sensu lato (i.e., subjects that were previously not infected with *Borrelia*). The trial design is shown in FIG. 2. Briefly, the safety characteristics and immunogenicity of three intramuscular vaccinations delivered 28 days apart were evaluated using six different treatments (3 dose levels, each with and without adjuvant) in 179 healthy subjects (i.e., approx. 30 subjects per treatment group). All formulations contained each of the OspA fragment polypeptides (SEQ ID Nos: 1, 2 and 3) at a 1:1:1 weight ratio (e.g.—the low dose (12 µg) contained 4 µg each of the lipidated polypeptides defined by SEQ ID Nos: 1, 2 and 3).

Phase 1 Trial Dose Groups (Vaccinated I.M. d0, d28, d56):
12 µg with Alum (n=29)
12 µg without Alum (n=29)
48 µg with Alum (n=31)
48 µg without Alum (n=29)
90 µg with Alum (n=31)
90 µg without Alum (n=30)

Figure 3A:
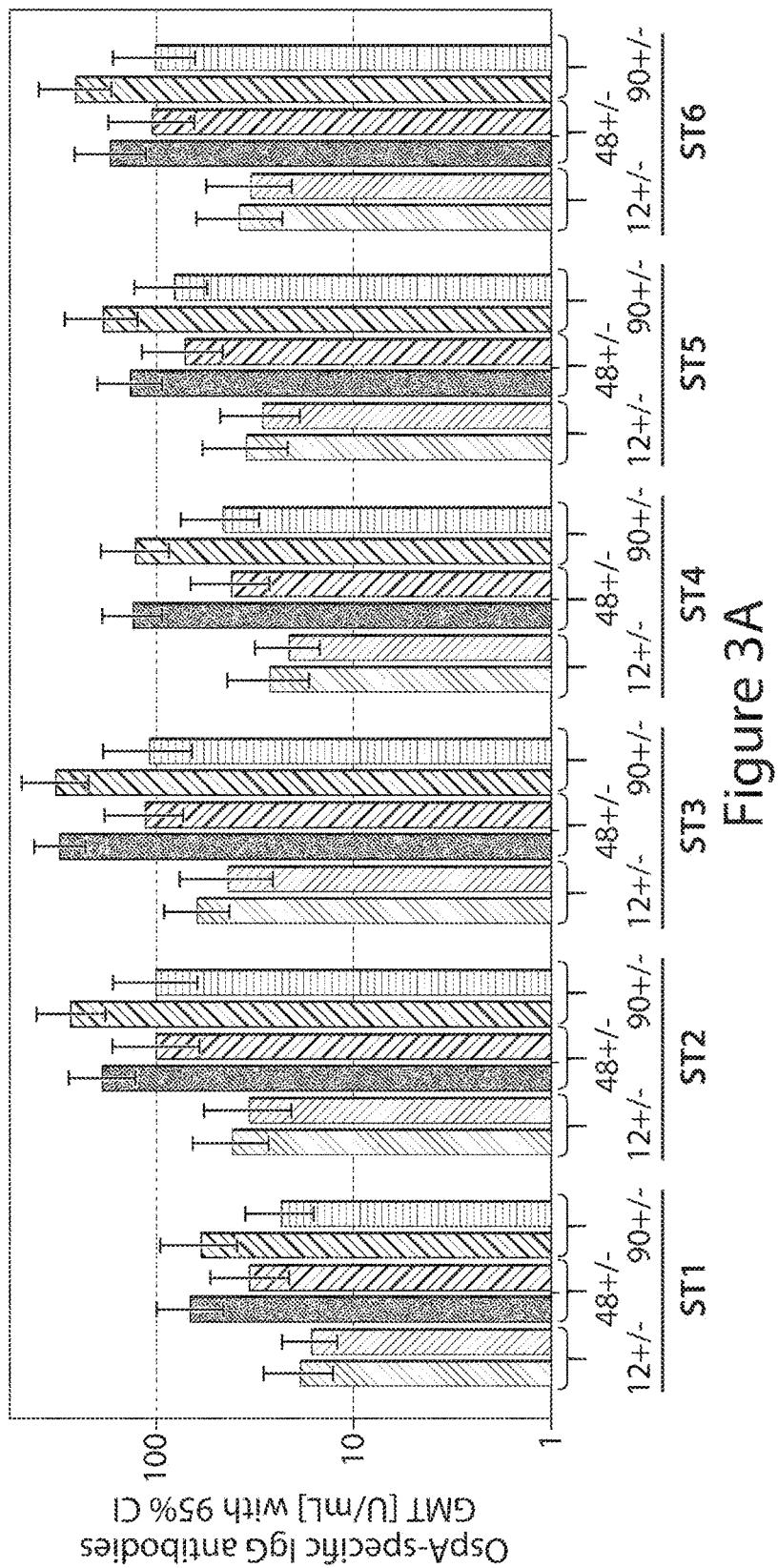
FIGS. 3A-3B. Phase 1 data: Immunogenicity data at day 84, Per-Protocol (PP) population (i.e. subjects that received all three immunizations at correct dose and correct timing according to protocol), for each serotype FIG. 3A) IgG geometric mean titer (GMT) and FIG. 3B) Seroconversion Rate, defined as percentage of subjects reaching a ≥4-fold increase in IgG titer from baseline.
Figure 3B:
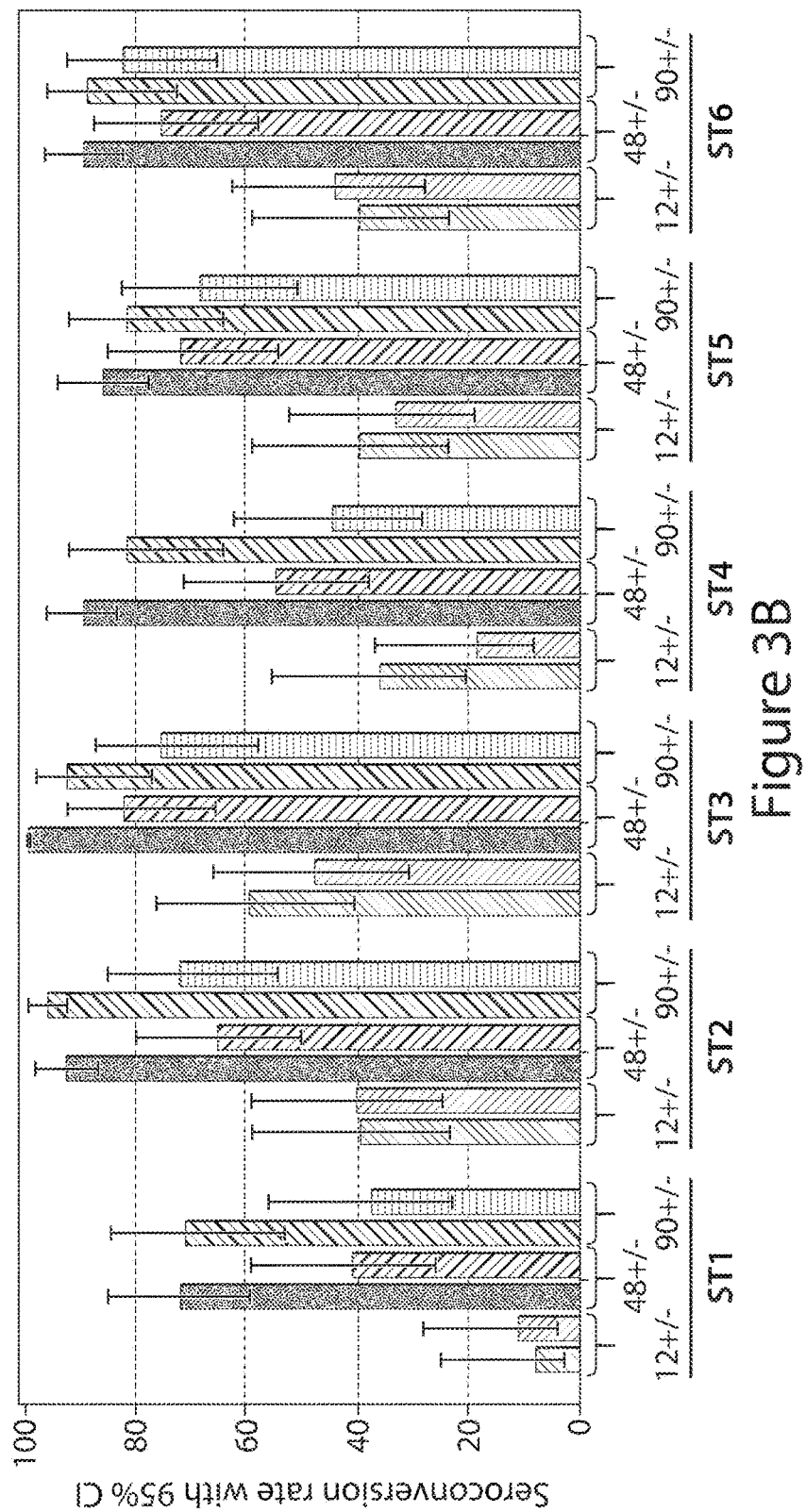
Figure 4B:
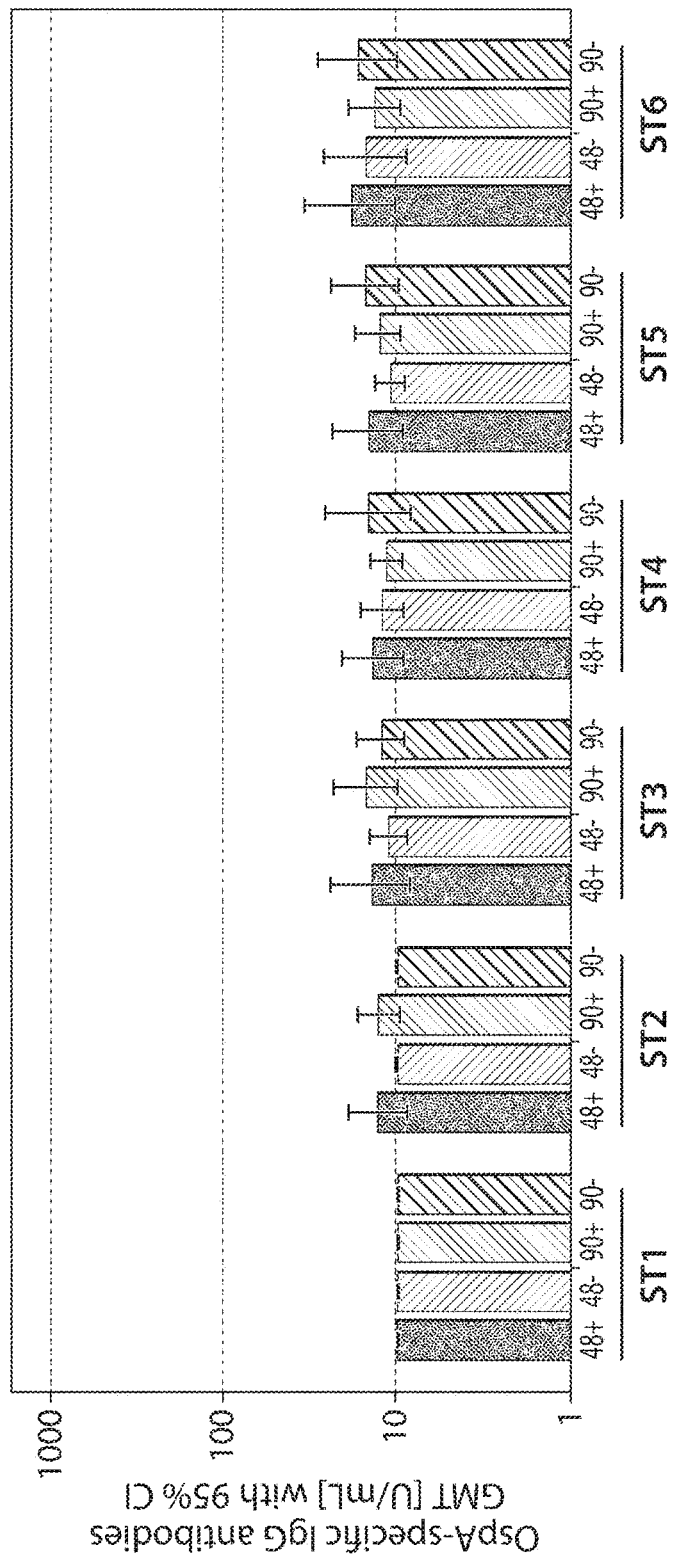
Figure 4D:
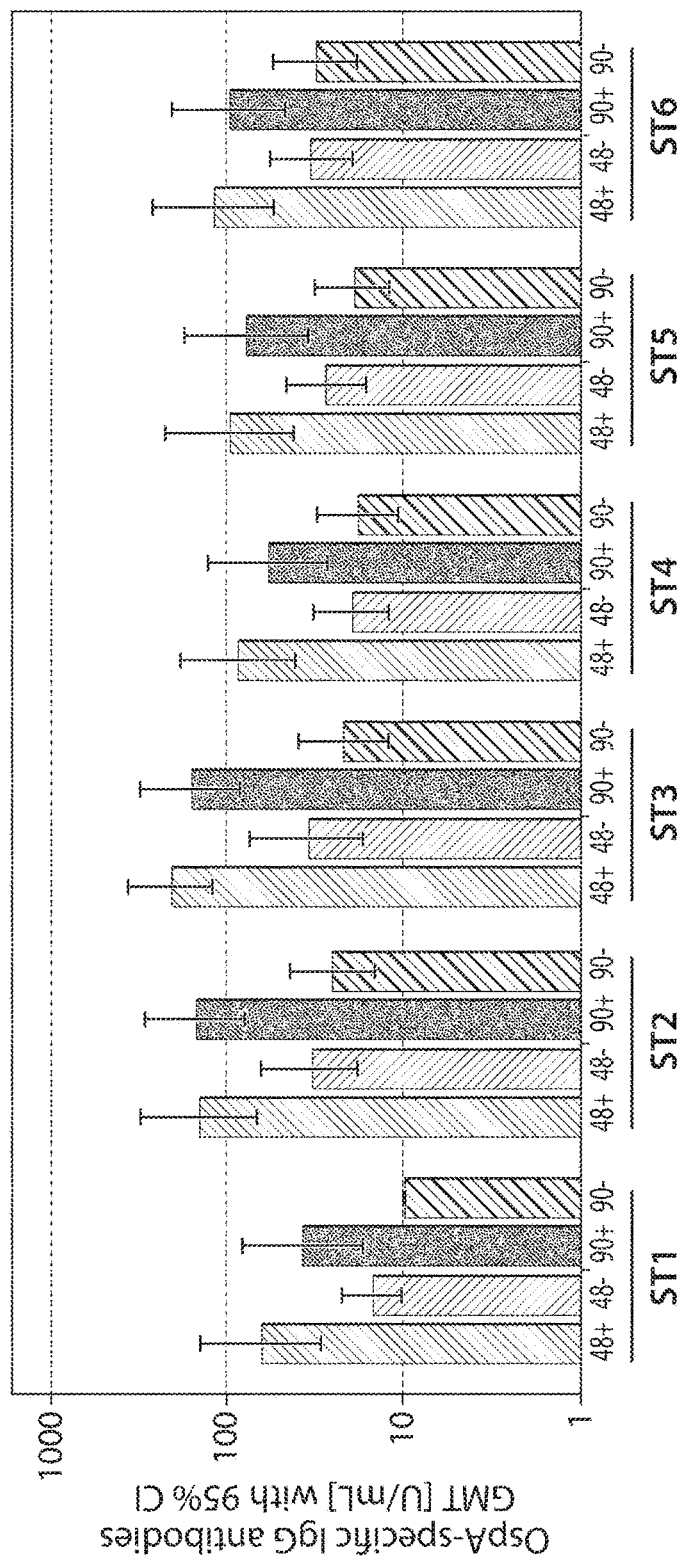
Figure 5A:
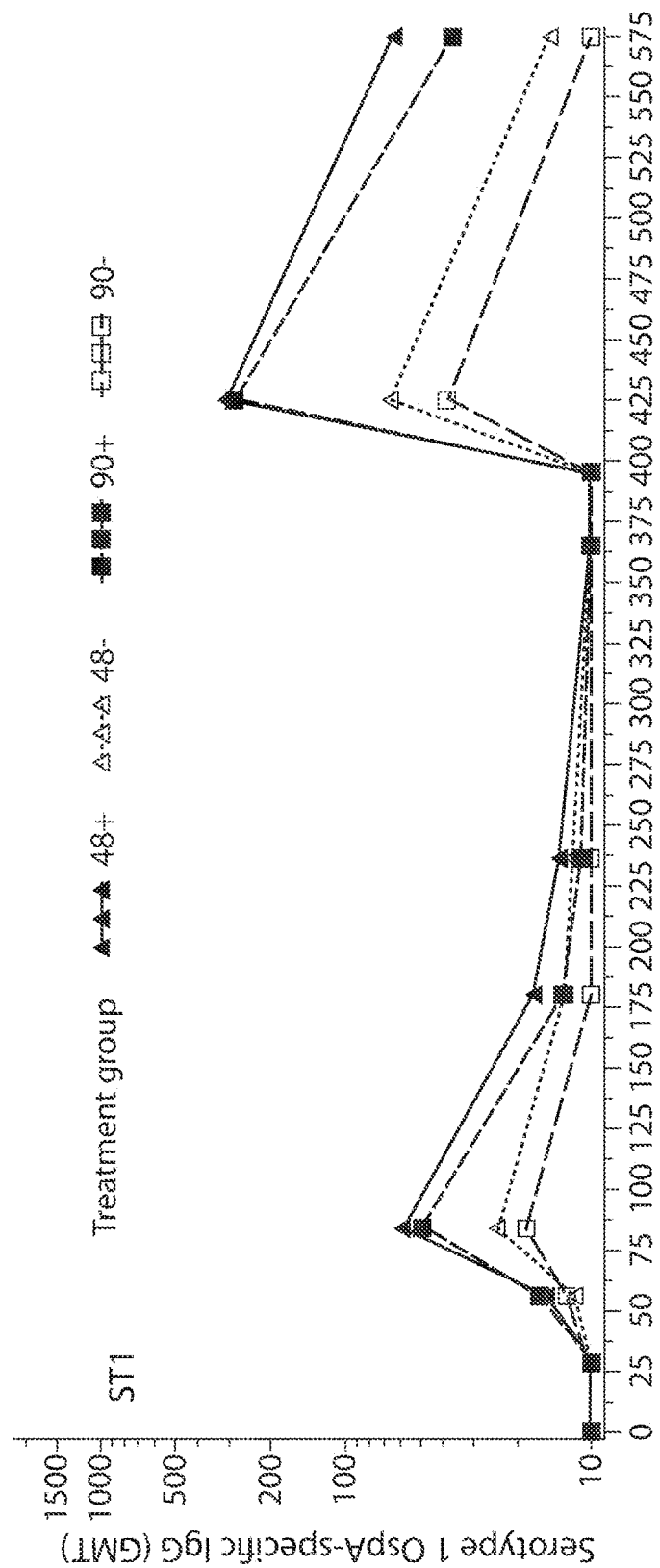
FIGS. 5A-5F. Phase 1 data: Serotype-specific IgG GMT values, Booster PP population, over time FIG. 5A) ST1, FIG. 5B) ST2, FIG. 5C) ST3, FIG. 5D) ST4, FIG. 5E) ST5, FIG. 5F) ST6.
Figure 5B:
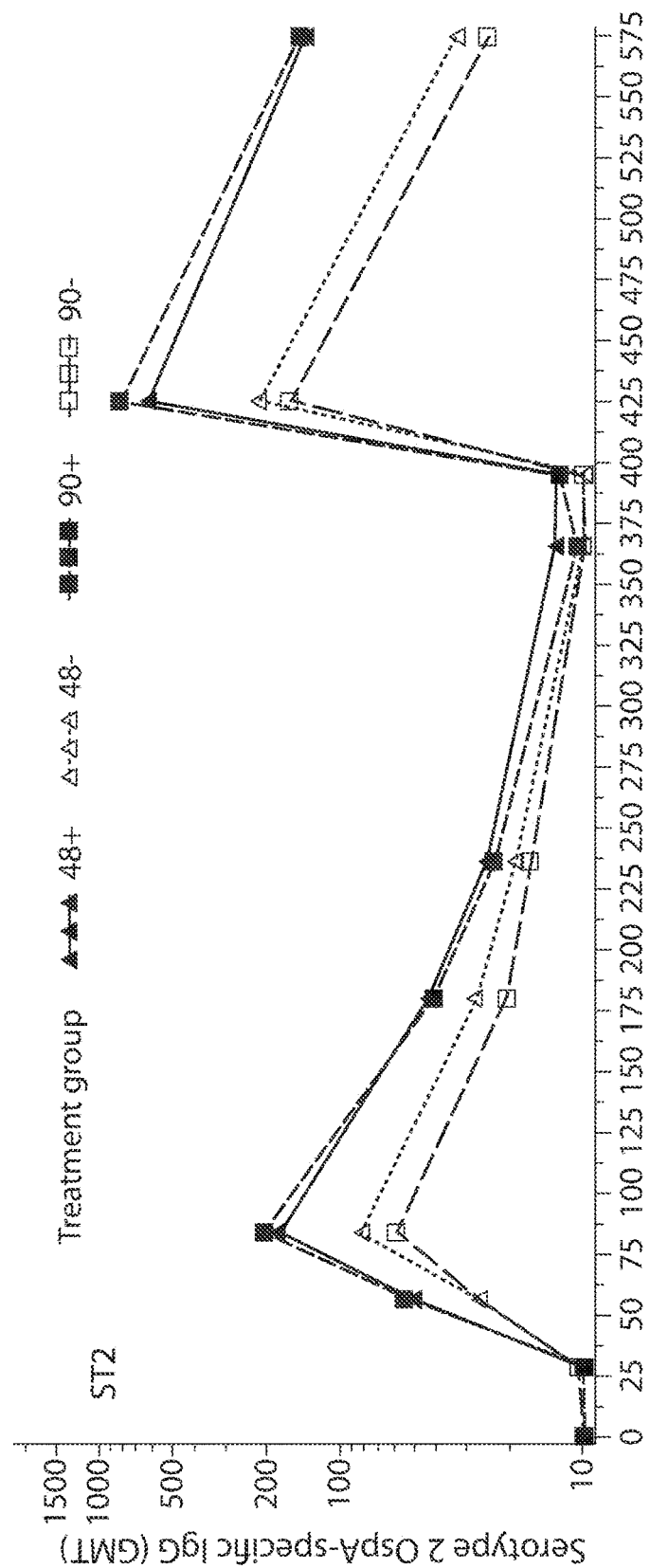
Figure 5C:
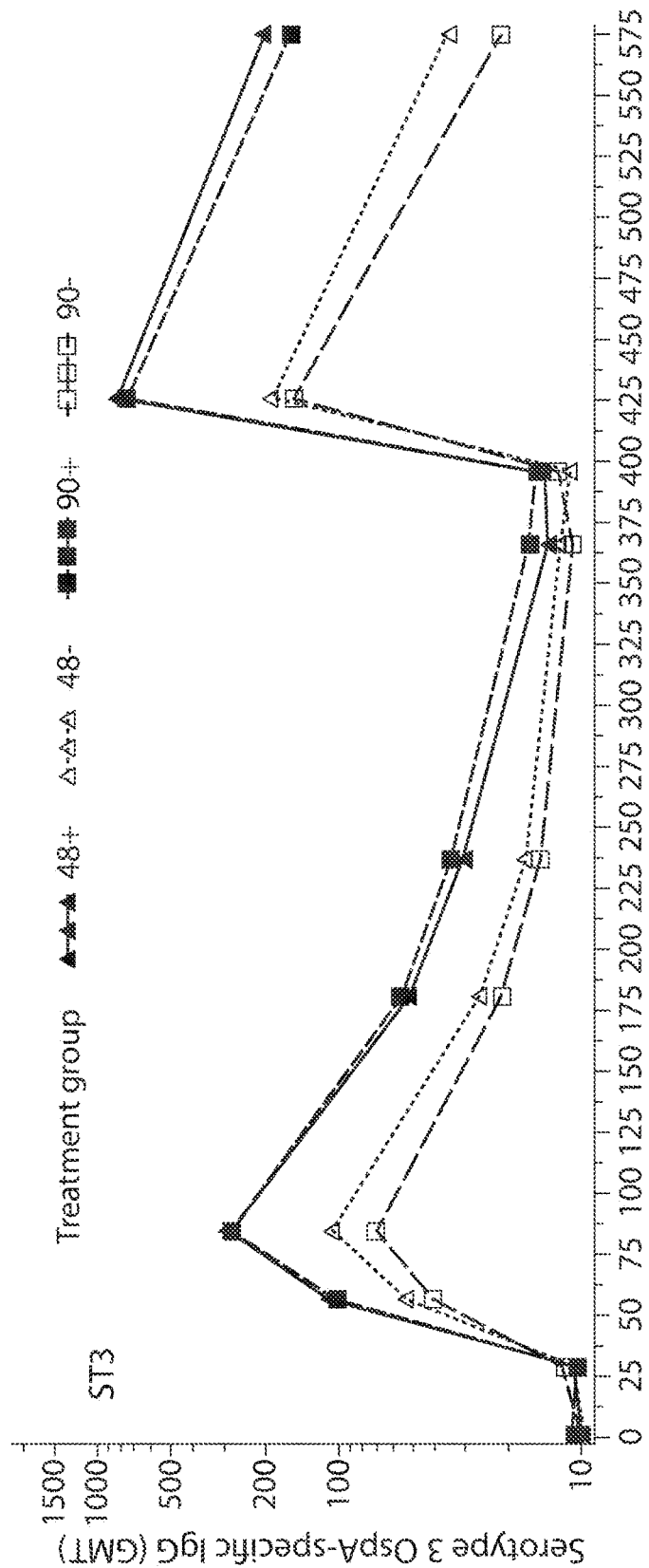
Figure 5D:
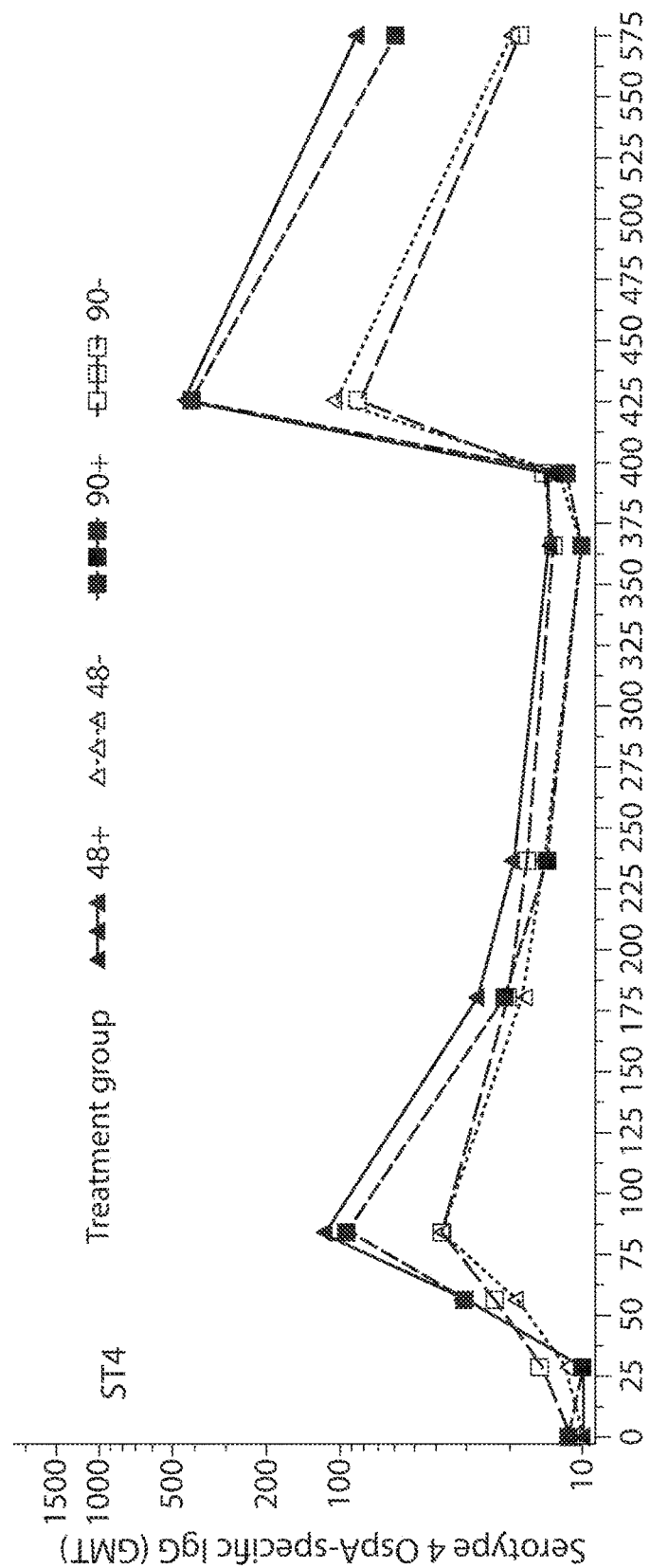
Figure 5E:
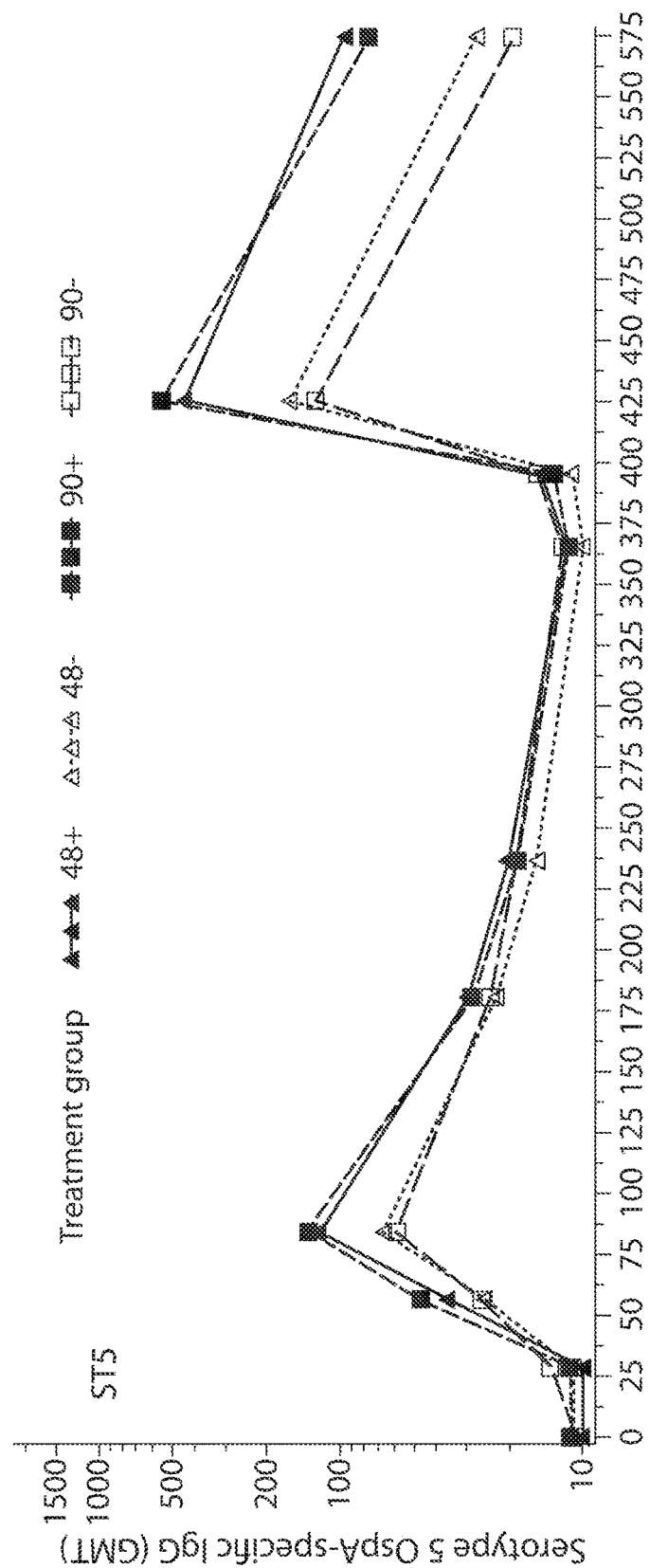
Figure 5F:
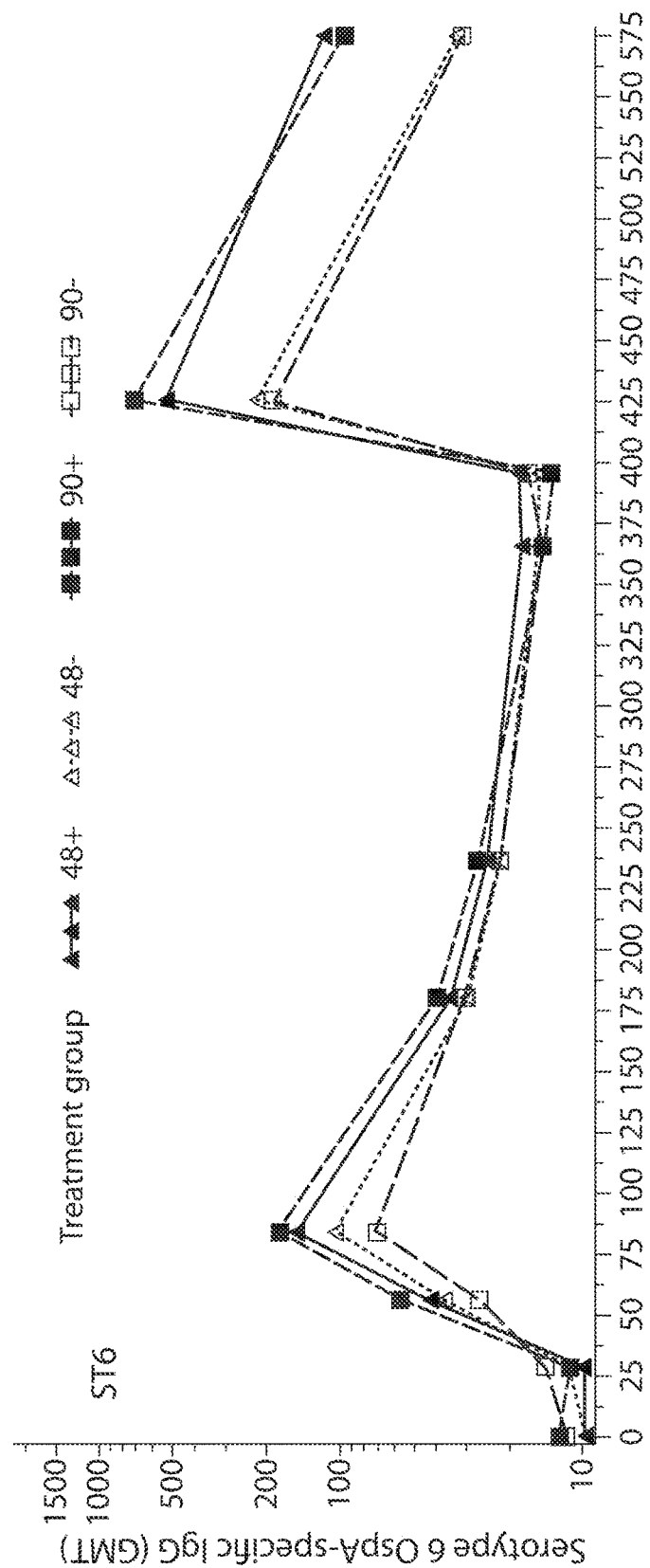

Immunogenicity was assessed in all groups at days 0, 28, 57 84, 180, 236 and 365 with peak antibody titers expected at day 84 (i.e., 4 weeks after the third vaccination, primary endpoint analysis). Geometric mean titers against each OspA serotype at day 84 are shown in FIG. 3A. FIG. 3B shows seroconversion rates (i.e. rate of subjects that seroconvert) for each group, wherein seroconversion is defined as a ≥4-fold increase in IgG titer from baseline.

Booster extension phase On the basis of results from the day 84 analysis, the 48 µg and 90 µg dosage groups with or without adjuvant were selected to receive a booster vaccination at approximately Month 13 with a further 6 months follow-up for safety and antibody persistence. The booster doses administered were the same doses and formulations as for priming. The booster extension part of this study was conducted at one of three study sites only, leading to substantially lower subject number of N=64 subjects in the booster phase.

Phase 1 Trial Booster Extension Dose Groups (Boosted I.M. Month 13):
48 µg with Alum (n=15)
48 µg without Alum (n=16)
90 µg with Alum (n=16)
90 µg without Alum (n=17)

Immunogenicity was assessed at months 13 (pre-boost), 14 and 19 in the booster extension groups. The objectives of the booster extension were to investigate the safety and immunogenicity of a booster dose of Vaccine A applied approximately one year after the last immunization of the primary schedule up to six months after application of the booster dose. Another use of the booster extension was to generate high titer sera for functional assay development and potential proof-of-concept (PoC) studies. Furthermore, the booster allowed collection of safety and immunogenicity data of a booster dose early in clinical development.

The IgG GMT values of subjects included in the primary analysis of the booster extension phase (Booster PP population) at Day 84 and Months 13, 14 and 19 are shown in FIGS. 4A-D, respectively, and in Table 1 below. Geometric mean fold rise (GMFR) of IgG titer compared to pre-booster time point (month 13) and compared to peak titer after primary vaccination series (day 84) as well as seroconversion rates for day 84, month 13 and month 14 are provided in Table 2 and Table 3, respectively. For comparison of the groups with respect to immune responses to each of the six serotypes over the duration of the entire study, GMT values of the subjects included in the booster extension phase (Booster PP population, i.e., subjects enrolled in booster extension phase and received correct booster dose at correct timing according to protocol) over the duration of the study are provided in FIGS. 5A-F.

1, with higher immunogenicity observed for the higher dose groups and for the adjuvanted formulations. A booster dose applied approx. one year after finalization of the primary vaccination series resulted in a substantial booster response (i.e., IgG titers were substantially higher at 4 weeks after booster dose as compared to 4 weeks after completion of the

TABLE 1

GMTs of serotype specific IgG titer on Day 84, M 13, M 14 and M 19, Booster PP population.

| | GMT [U/mL] | | | | | | | | | | | | | | | |
|---|---|---|---|---|---|---|---|---|---|---|---|---|---|---|---|---|
| | 48 µg + Alum | | | | 48 µg − Alum | | | | 90 µg + Alum | | | | 90 µg − Alum | | | |
| | | | | | | | | Timepoint | | | | | | | | |
| | D 84 | M 13 | M 14 | M 19 | D 84 | M 13 | M 14 | M 19 | D 84 | M 13 | M 14 | M 19 | D 84 | M 13 | M 14 | M 19 |
| ST1 | 60 | 10 | 305 | 64 | 24 | 10 | 66 | 15 | 49 | 10 | 286 | 37 | 18 | 10 | 39 | 10 |
| ST2 | 185 | 12 | 640 | 144 | 84 | 10 | 221 | 34 | 212 | 13 | 840 | 152 | 60 | 10 | 167 | 25 |
| ST3 | 292 | 13 | 832 | 208 | 109 | 12 | 194 | 35 | 283 | 15 | 763 | 161 | 72 | 12 | 156 | 22 |
| ST4 | 116 | 12 | 436 | 87 | 38 | 12 | 105 | 20 | 95 | 12 | 416 | 59 | 38 | 13 | 84 | 18 |
| ST5 | 125 | 13 | 455 | 96 | 67 | 11 | 164 | 28 | 136 | 13 | 558 | 78 | 59 | 14 | 129 | 19 |
| ST6 | 154 | 18 | 523 | 119 | 106 | 15 | 223 | 34 | 180 | 15 | 713 | 98 | 72 | 15 | 189 | 32 |

TABLE 2

Geometric mean fold rise (GMFR) of serotype specific IgG titer, on Month 14 and Month 19, compared to Month 13 (pre-boost) and Day 84 (peak antibody titer after primary immunization series), Booster PP population.

| | GMFR | | | | | | | | | | | | | | | |
|---|---|---|---|---|---|---|---|---|---|---|---|---|---|---|---|---|
| | 48 µg + Alum | | | | 48 µg − Alum | | | | 90 µg + Alum | | | | 90 µg − Alum | | | |
| | | | | | | | | Month | | | | | | | | |
| | M 14 | M 14 | M 19 | M 19 | M 14 | M 14 | M 19 | M 19 | M 14 | M 14 | M 19 | M 19 | M 14 | M 14 | M 19 | M 19 |
| | | | | | | | | Compared to timepoint | | | | | | | | |
| | M 13 | D 84 | M 13 | D 84 | M 13 | D 84 | M 13 | D 84 | M 13 | D 84 | M 13 | D 84 | M 13 | D 84 | M 13 | D 84 |
| ST1 | 31 | 5 | 6 | 1.1 | 7 | 2 | 2 | 0.6 | 29 | 6 | 4 | 0.7 | 4 | 2 | 1 | 0.5 |
| ST2 | 54 | 4 | 12 | 0.8 | 22 | 2 | 3 | 0.4 | 67 | 4 | 12 | 0.7 | 17 | 3 | 3 | 0.4 |
| ST3 | 66 | 3 | 17 | 0.7 | 15 | 2 | 3 | 0.3 | 52 | 3 | 11 | 0.6 | 13 | 2 | 2 | 0.3 |
| ST4 | 35 | 4 | 7 | 0.7 | 10 | 3 | 2 | 0.5 | 36 | 4 | 5 | 0.6 | 6 | 2 | 1 | 0.5 |
| ST5 | 35 | 4 | 7 | 0.8 | 15 | 2 | 3 | 0.4 | 44 | 4 | 6 | 0.6 | 9 | 2 | 1 | 0.3 |
| ST6 | 30 | 3 | 7 | 0.8 | 17 | 2 | 3 | 0.3 | 49 | 4 | 7 | 0.5 | 13 | 3 | 2 | 0.5 |

TABLE 3

Seroconversion Rates (SCRs) per serotype at Day 84, M 13, M 14 and M 19, Booster PP population.

| | SCR [%] | | | | | | | | | | | | | | | |
|---|---|---|---|---|---|---|---|---|---|---|---|---|---|---|---|---|
| | 48 µg + Alum | | | | 48 µg − Alum | | | | 90 µg + Alum | | | | 90 µg − Alum | | | |
| | | | | | | | | Timepoint | | | | | | | | |
| | D 84 | M 13 | M 14 | M 19 | D 84 | M 13 | M 14 | M 19 | D 84 | M 13 | M 14 | M 19 | D 84 | M 13 | M 14 | M 19 |
| ST1 | 67 | 0 | 93 | 67 | 31 | 0 | 57 | 20 | 63 | 0 | 94 | 50 | 29 | 0 | 47 | 0 |
| ST2 | 87 | 0 | 100 | 87 | 69 | 0 | 86 | 47 | 94 | 0 | 100 | 88 | 59 | 0 | 82 | 38 |
| ST3 | 100 | 13 | 100 | 100 | 88 | 13 | 86 | 53 | 94 | 13 | 94 | 88 | 65 | 6 | 82 | 38 |
| ST4 | 80 | 7 | 93 | 73 | 56 | 0 | 79 | 33 | 75 | 0 | 88 | 63 | 29 | 6 | 82 | 19 |
| ST5 | 80 | 13 | 93 | 73 | 75 | 0 | 86 | 33 | 75 | 6 | 100 | 69 | 59 | 12 | 82 | 25 |
| ST6 | 80 | 13 | 93 | 80 | 81 | 13 | 86 | 47 | 88 | 13 | 100 | 75 | 71 | 12 | 82 | 31 |

Figure 6A:
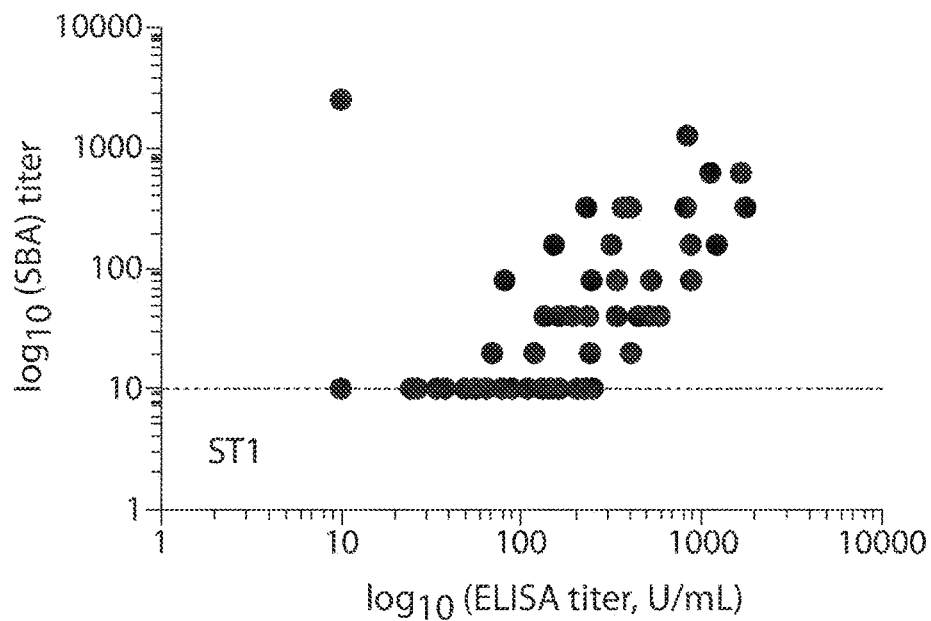
FIGS. 6A-6C. Phase 1 data: Comparison of ELISA titers with SBA titers.
Figure 6B:
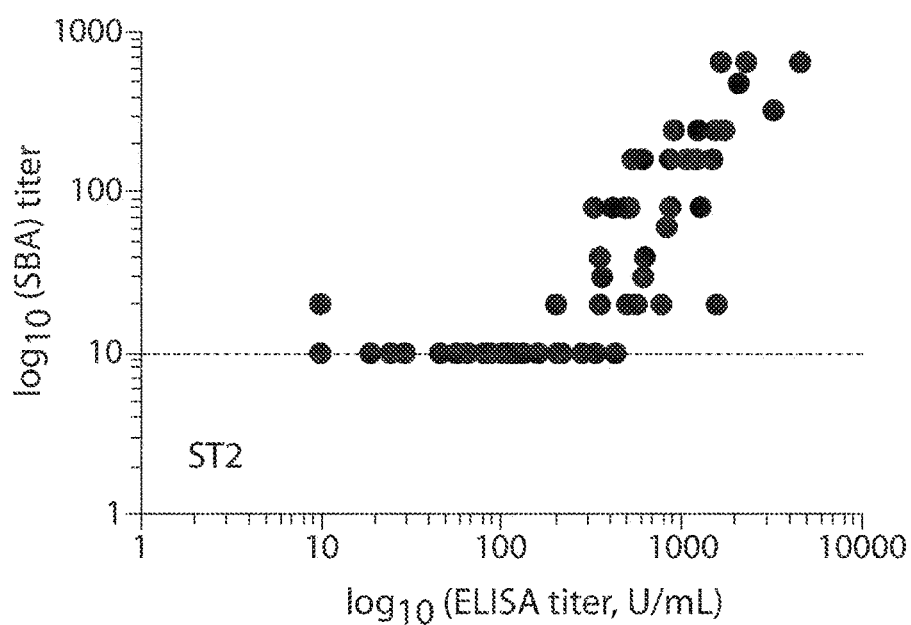
Figure 6C:
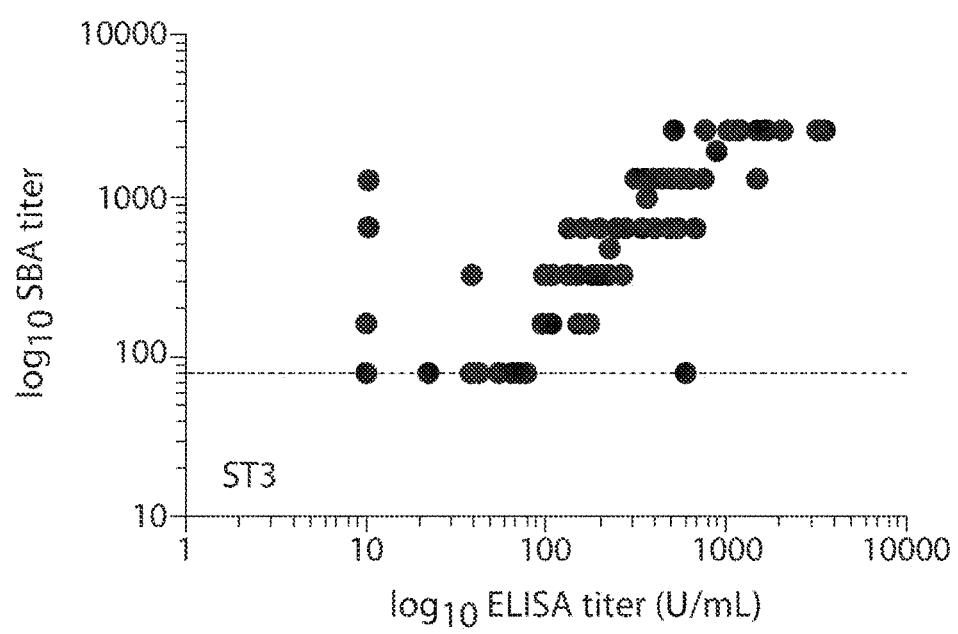

Correlation of ELISA and SBA Titers in Phase 1 serum samples The serotype-specific serum bactericidal assay (SBA-see Materials and Methods), an in vitro correlate of protection for clinical samples, yielded values that correlated closely with ELISA values for serotypes 1, 2 and 3 in individual subject sera, as shown in FIGS. 6A, B and C, respectively.

In summary, serotype specific IgG antibodies were induced with all doses and formulation investigated in phase 1 primary immunization). For all six OspA serotypes and were sustained at higher levels through month 19 (Table 3). As sustained circulating antibody levels are of high importance for the efficacy of OspA-based vaccines, a further dose increase and alternative schedules were introduced in Phase 2, with the aim to induce an earlier, higher and more durable immune response.

Figure 7:
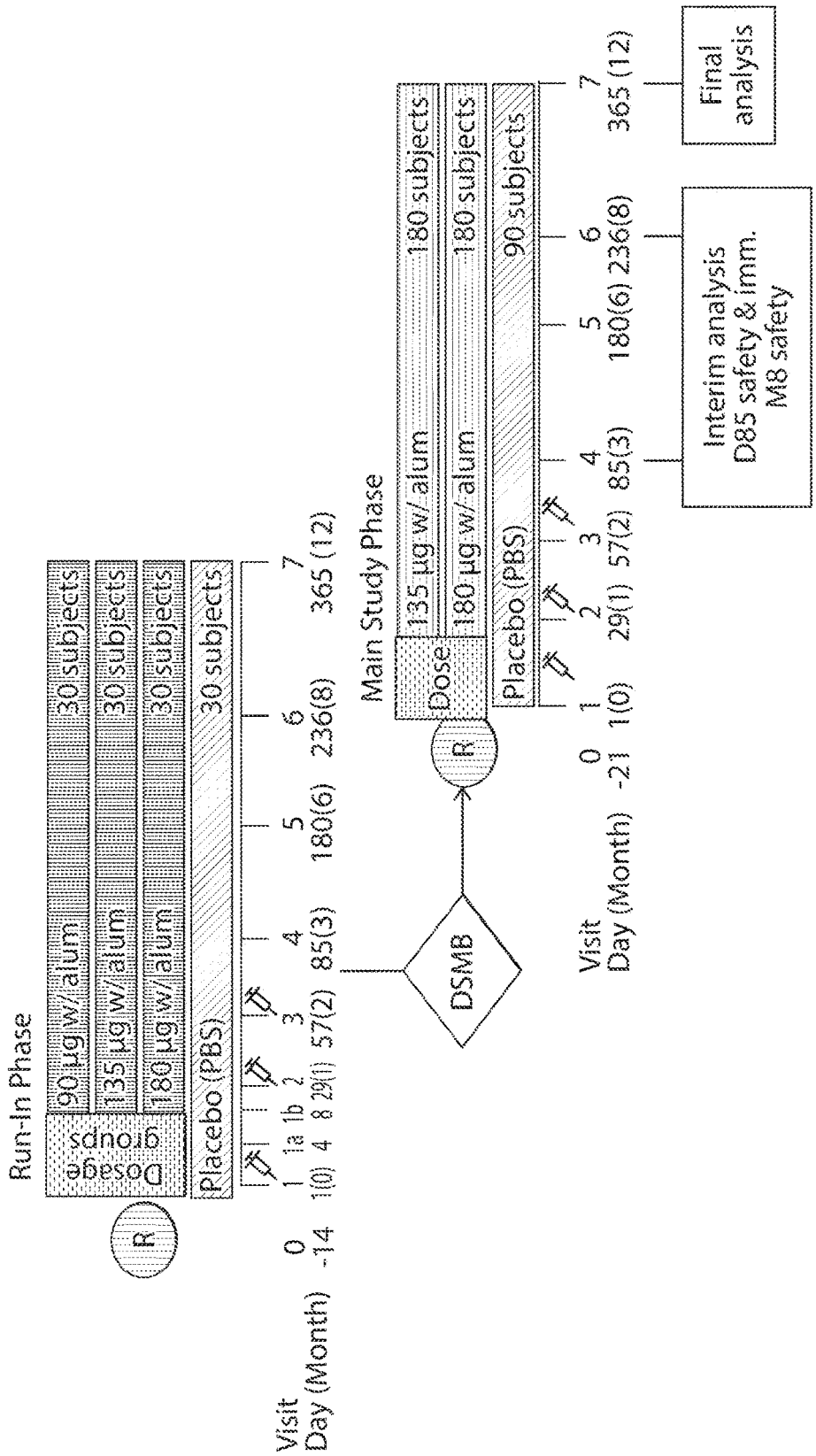
FIG. 7. First Phase 2 study: Study design (of first phase 2 trial) for the multivalent *Borrelia* vaccine of the invention, investigating 3 adjuvanted Vaccine A doses (90 µg, 135 µg and 180 µg) in a "Run-in phase" and 2 selected dose groups (135 µg, 180 µg) in a "Main Study phase".

Example 2. Phase 2 Clinical Trial with Multivalent *Borrelia* Vaccine Investigating Higher Doses of the Vaccine Phase 2 Clinical Trial Design and Summary of Preliminary Descriptive Immunogenicity Data from the Run-In Phase An observer-blinded, randomized, placebo controlled, multicenter phase 2 study is currently ongoing with the aim to investigate the safety and immunogenicity of a range of higher doses of the multimeric *Borrelia* vaccine adjuvanted with aluminium hydroxide in healthy adults aged 18 to 65 years. Subjects who were baseline seronegative for *Borrelia burgdorferi* sensu lato (i.e., subjects that were previously not infected with *Borrelia*) as well as subjects who were baseline seropositive for *Borrelia burgdorferi* sensu lato (i.e., subjects that were previously infected with *Borrelia*) were enrolled in this study. The study consists of a safety run-in phase (ages 18-40, N=120 subjects) in order to investigate the safety of the three dose levels of 90 µg, 135 µg and 180 µg multimeric *Borrelia* vaccine ("MBV") of the invention with and without alum initially in a smaller population prior to initiating the main study phase (ages 18-65, N=450 subjects) (see FIG. 7) with the two higher dose groups of 135 µg and 180 µg. Subject received three I.M. vaccinations one month apart (i.e., Month 0-1-2). In the main study phase subjects were enrolled in two age groups (18-49 years and 50-65 years) in a ratio of approx. 2:1. The main objectives of the Phase 2 trial are to assess the immunogenicity and safety of the multimeric *Borrelia* vaccine in healthy adults aged 18-65 years with the higher dose levels as compared to the first-in-human trial and to determine the optimal dose of the vaccine. All formulations contained each of the OspA fragment polypeptides (SEQ ID Nos: 1, 2 and 3) at a 1:1:1 weight ratio (e.g.—the low dose (90 µg) contained 30 µg each of the lipidated polypeptides defined by SEQ ID Nos: 1, 2 and 3, the high dose (180 µg) contained 60 µg each of the lipidated polypeptides defined by SEQ ID Nos: 1, 2 and 3).

Run-in phase A total of 120 healthy subjects aged 18 to 40 years were to be enrolled into four treatment groups (vaccinated I.M. d1, d29, d57): 90 µg of the multimeric *Borrelia* vaccine ("MBV") of the invention with Alum, 135 µg the MBV with Alum, 180 µg MBV with Alum, Placebo (PBS), approximately 30 subjects per treatment group. After Data Safety Monitoring Board (DSMB) review of safety data up to Day 85, these two higher dose groups (i.e., 135 µg and 180 µg) were selected for further investigation in the Main Study phase. Sera are collected at Day 1, 29, 57, 85 (primary immunogenicity analysis), 180, 236 and 365 and will be assessed for immunogenicity by ELISA and SBA (selected time points in a representative subset of subjects).

A preliminary descriptive analysis of immunogenicity data from the run-in phase revealed that the multivalent *Borrelia* vaccine was immunogenic at all dose levels tested in the run-in phase. The preliminary GMT titers (ELISA) in the 90 µg w/alum group were comparable to those obtained in the Phase 1 trial at the same dose level. A dose-response was observed, with the lowest IgG titers in the 90 µg dose group and the highest titers in the 180 µg dose group for all serotypes. The dose increase compared with Phase 1 resulted in an increased peak immune response after primary immunization, as anticipated. However antibody levels declined relatively substantially up to Day 180 in all dose groups. Given the observed decline in antibody titers after the primary series in the Phase 2 run-in phase, future development of the multimeric *Borrelia* vaccine should consider a broader Month 0-2-6 schedule. Based on experience with other vaccines, this is expected to result in even higher peak titers and importantly better persistence and may also improve antibody quality.

Main phase A total of 450 healthy subjects aged 18 to 65 years were to be enrolled into three treatment groups (vaccinated I.M D1, d29, d57): 135 µg with Alum (n=approx. 180), 180 µg with Alum (n=approx. 180), Placebo (PBS) (n=approx. 90). A first data analysis was performed which included pooled immunogenicity data (GMTs of OspA serotype specific IgG by ELISA) from Day 85 of the main study phase and run in phase. Functionality of antibodies at Day 85 was assessed using a Serum Bactericidal Assay (SBA). The data confirmed the preliminary data analysis of the run-in phase in terms of higher antibody titers after completion of the primary immunization series, i.e., higher antibody levels were achieved at Day 85 with the 135 µg (GMTs range from 101.1 [ST1] to 282.2 [ST3]) and the 180 µg dose groups (GMTs range from 115.8 [ST1] to 308.6 [ST3]) as compared to the 90 µg dose group investigated in the run in phase (GMTs range from 74.3 [ST1] to 267.4 [ST3]). Data reveal that older adults (age group 50-65 years) which are one of the high risk groups for acquiring Lyme disease have also shown an encouraging immune response, without statistical significant differences between the two age groups. Refer to Table 4 for a summary of immunogenicity data.

Furthermore, the *Borrelia* vaccine as set out above (OspA fragment polypeptides (SEQ ID Nos: 1, 2 and 3) at a 1:1:1 weight ratio (e.g.—the low dose (90 µg) contained 30 µg each of the lipidated polypeptides defined by SEQ ID Nos: 1, 2 and 3, the high dose (180 µg) contained 60 µg each of the lipidated polypeptides defined by SEQ ID Nos: 1, 2 and 3) was immunogenic across all dose groups tested. Higher doses used in this trial elicited higher antibody responses across all serotypes compared to Phase 1. Seroconversion rates (SCR) in the highest dose ranged from 81.5% (ST1) to 95.8% (ST2). In the age group comparable to the age group investigated in Phase 1 (18-49 yrs) SCRs ranged from 85.6% to 97% (previous study: 71.4% to 96.4%). The immunological response in older adults, one of the main target groups for a Lyme vaccine, is particularly encouraging. Results did not indicate that prior exposure to Lyme (seropositivity) has an impact on immunogenicity or safety.

Said *Borrelia* vaccine was generally safe across all dose and age groups tested. No related Serious Adverse Events (SAEs) were observed with *Borrelia* vaccine in this study in any treatment group. Reactogenicity decreased with subsequent vaccinations.

Overall the tolerability profile including rates of fever appeared to be comparable to other lipidated recombinant vaccines or lipid-containing formulations.

TABLE 4

Day 85 GMT first Phase 2 study (schedule Month 0-1-2), PP population

| | Run-In Phase | Subjects from Run in Phase and Main Study Phase | | | | | |
|---|---|---|---|---|---|---|---|
| | 90 µg | 135 µg | | | 180 µg | | |
| | 18-40 years N = 26 [EU/mL] | 18-49 years N = 129 [EU/mL] | 50-65 years N = 59 [EU/mL] | 18-65 years N = 188 [EU/mL] | 18-49 years N = 132 [EU/mL] | 50-65 years N = 57 [EU/mL] | 18-65 years N = 189 [EU/mL] |
| ST1 | 74.3 | 103.8 | 95.4 | 101.1 | 129.6 | 89.2 | 115.8 |
| ST2 | 180.9 | 292.7 | 245.2 | 276.9 | 322.1 | 265.0 | 303.7 |
| ST3 | 267.4 | 293.4 | 259.1 | 282.2 | 334.2 | 256.5 | 308.6 |
| ST4 | 117.0 | 175.1 | 158.5 | 169.7 | 206.8 | 158.1 | 190.7 |
| ST5 | 118.3 | 178.8 | 165.8 | 174.6 | 218.3 | 162.1 | 199.6 |
| ST6 | 115.6 | 184.4 | 178.5 | 182.6 | 225.6 | 174.3 | 208.7 |

Seroconversion rates (SCRs) at Day 85 are depicted in Table 12. In the 90 µg dose, SCRs ranged from 65.4% (ST1) to 96.2 (ST3), in the 135 µg dose, SCRs ranged from 80.9% (ST1) to 98.4 (ST2) and in the 180 µg group SCRs ranged from 81.5% (ST1) to 95.8% (ST3).

TABLE 12

Day 85 SCRs (ELISA) first Phase 2 study (schedule Month 0-1-2), PP population

| | 90 µg N = 29 (%) | 135 µg N = 188 (%) | 180 µg N = 189 (%) |
|---|---|---|---|
| ST1 | 65.4 | 80.9 | 81.5 |
| ST2 | 88.5 | 98.4 | 95.2 |
| ST3 | 96.2 | 97.3 | 95.8 |
| ST4 | 80.8 | 94.1 | 93.7 |
| ST5 | 80.8 | 91.0 | 90.5 |
| ST6 | 80.8 | 93.1 | 91.5 |

Functionality of antibodies has been demonstrated for all serotypes using a serum bactericidal assay (SBA-see Materials and Methods). GMTs at Day 85 are summarized in Table 13.

TABLE 13

GMTs for functional antibodies as measured by SBA on Day 85 (schedule Month 0-1-2).

| | 135 µg N = 84 SBA Titer | 180 µg N = 86 SBA Titer |
|---|---|---|
| ST1 | 17.5 | 21.4 |
| ST2 | 14.9 | 17.6 |
| ST3 | 737.6 | 700.1 |
| ST4 | 21.9 | 25.8 |
| ST5 | 23.2 | 24.4 |
| ST6 | 100.2 | 152.4 |

ELISA titer correlated significantly with respective SBA titer for each OspA serotype and individual subject sera, as shown in FIGS. 9A-9F. Spearman correlation coefficients ranged from 0.5737, p-value <0.0001, for serotype 4 to 0.9030, p-value <0.0001, for serotype 3.

Figure 8:
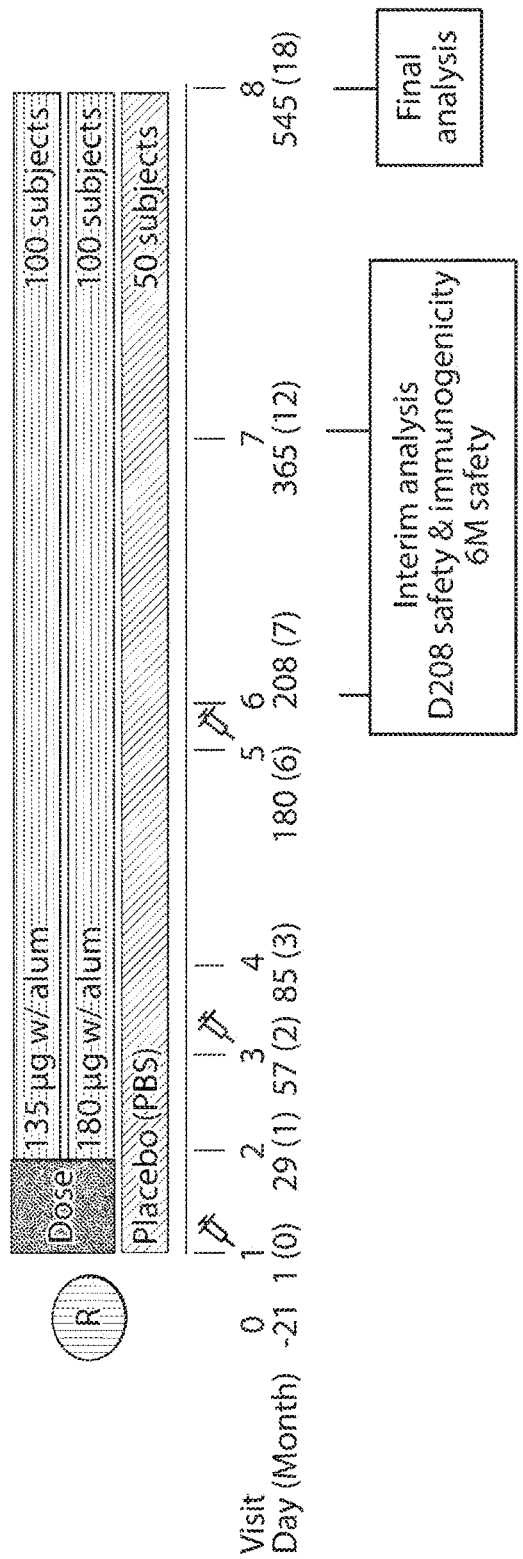
FIG. 8. Second Phase 2 study: Study design of second phase 2 trial for the multivalent *Borrelia* vaccine of the invention investigating an alternative immunization schedule.
Figure 9A:
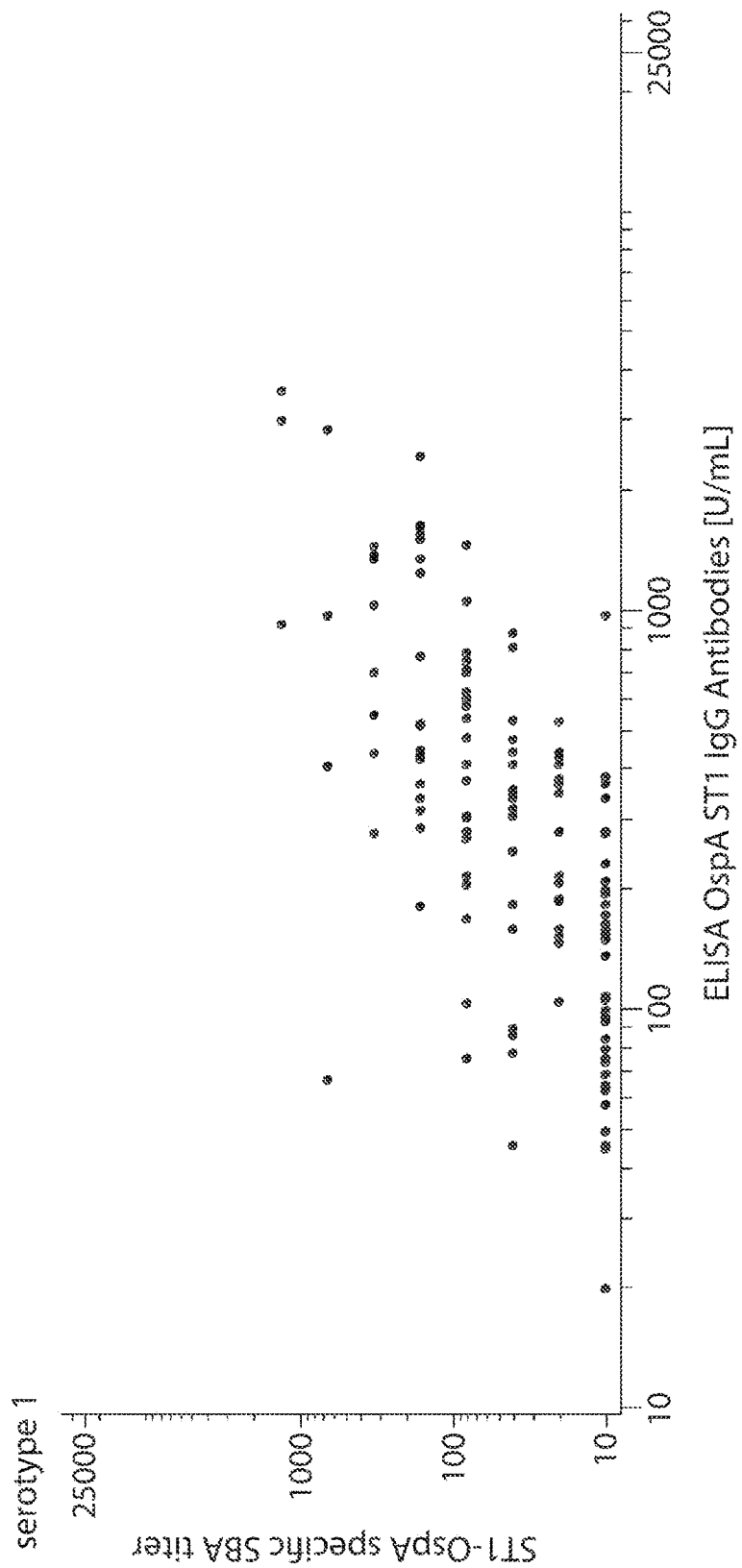
FIGS. 9A-9F. Correlation ELISA-SBA titer, Day 208, pooled multimeric *Borrelia* vaccine treatment groups, PP population w/o baseline SBA seropositive subjects.
Figure 9B:
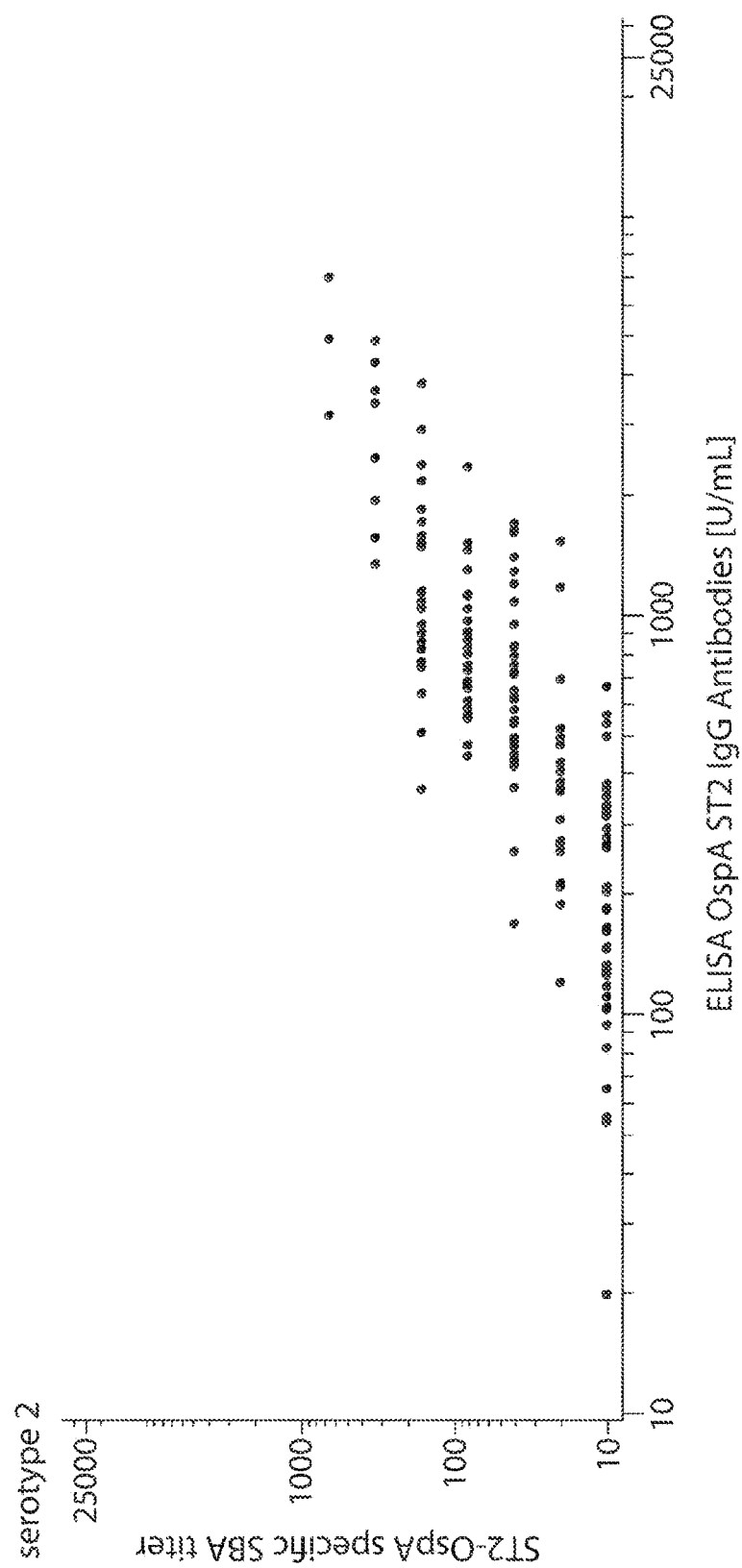
Figure 9C:
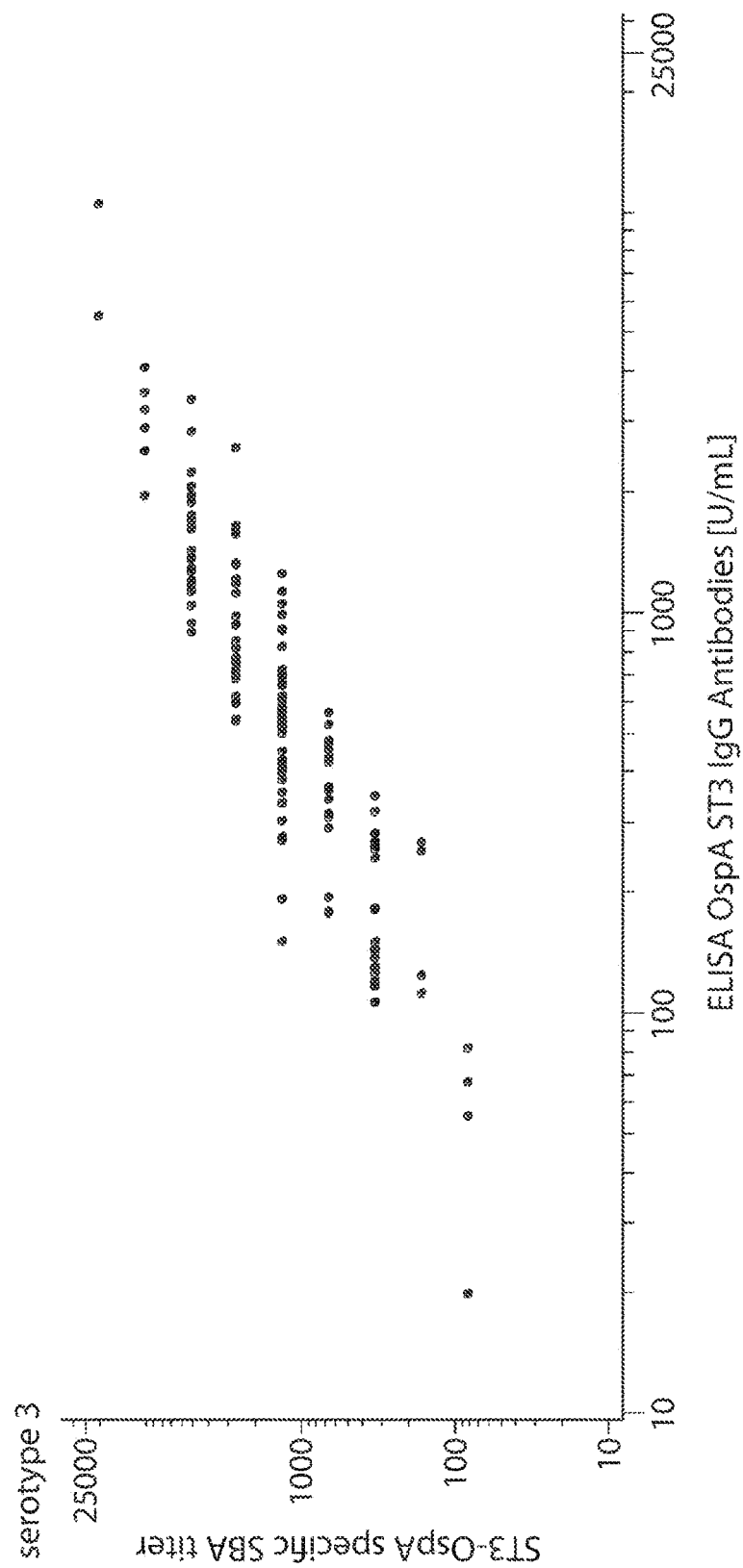
Figure 9D:
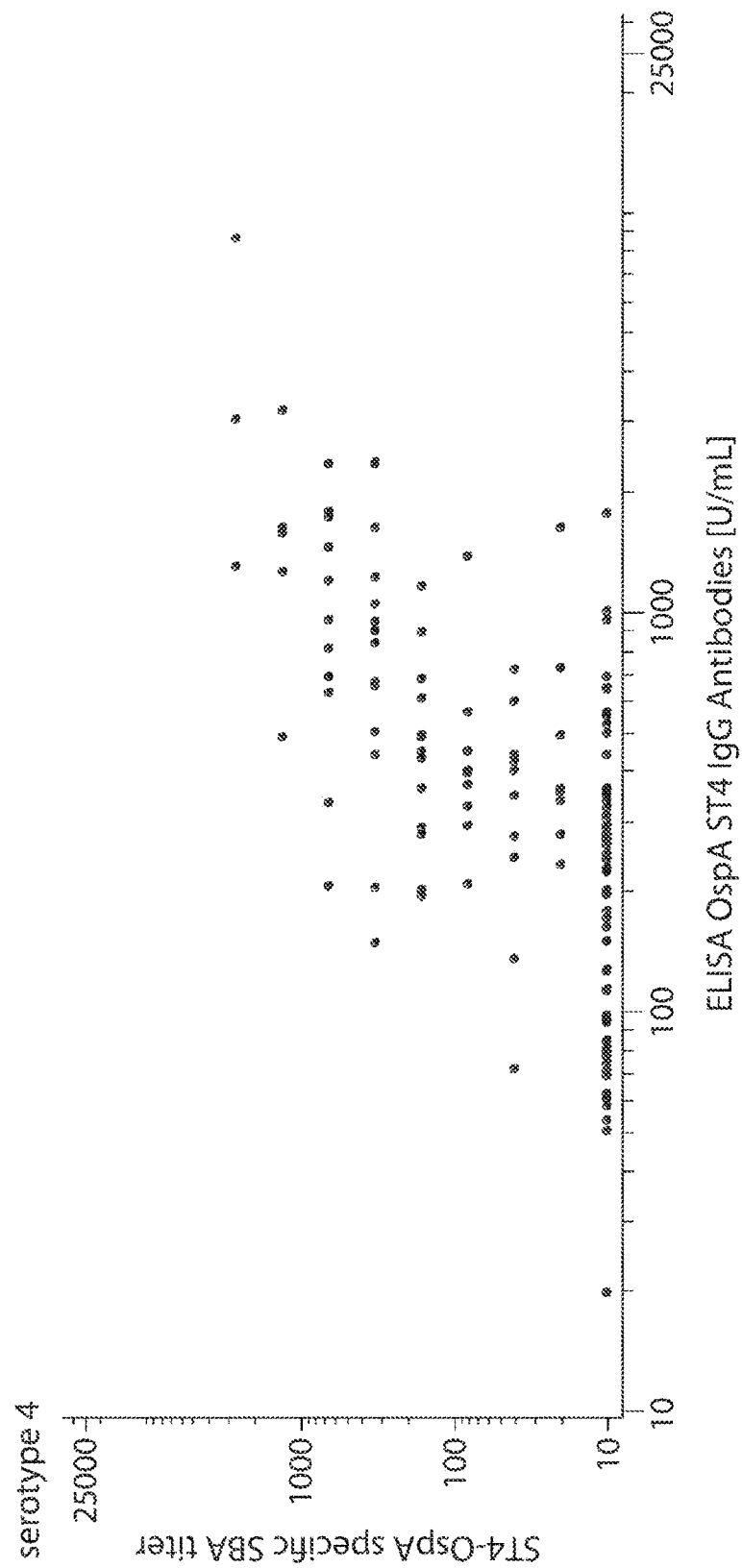
Figure 9E:
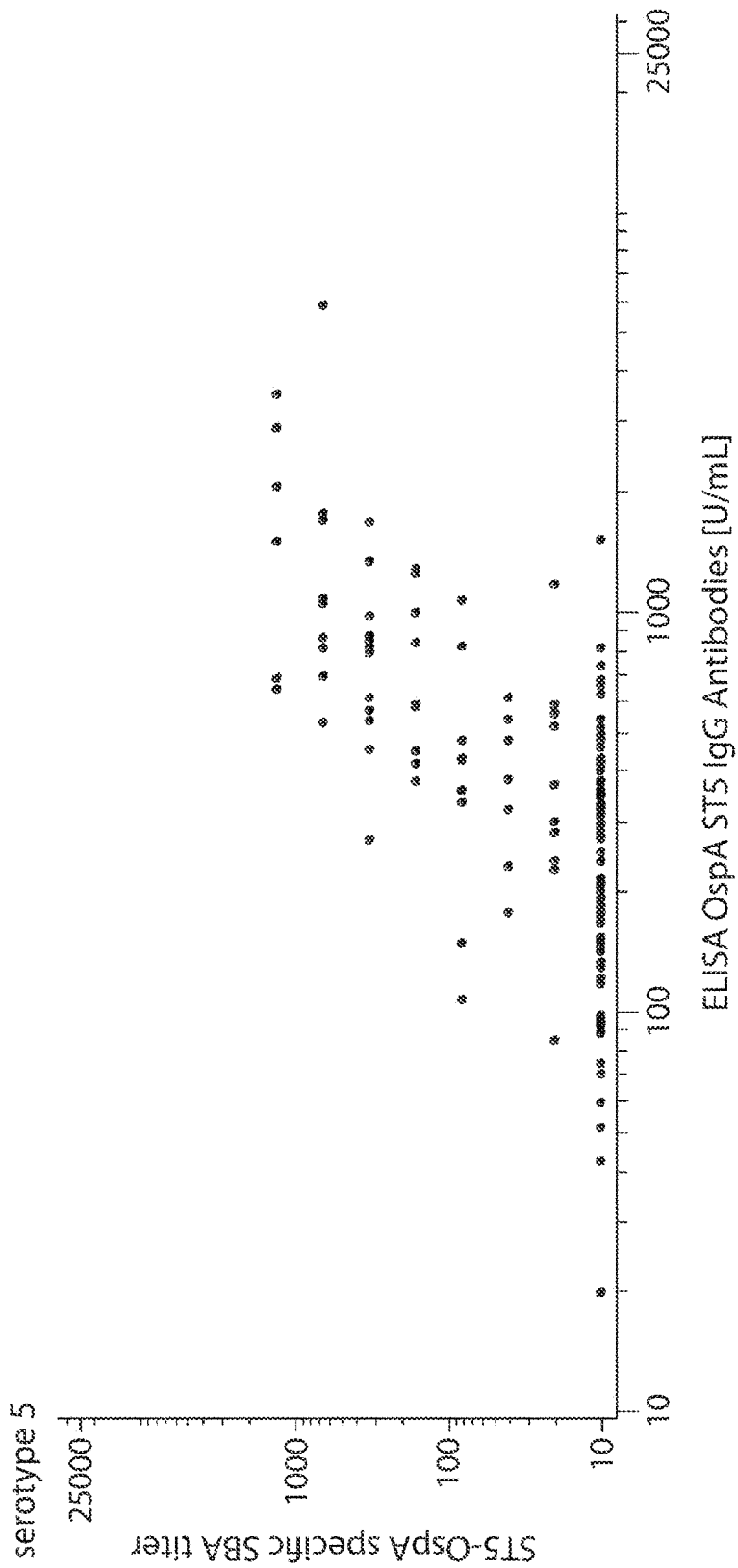
Figure 9F:
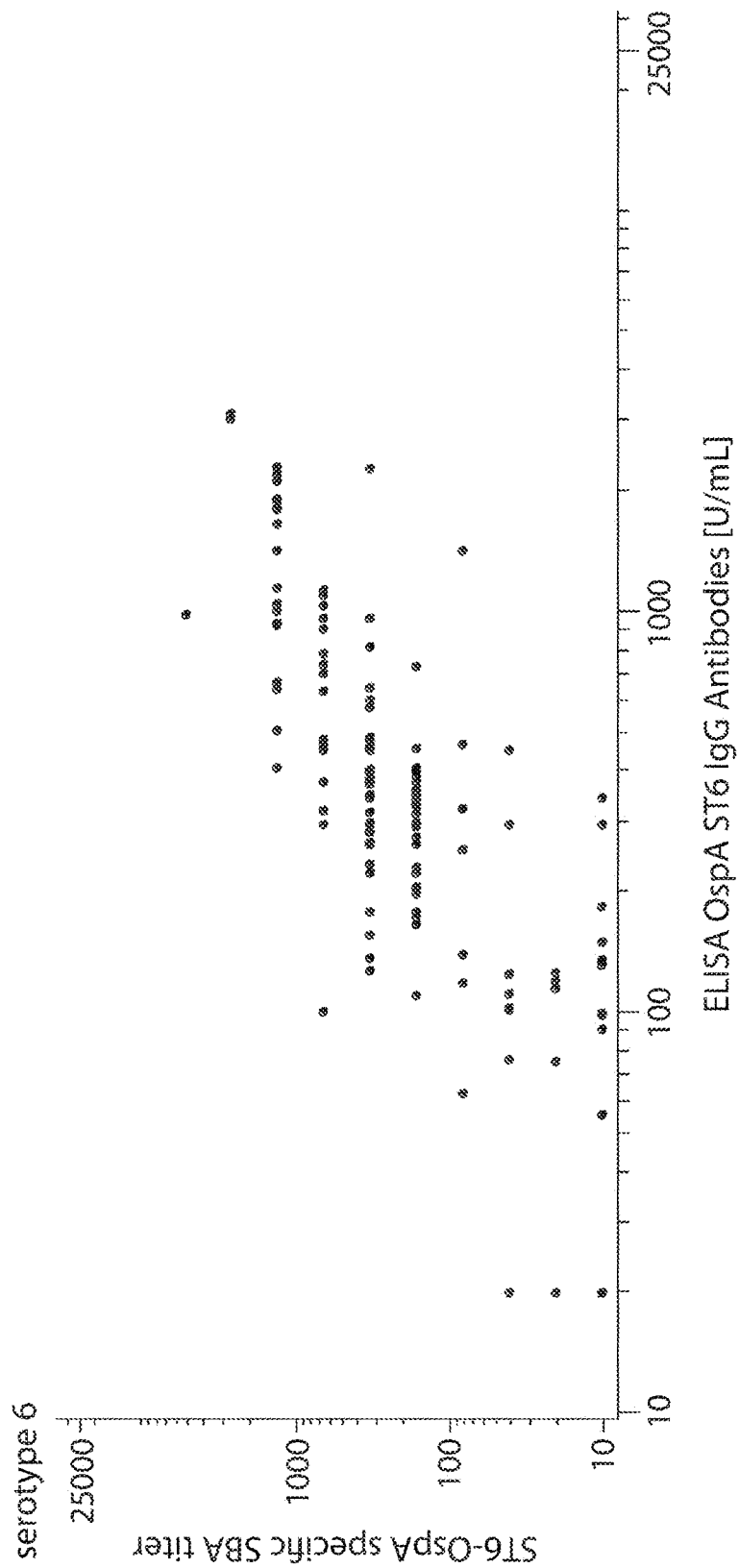

Example 3. Phase 2 Clinical Trial with Multivalent *Borrelia* Vaccine Investigating Higher Doses of the Vaccine and a Broader Immunization Schedule Overall, 246 healthy subjects aged 18 to 65 years were enrolled in this study, an observer-blinded, randomized, placebo controlled, multicenter phase 2 study investigating the same dose groups as tested in example 2 at an alternative, broader immunization schedule. Subjects received three I.M. immunizations of 135 µg or 180 µg of the multimeric *Borrelia* vaccine formulated w/alum (approx. 100 subjects each) or placebo (approx. 50 subjects) at Month 0, 2 and 6 (Days 1-57-180) (i.e. OspA fragment polypeptides (SEQ ID Nos: 1, 2 and 3) at a 1:1:1 weight ratio (e.g.—the low dose (135 µg) contained 45 µg each of the lipidated polypeptides defined by SEQ ID Nos: 1, 2 and 3, the high dose (180 µg) contained 60 µg each of the lipidated polypeptides defined by SEQ ID Nos: 1, 2 and 3). Subjects were enrolled in two age groups (18-49 years and 50-65 years) in a ratio of approx. 2:1. Also subjects who were baseline seronegative for *Borrelia burgdorferi* sensu lato (i.e., subjects that were previously not infected with *Borrelia*) as well as subjects who were baseline seropositive for *Borrelia burgdorferi* sensu lato (i.e., subjects that were previously infected with *Borrelia*) were enrolled in this study. The main objectives of the Phase 2 trial are to assess the immunogenicity and safety of the multimeric *Borrelia* vaccine in healthy adults aged 18-65 years with the higher dose levels as compared to the first-in-human trial and applying a broader immunization schedule as used in the examples above. Together with results obtained of example 2, data will be used to determine the optimal dose and schedule of the vaccine for late stage clinical development. The trial design is shown in FIG. 8.

Figure 10:
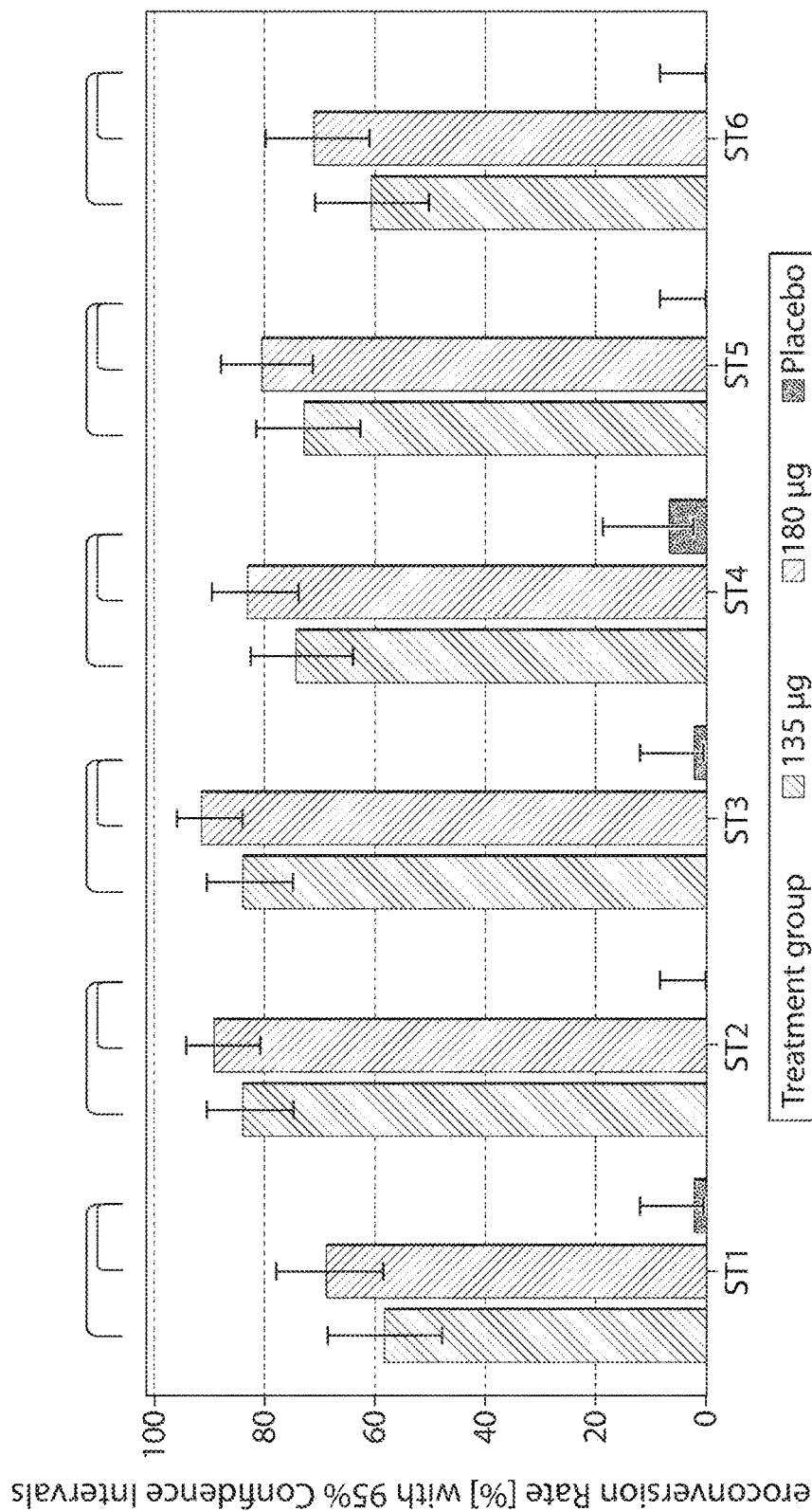
FIG. 10: Seroconversion Rates for OspA-specific IgG, per Serotype, D85, PP Population. Brackets Denote Significant Differences Between Groups. No significant differences observed between 135 µg and 180 µg treatment groups.

Sera are collected at Day 1, 29, 57, 85, 180, 208 (primary immunogenicity analysis), 365 and 545 and will be assessed for immunogenicity by ELISA and SBA (selected time points). At Day 85 (i.e. after the second vaccination), antibody levels (GMTs) in the 135 µg dose group ranged from 64.1 [ST1] to 166.4 [ST3] and in the 180 µg dose group ranged from 75.2 [ST1] to 217.7 [ST3]. Table 10 provides an overview of Geometric Mean Titers (GMTs) for the second Phase 2 study and Table 11, FIG. 10 provides an overview of seroconversion rate for the second Phase 2 study for Day 85. See also FIGS. 12-17.

Figure 18A:
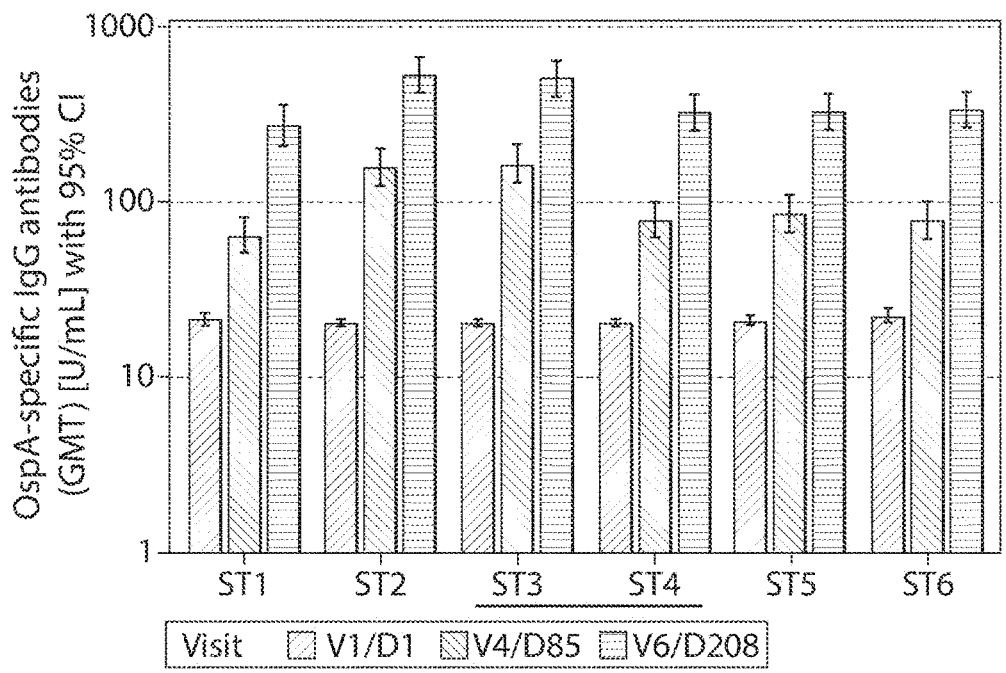
FIGS. 18A-18B: ELISA OspA-Specific IgG Antibodies (GMT) per Serotype over Time, PP Population.
Figure 18B:
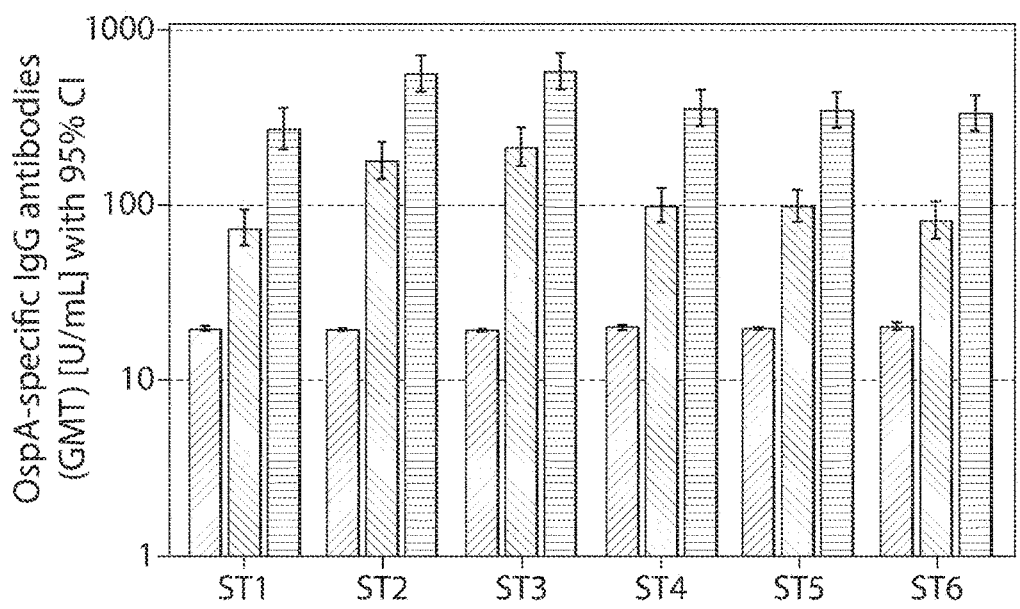

Overall, onset of immune response seems to be somewhat faster with the higher 180 µg dose, i.e. GMTs at Day 85 are higher with the 180 µg dose group compared with the 135 µg group. Refer to FIGS. 18A and 18B for comparison of GMTs between the 135 µg and the 180 µg treatment group and to Table 10 for GMT values at Day 85.

TABLE 10

Day 85 GMT second Phase 2 study (schedule Month 0-2-6), PP population

|  | 135 µg + Alum N = 84 [EU/mL] [95% CI] | 180 µg + Alum N = 86 [EU/mL] [95% CI] | Placebo N = 43 [EU/mL] [95% CI] | p-value (Overall) |
|---|---|---|---|---|
| ST1 | 64.1 [50.2, 81.7] | 75.2 [59.6, 94.9] | 21.7 [19.7, 23.8] | <.0001 |
| ST2 | 160.8 [125.4, 206.3] | 183.5 [144.9, 232.4] | 20.0 [20.0, 20.0] | <.0001 |
| ST3 | 166.4 [128.3, 215.9] | 217.7 [171.7, 275.9] | 20.7 [19.3, 22.2] | <.0001 |
| ST4 | 78.7 [62.5, 99.0] | 100.8 [81.2, 125.0] | 21.6 [20.0, 23.3] | <.0001 |
| ST5 | 86.8 [68.5, 110.0] | 100.2 [81.0, 124.1] | 20.0 [20.0, 20.0] | <.0001 |
| ST6 | 79.5 [62.4, 101.3] | 84.3 [67.4, 105.4] | 20.7 [19.3, 22.1] | <.0001 |

TABLE 11

Day 85 SCRs second Phase 2 study (schedule Month 0-2-6), PP population

|  | 135 µg + Alum N = 84 n/Nm (%) [95% CI] | 180 µg + Alum N = 86 n/Nm (%) [95% CI] | Placebo N = 43 n/Nm (%) [95% CI] | p-value (Overall) |
|---|---|---|---|---|
| ST1 | 48/82 (58.5) [47.7, 68.6] | 58/84 (69.0) [58.5, 77.9] | 1/43 (2.3) [0.4, 12.1] | <.0001 |
| ST2 | 69/82 (84.1) [74.7, 90.5] | 75/84 (89.3) [80.9, 94.3] | 0/43 (0.0) [0.0, 8.2] | <.0001 |
| ST3 | 69/82 (84.1) [74.7, 90.5] | 77/84 (91.7) [83.8, 95.9] | 1/43 (2.3) [0.4, 12.1] | <.0001 |
| ST4 | 61/82 (74.4) [64.0, 82.6] | 70/84 (83.3) [73.9, 89.8] | 3/43 (7.0) [2.4, 18.6] | <.0001 |
| ST5 | 60/82 (73.2) [62.7, 81.6] | 68/84 (81.0) [71.3, 87.9] | 0/43 (0.0) [0.0, 8.2] | <.0001 |
| ST6 | 50/82 (61.0) [50.2, 70.8] | 60/84 (71.4) [61.0, 80.0] | 0/43 (0.0) [0.0, 8.2] | <.0001 |
| ST1 to ST6 combined | 39/82 (47.6) [37.1, 58.2] | 54/84 (64.3) [53.6, 73.7] | 0/43 (0.0) [0.0, 8.2] | <.0001 |
| ST1 and ST2 combined | 48/82 (58.5) [47.7, 68.6] | 58/84 (69.0) [58.5, 77.9] | 0/43 (0.0) [0.0, 8.2] | <.0001 |

Initial data analysis including Day 208 (i.e. 1 month after the third vaccination) immunogenicity and safety data reveal that antibody titers further increased using a broader immunization schedule (schedule Month 0-2-6). Peak antibody levels (GMTs) at Day 208 in 5 the 135 µg dose group ranged from 276.4 [ST1] to 539.0 [ST2] and in the 180 µg dose group ranged from 274.7 [ST1] to 596.8 [ST3] (see Table 5), which is a 1.7 to 2.7-fold increase in titers compared with respective titers obtained with the same treatment groups using a vaccination schedule of Month 0-1-2 (see Table 6). In line with ELISA data, GMTs for SBA titers also increased by factor 1.4 to 3.1 using the Month 0-2-6 schedule, compared with the M 0-1-2 schedule (Table 14). Table 5 provides an overview of Geometric Mean Titers (GMTs) for the second Phase 2 study and to Table 6 for comparison of GMTs using different vaccination schedules.

TABLE 5

Day 208 GMT (ELISA), second Phase 2 study (schedule Month 0-2-6), PP population

|  | 135 µg | | | 180 µg | | |
|---|---|---|---|---|---|---|
|  | 18-49 years N = 55 [EU/mL] | 50-65 years N = 29 [EU/mL] | 18-65 years N = 84 [EU/mL] | 18-49 years N = 57 [EU/mL] | 50-65 years N = 29 [EU/mL] | 18-65 years N = 86 [EU/mL] |
| ST1 | 284.1 | 263.5 | 276.4 | 291.2 | 246.6 | 274.7 |
| ST2 | 551.9 | 517.2 | 539.0 | 581.3 | 577.0 | 579.8 |
| ST3 | 573.5 | 434.5 | 518.4 | 633.4 | 534.3 | 596.8 |
| ST4 | 365.2 | 275.6 | 329.7 | 393.3 | 324.8 | 367.8 |
| ST5 | 358.8 | 287.0 | 330.8 | 371.0 | 337.2 | 358.8 |
| ST6 | 362.4 | 300.3 | 338.4 | 337.5 | 361.4 | 345.7 |

As depicted in Table 5, the immunological response in older adults, one of the main target groups for a Lyme vaccine, is particularly encouraging. Also, results did not indicate that prior 5 exposure to Lyme (sero-positivity) has an impact on immunogenicity or safety (data not shown).

Functionality of antibodies has been demonstrated for all serotypes using a serum bactericidal assay (SBA-see Materials and Methods). GMTs at Day 208 are summarized in Table 8.

TABLE 6

Comparison of GMTs (ELISA) using different immunization schedules

| | Study 1 Schedule Month 0-1-2 Peak titers Day 85 | | Study 2 Schedule Month 0-2-6 Peak titers Day 208 | | Ratio GMT Study 2 (Day 208)/Study 1 (Day 85) | |
|---|---|---|---|---|---|---|
| | 135 µg 18-65 years N = 188 | 180 µg 18-65 years N = 189 | 135 µg 18-65 years N = 84 | 180 µg 18-65 years N = 86 | 135 µg | 180 µg |
| | [EU/mL] | [EU/mL] | [EU/mL] | [EU/mL] | | |
| ST1 | 101.1 | 115.8 | 276.4 | 274.7 | 2.7 | 2.4 |
| ST2 | 276.9 | 303.7 | 539.0 | 579.8 | 1.9 | 1.9 |
| ST3 | 282.2 | 308.6 | 518.4 | 596.8 | 1.8 | 1.9 |
| ST4 | 169.7 | 190.7 | 329.7 | 367.8 | 1.9 | 1.9 |
| ST5 | 174.6 | 199.6 | 330.8 | 358.8 | 1.9 | 1.8 |
| ST6 | 182.6 | 208.7 | 338.4 | 345.7 | 1.9 | 1.7 |

As in the first Phase 2 study older adults (age group 50-65 years) which are one of the high risk groups for acquiring Lyme disease have also shown an encouraging immune response, without statistical significant differences in GMTs between the two age groups (Table 5).

Figure 11:
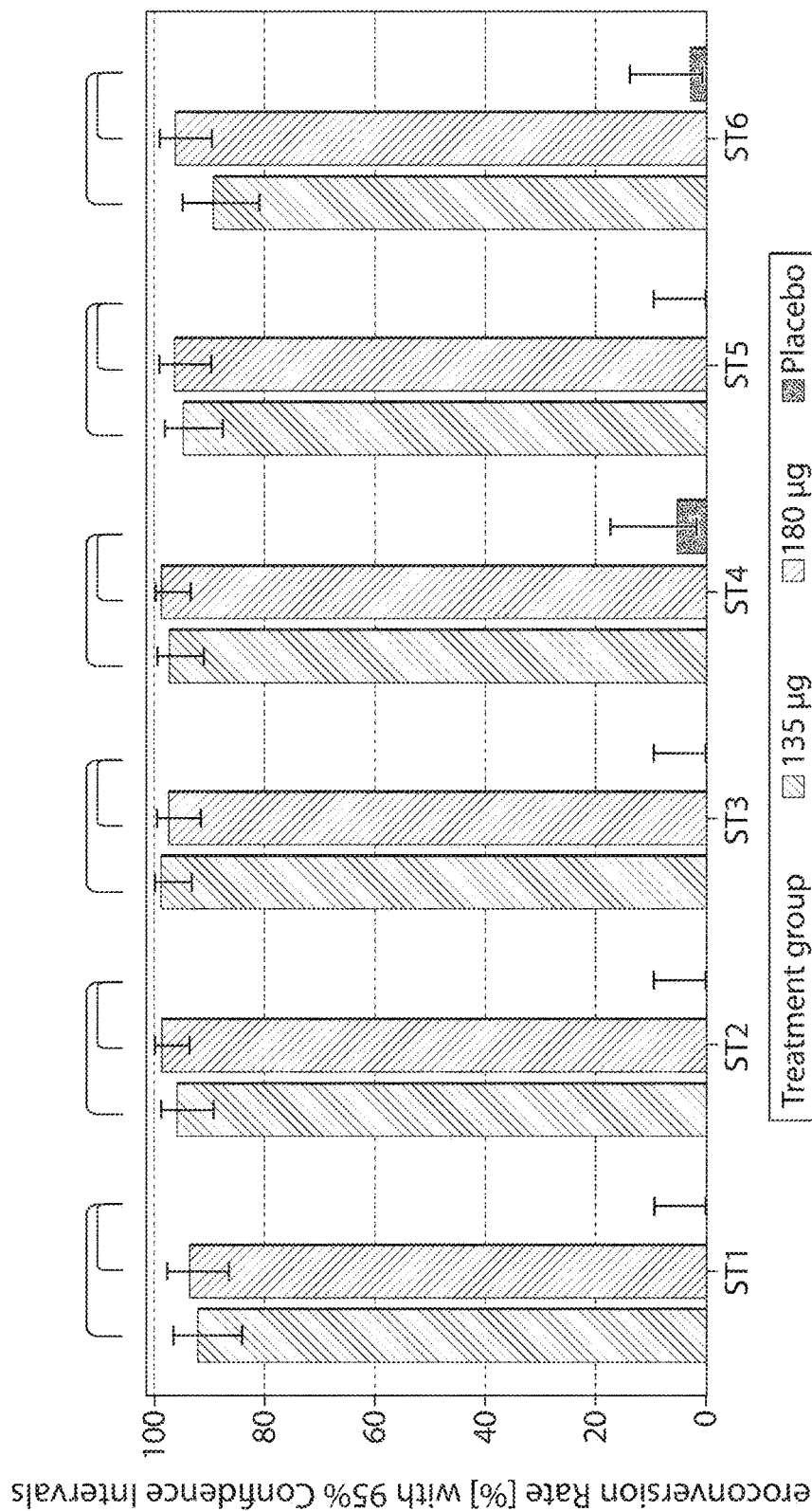
FIG. 11: Seroconversion Rates for OspA-specific IgG, per Serotype, D208, PP Population. Brackets Denote Significant Differences Between Groups. No significant differences observed between 135 µg and 180 µg treatment groups.
Figure 12:
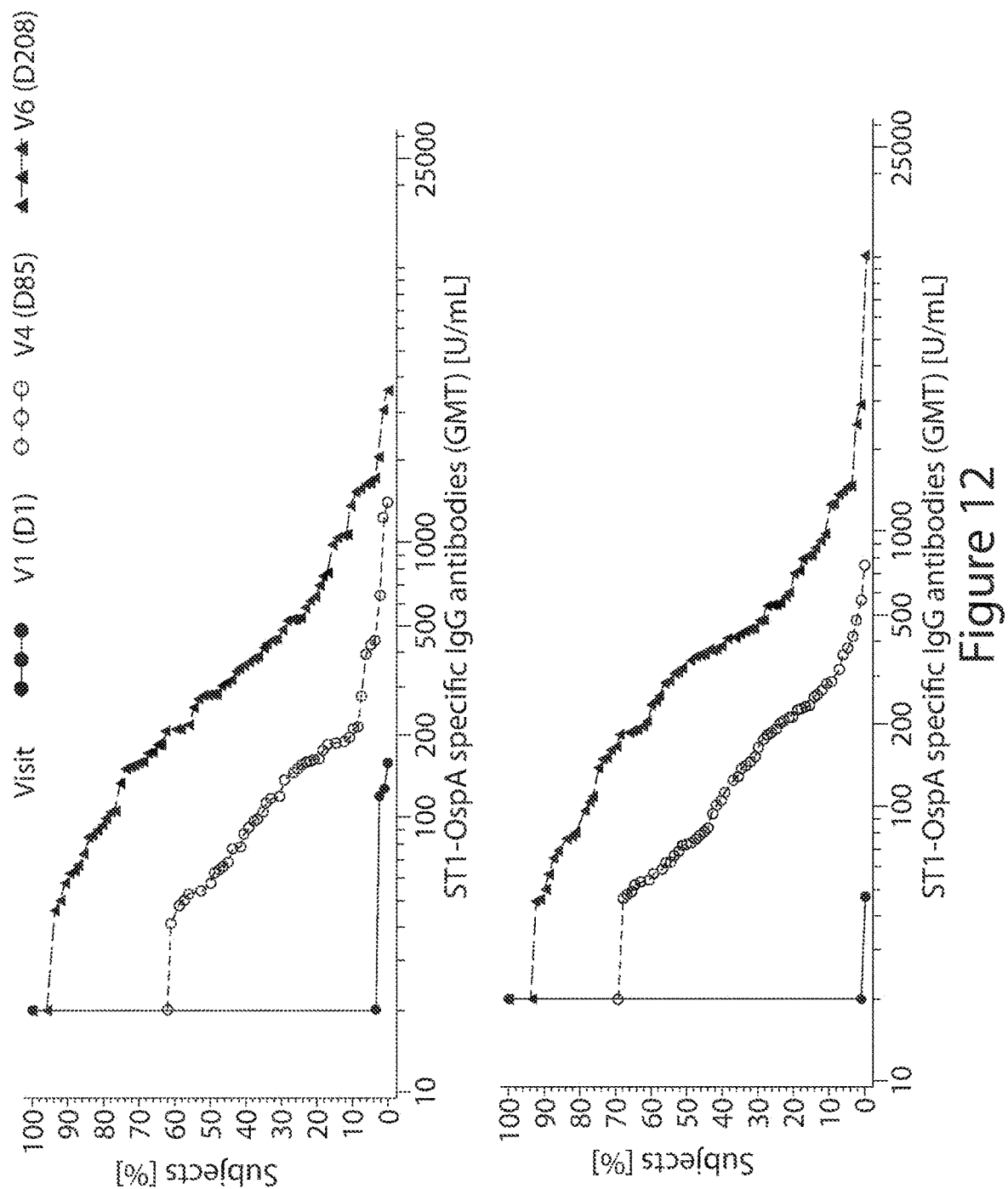
FIG. 12: Reverse Cumulative Distribution Curve for ELISA-ST1. Percentage of Subjects vs. OspA-specific IgG per time. Top panel: 135 µg treatment group. Bottom panel: 180 µg treatment group.
Figure 13:
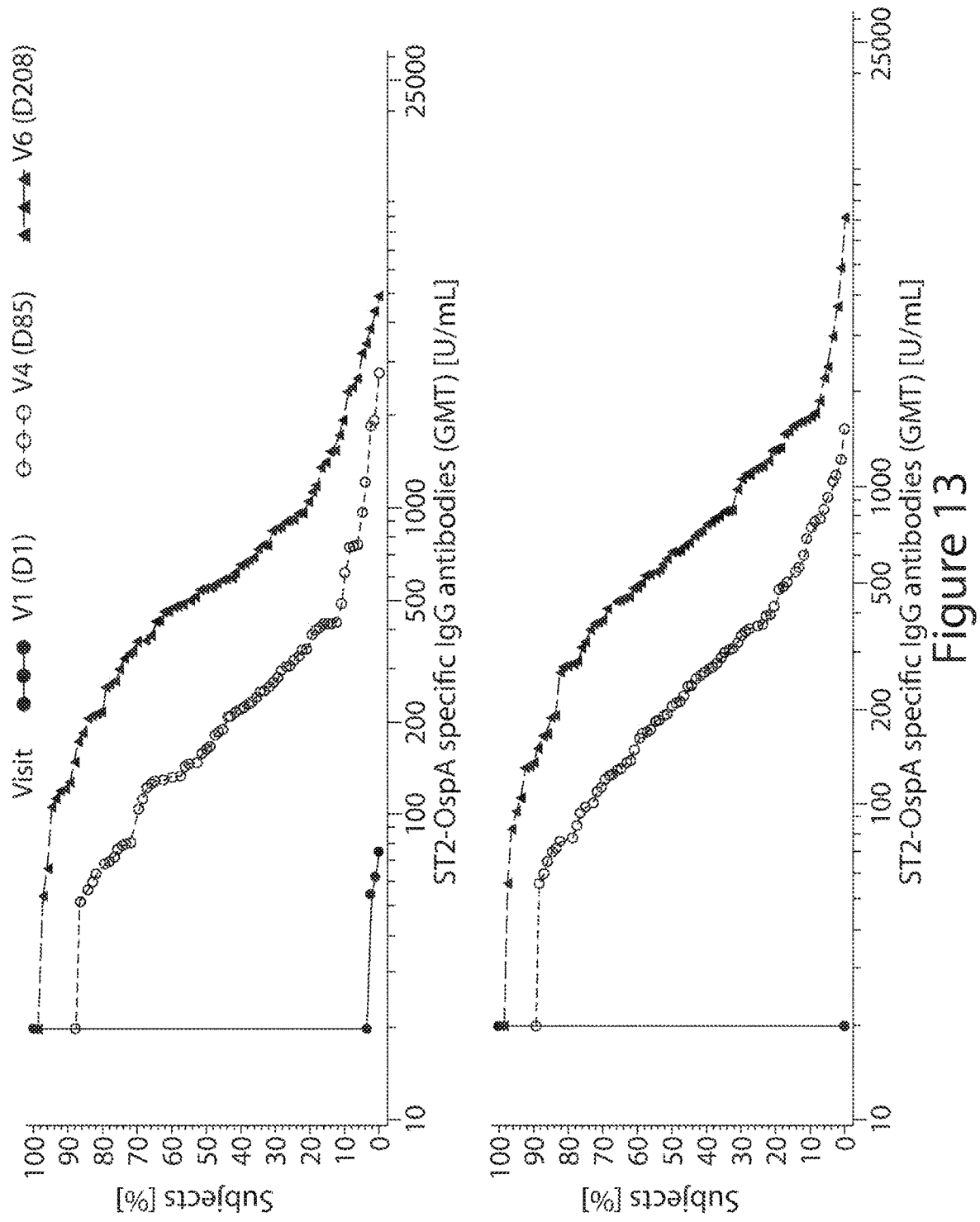
FIG. 13: Reverse Cumulative Distribution Curve for ELISA-ST2 Percentage of Subjects vs. OspA-specific IgG per time. Top panel: 135 µg treatment group. Bottom panel: 180 µg treatment group.
Figure 14:
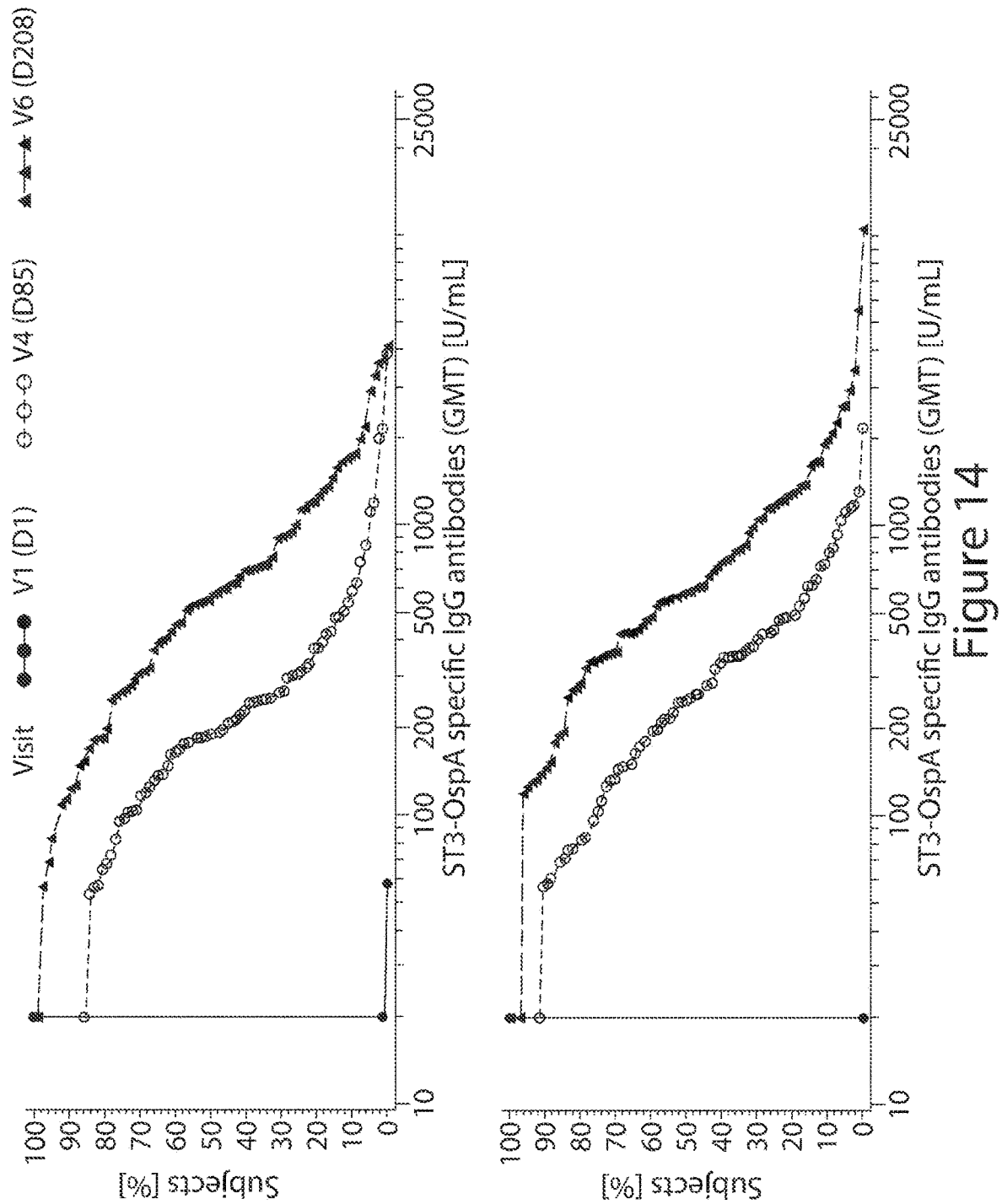
FIG. 14: Reverse Cumulative Distribution Curve for ELISA-ST3 Percentage of Subjects vs. OspA-specific IgG per time. Top panel: 135 µg treatment group. Bottom panel: 180 µg treatment group.
Figure 15:
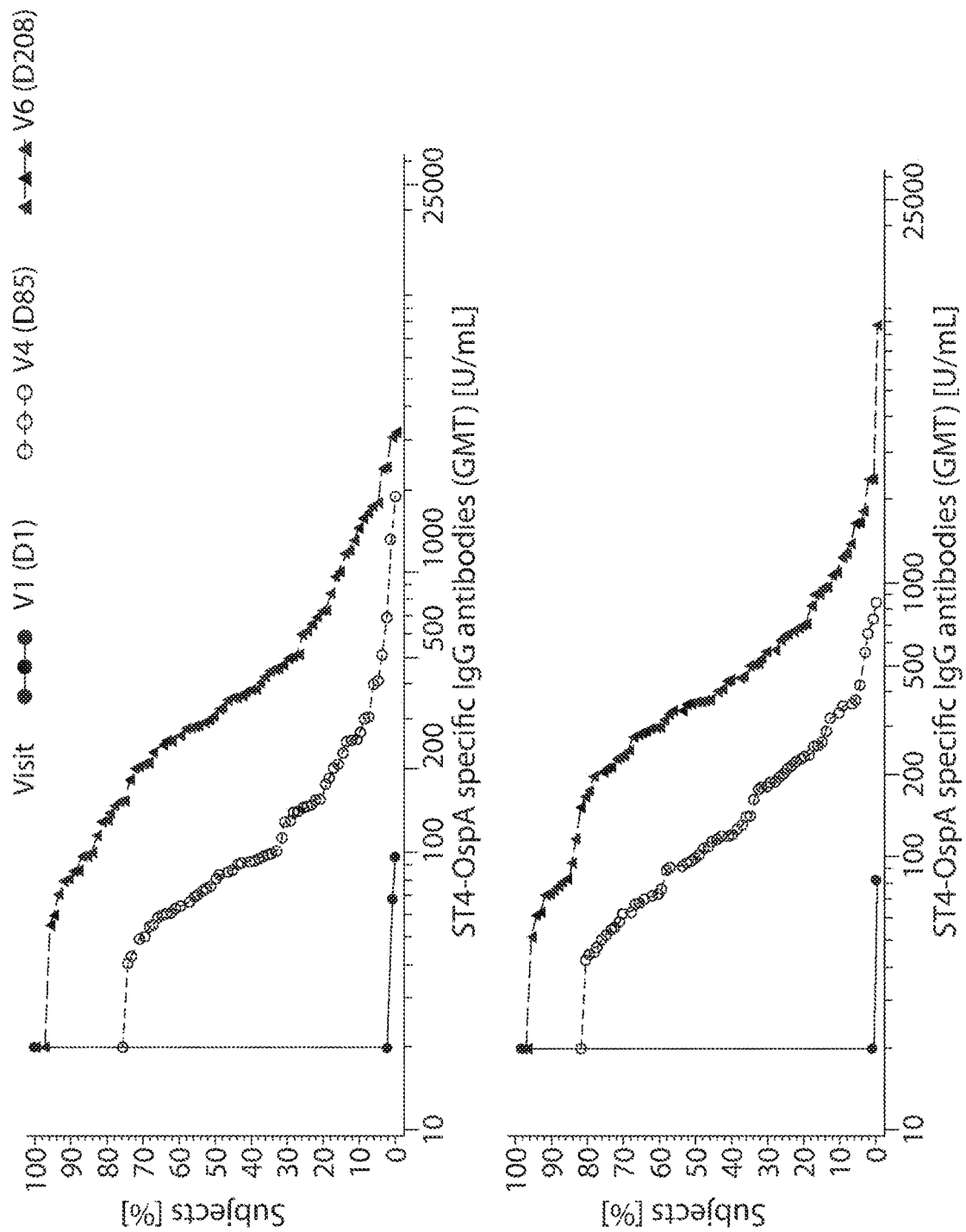
FIG. 15: Reverse Cumulative Distribution Curve for ELISA-ST4 Percentage of Subjects vs. OspA-specific IgG per time. Top panel: 135 µg treatment group. Bottom panel: 180 µg treatment group.
Figure 16:
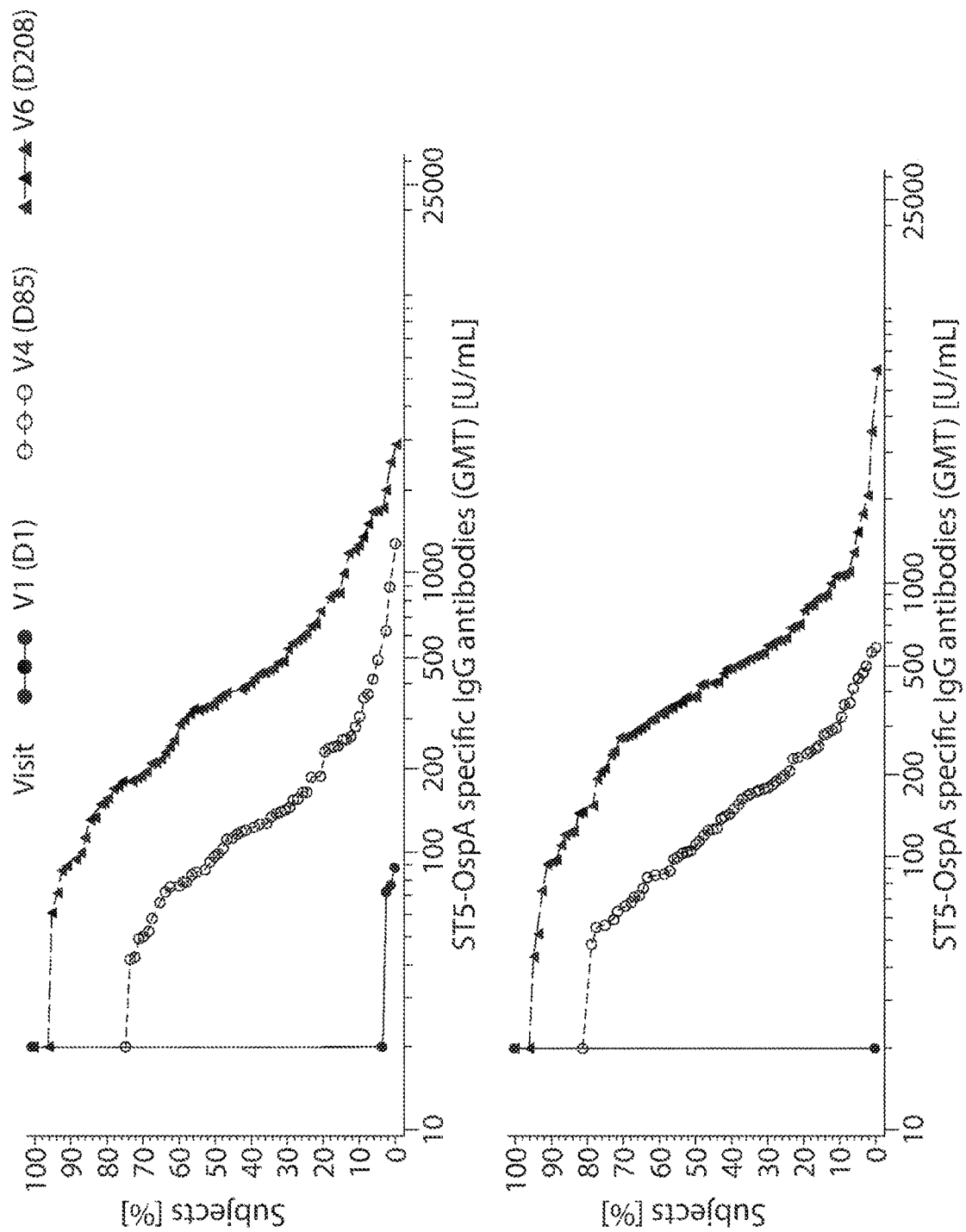
FIG. 16: Reverse Cumulative Distribution Curve for ELISA-ST5 Percentage of Subjects vs. OspA-specific IgG per time. Top panel: 135 µg treatment group. Bottom panel: 180 µg treatment group.
Figure 17:
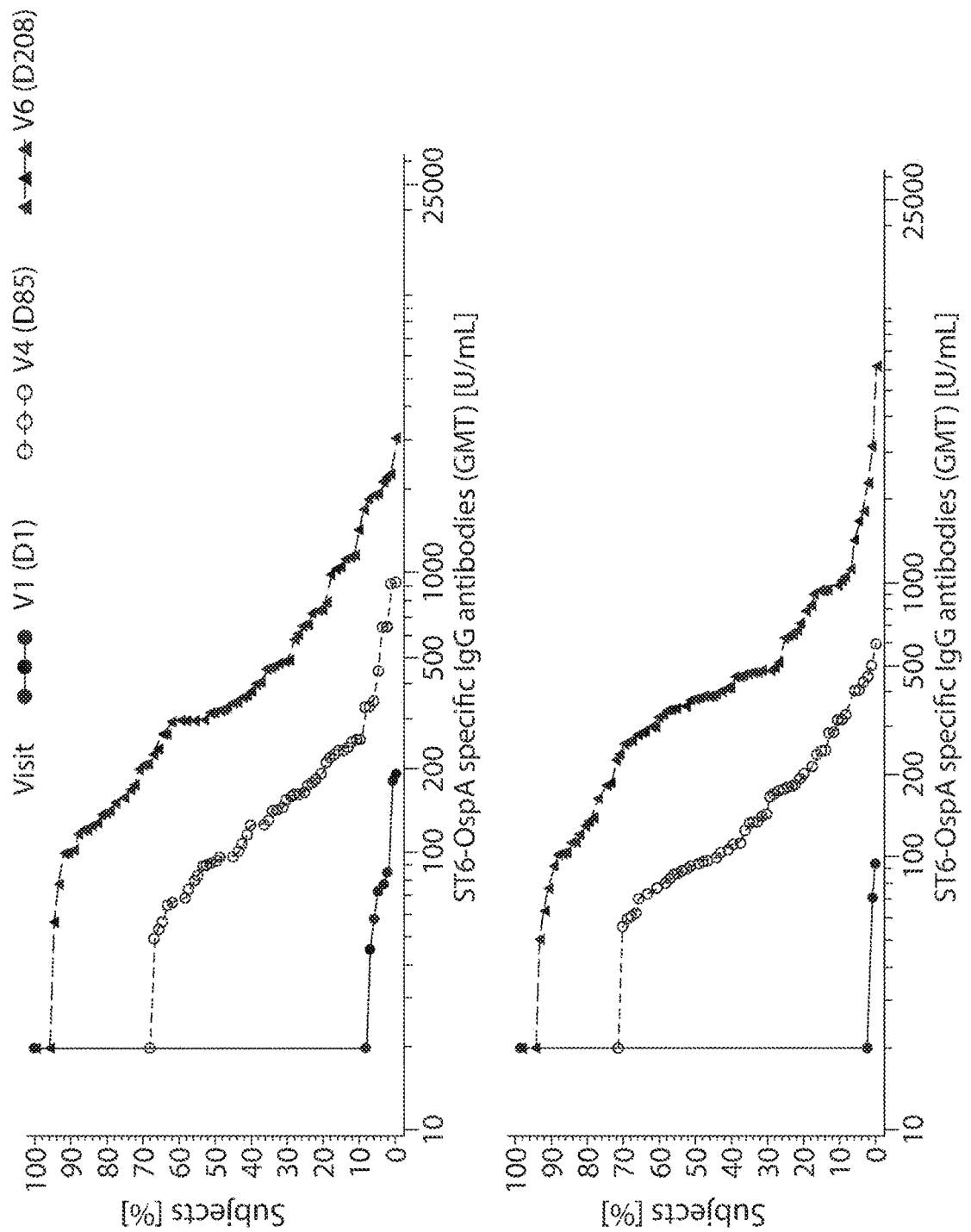
FIG. 17: Reverse Cumulative Distribution Curve for ELISA-ST6 Percentage of Subjects vs. OspA-specific IgG per time. Top panel: 135 µg treatment group. Bottom panel: 180 µg treatment group.

Seroconversion rates (SCRs) at Day 208 are depicted in Table 7 and FIG. 11. In the 135 µg dose, SCRs ranged from 89.6% (ST6) to 98.7 (ST3) and in the 180 µg group SCRs ranged from 93.8% (ST1) to 98.8% (ST2, ST4).

TABLE 7

Day 208 SCRs (ELISA) second Phase 2 study (schedule Month 0-2-6), PP population

| | 135 µg N = 84 (%) | 180 µg N = 86 (%) |
|---|---|---|
| ST1 | 92.2 | 93.8 |
| ST2 | 96.1 | 98.8 |
| ST3 | 98.7 | 97.5 |
| ST4 | 97.4 | 98.8 |
| ST5 | 94.8 | 96.3 |
| ST6 | 89.6 | 96.3 |

TABLE 8

GMTs for functional antibodies as measured by SBA on Day 208.

| | 135 µg N = 84 SBA Titer | 180 µg N = 86 SBA Titer |
|---|---|---|
| ST1 | 47.0 | 52.3 |
| ST2 | 45.8 | 38.0 |
| ST3 | 1200.8 | 1408.0 |
| ST4 | 44.6 | 51.4 |
| ST5 | 31.4 | 36.8 |
| ST6 | 196.8 | 251.1 |

ELISA titer correlated significantly with respective SBA titer for each OspA serotype and individual subject sera, as shown in FIGS. 9A-9F. Spearman correlation coefficients ranged from 0.6487, p-value <0.0001, for serotype 4 to 0.9131, p-value <0.0001, for serotype 3.

TABLE 14

Comparison of GMTs (SBA) using different immunization schedules

| | Study 1 Schedule Month 0-1-2 Titers Day 85 | | Study 2 Schedule Month 0-2-6 Titers Day 208 | | Ratio GMT Study 2 (Day 208)/Study 1 (Day 85) | |
|---|---|---|---|---|---|---|
| | 135 µg 18-65 years N = 188 | 180 µg 18-65 years N = 189 | 135 µg 18-65 years N = 84 | 180 µg 18-65 years N = 86 | 135 µg | 180 µg |
| | [EU/mL] | [EU/mL] | [EU/mL] | [EU/mL] | | |
| ST1 | 17.5 | 21.4 | 47.0 | 52.3 | 2.7 | 2.4 |
| ST2 | 14.9 | 17.6 | 45.8 | 38.0 | 3.1 | 2.2 |
| ST3 | 737.6 | 700.1 | 1200.8 | 1408.0 | 1.6 | 2.0 |
| ST4 | 21.9 | 25.8 | 44.6 | 51.4 | 2.0 | 2.0 |
| ST5 | 23.2 | 24.4 | 31.4 | 36.8 | 1.4 | 1.5 |
| ST6 | 100.2 | 152.4 | 196.8 | 251.1 | 2.0 | 1.6 |

The multimeric *Borrelia* vaccine ("MBV") was generally safe across all dose and age groups tested. No related Serious Adverse Events (SAEs) were observed in this or any study. Reactogenicity decreased after the first vaccination. Overall, the tolerability profile including rates of fever was comparable to other lipidated recombinant vaccines or lipid-containing formulations. Table 9 provides a comparison of safety data between the Phase 2 studies with said vaccine as well as comparison to other lipidated recombinant vaccines or lipid-containing formulations.

Example 4: Phase 2 Clinical Trial with Multivalent *Borrelia* Vaccine Investigating Three-Dose or Two-Dose Primary Immunization Schedule of the Vaccine, and Booster Dose, in a Study Population Aged 5 to 65 Years This study is a randomized, observer-blind, placebo-controlled, multicenter Phase 2 study in healthy subjects aged 5 to 65 years. The study is conducted in two study parts (Part A: Main Study Phase, Part B: Booster Phase). The study is initiated with an age-descending enrollment of sentinel cohorts. Subject enrollment into Part A starts with the adult cohort that allows the generation and review of appropriate safety data before pediatric cohorts are initiated.

TABLE 9

Comparison of solicited local and systemic Adverse Events with other lipidated recombinant vaccines or lipid-containing formulations.

|  | MBV (schedule M 0-1-2) 18-65 years 135 µg N = 214 % of subjects | MBV (schedule M 0-2-6) 18-65 years 135 µg N = 97 % of subjects | MBV (schedule M 0-1-2) 18-65 years 180 µg N = 205 % of subjects | MBV (schedule M 0-2-6) 18-65 years 180 µg N = 98 % of subjects | Trumenba[1] (schedule M 0-2-6) 18-25 years N = 1823-2425 % of subjects | Bexsero[2] (schedule M 0-2) 10-25 years N = 110-114 % of subjects | Lymerix[3] (schedule M 0-1-12) 15-70 years N = 402 % of subjects |
|---|---|---|---|---|---|---|---|
| Pain | | | | | | | |
| after 1st vacc. | 76.0 | 78.4 | 81.8 | 73.2 | 84.2 | 90 | 82 |
| after 2nd vacc. | 66.3 | 72.8 | 74.2 | 68.1 | 79.3 | 83 | 76 |
| after 3rd vacc. | 60.5 | 67.4 | 63.8 | 71.1 | 80.4 | not applicable | 83 |
| Redness | | | | | | | |
| after 1st vacc. | 5.3[4] | 6.3[4] | 3.0[4] | 8.3[4] | 13.8[4] | 50 | 22 |
| after 2nd vacc. | 6.4 | 2.2 | 8.7 | 7.7 | 11.8 | 45 | 17 |
| after 3rd vacc. | 3.6 | 4.7 | 6.2 | 6.7 | 17.1 | n/a | 25 |
| Swelling | | | | | | | |
| after 1st vacc. | 6.8[4] | 5.2[4] | 7.4[4] | 8.3[4] | 15.5[4] | not reported | 14 |
| after 2nd vacc. | 7.3 | 1.1 | 9.6 | 8.6 | 14.0 | not reported | 11 |
| after 3rd vacc. | 4.0 | 3.5 | 5.2 | 4.5 | 16.6 | not applicable | 19 |
| Fever (varying def.) | | | | | | | |
| after 1st vacc. | 1.0 | 3.2 | 0.0 | 2.2 | 2.4 | 1 | 1.5 |
| after 2nd vacc. | 1.0 | 3.4 | 1.5 | 0.0 | 1.2 | 5 | 1.0 |
| after 3rd vacc. | 0.5 | 0.0 | 1.0 | 1.2 | 2.0 | n/a | 1.0 |
| Headache | | | | | | | |
| after 1st vacc. | 20.2 | 30.9 | 27.1 | 28.9 | 43.9 | 33 | 21 |
| after 2nd vacc. | 16.6 | 23.9 | 17.8 | 24.5 | 33.1 | 34 | 14 |
| after 3rd vacc. | 14.4 | 17.4 | 17.0 | 19.1 | 32.5 | n/a | 20 |
| Myalgia | | | | | | | |
| after 1st vacc. | 38.5 | 41.2 | 36.0 | 37.1 | 25.9 | 49 | n/a |
| after 2nd vacc. | 26.0 | 29.3 | 24.9 | 29.0 | 15.6 | 48 | n/a |
| after 3rd vacc. | 18.0 | 26.7 | 17.5 | 32.6 | 16.9 | n/a | n/a |
| Arthralgia | | | | | | | |
| after 1st vacc. | 10.1 | 11.5 | 7.9 | 8.3 | 19.6 | 13 | 12 |
| after 2nd vacc. | 9.8 | 13.0 | 7.1 | 10.6 | 15.1 | 16 | 11 |
| after 3rd vacc. | 8.5 | 8.1 | 8.2 | 11.2 | 12.6 | n/a | 13 |

[1]Trumenba Highlights of prescribing information September 2017,
[2]Bexsero Highlights of prescribing information October 2017,
[3]PI Lymerix (Rates of solicited AEs).
[4]"Any" is defined as the cumulative frequency of subjects who reported a reaction as "mild", "moderate", or "severe" within 7 days of vaccination. Mild (2.5-5.0 cm); moderate (>5.0-10.0 cm); severe (>10.0 cm).

In summary, clinical studies have shown that the multimeric *Borrelia* vaccine was generally safe across all doses and age groups tested. Immunogenicity was increased in Phase 2 using higher vaccine doses (135 µg, 180 µg) and an alternative immunization schedule (Month 0-2-6).

Figure 19:
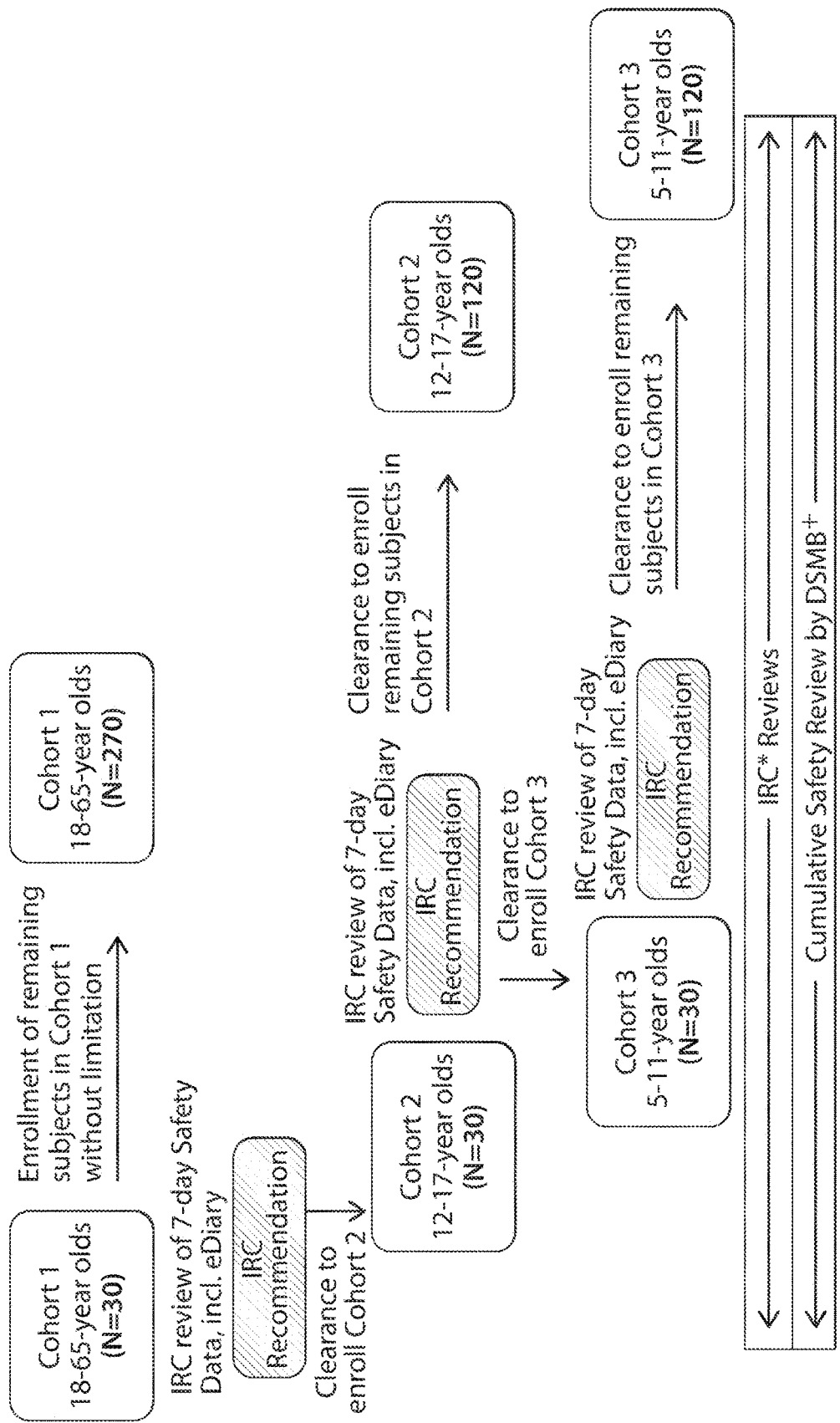
FIG. 19: Subject enrollment for Phase 2 clinical trial for the multivalent *Borrelia* vaccine investigating a three-dose or two-dose primary immunization schedule that is performed in an age-descending, staggered manner for three age cohorts.

Subject Enrollment into Part a (Main Study Phase):

Enrollment is performed in an age-descending, staggered manner for the three age cohorts (see FIG. 19).

Enrollment Cohort 1 (18-65 Years):

The enrollment starts with 30 sentinel adult subjects aged 18-65 years (Cohort 1). Subjects are randomized 1:1:1 into one of three study groups to receive a vaccination of the multimeric *Borrelia* vaccine ("MBV") adjuvanted with aluminium hydroxide (Groups 1 and 2) or placebo (Group 3). After these 30 sentinel subjects have received the first vaccination and have completed a 7-day post vaccination safety follow up visit (Visit 1A) including review of 7-day eDiary data, safety data is reviewed in an unblinded manner by an independent Internal Review Committee (IRC). Based on this data, the IRC makes a recommendation on whether enrollment of the adolescent age cohort (12-17 years, Cohort 2) can be initiated. Enrollment of the remaining 270 adult subjects of Cohort 1 continues without limitations during the IRC review.

Enrollment Cohort 2 (12-17 Years):

Upon IRC clearance, 30 sentinel adolescent subjects aged 12-17 years (Cohort 2) are enrolled. Subjects are randomized 1:1:1 into one of the three study groups to receive a vaccination of the multimeric *Borrelia* vaccine adjuvanted with aluminium hydroxide (Groups 1 and 2) or placebo (Group 3). Again, after these subjects have completed their safety follow up visit 7 days after the first vaccination (Visit 1A) including review of 7-day eDiary data, safety data is reviewed by the IRC. The IRC recommends whether enrollment of the youngest age cohort (5-11 years of age) can be initiated. In this age cohort, enrollment of the remaining 120 adolescent subjects is only initiated after IRC clearance.

Enrollment Cohort 3 (5-11 Years):

Upon IRC clearance, 30 sentinel subjects aged 5-11 years (Cohort 3) are enrolled. Subjects are randomized 1:1:1 into one of the three study groups to receive a vaccination of the multimeric *Borrelia* vaccine adjuvanted with aluminium hydroxide (Groups 1 and 2) or placebo (Group 3). Again, after these 30 subjects have completed their safety follow up visit 7 days after the first vaccination (Visit 1A) including review of 7-day eDiary data, safety data is reviewed by the IRC. Enrollment of the remaining 120 subjects in this age cohort is only be initiated after IRC clearance. An external independent Data Safety Monitoring Board (DSMB) reviews accruing safety data in an unblinded manner at regular intervals and might recommend adjusting, pausing or discontinuing the study at any time.

Subject Enrollment into Part B (Booster Phase):

Multimeric *Borrelia* Vaccine Booster (Group 1 or 2)

All eligible subjects (max. 200; see Table 15) within the study group (Group 1 or Group 2), who received all immunizations according to the primary immunization schedule that is selected for further development, continue in Part B, and receive an additional MBV vaccination at Month 18.

Placebo Booster (Group 1 or 2)

Approximately half of the subjects (i.e. max. 100, maintaining the 2:1:1 age stratification; see Table 15) within the study group (Group 1 or Group 2) who received all immunizations according to the alternative primary schedule (i.e., the schedule that is not selected for further development) and who are eligible for the Booster Phase, continue in Part B. For this purpose, the first 50 eligible adult subjects (age group 18-65 years), the first 25 eligible adolescent subjects (age group 12-17) and the first 25 eligible subjects (age group 5-11 years) are included in the booster phase as they present for their Visit 8/Month 18 visit. These subjects receive a placebo injection at Month 18. Remaining subjects from this study group are discontinued.

Placebo Booster (Group 3)

Approximately half of the subjects (i.e. max. 100, maintaining the 2:1:1 age stratification; see Table 15) within the placebo study group (Group 3), who received all injections according to schedule and who are eligible for the Booster Phase, continue in Part B. For this purpose, the first 50 eligible adult subjects (age group 18-65 years), the first 25 eligible adolescent subjects (age group 12-17) and the first 25 eligible subjects (age group 5-11 years) are included in the booster phase as they present for their Visit 8/Month 18 visit. These subjects receive an additional placebo injection at Month 18. Remaining subjects from this study group are discontinued. The study sponsor and study statisticians are unblinded at the time of the primary endpoint analysis, i.e. prior to subject enrollment into Part B. Through an electronic system the study site is notified once the number of registered eligible subjects is reached for Part B.

Study Design

Figure 20:
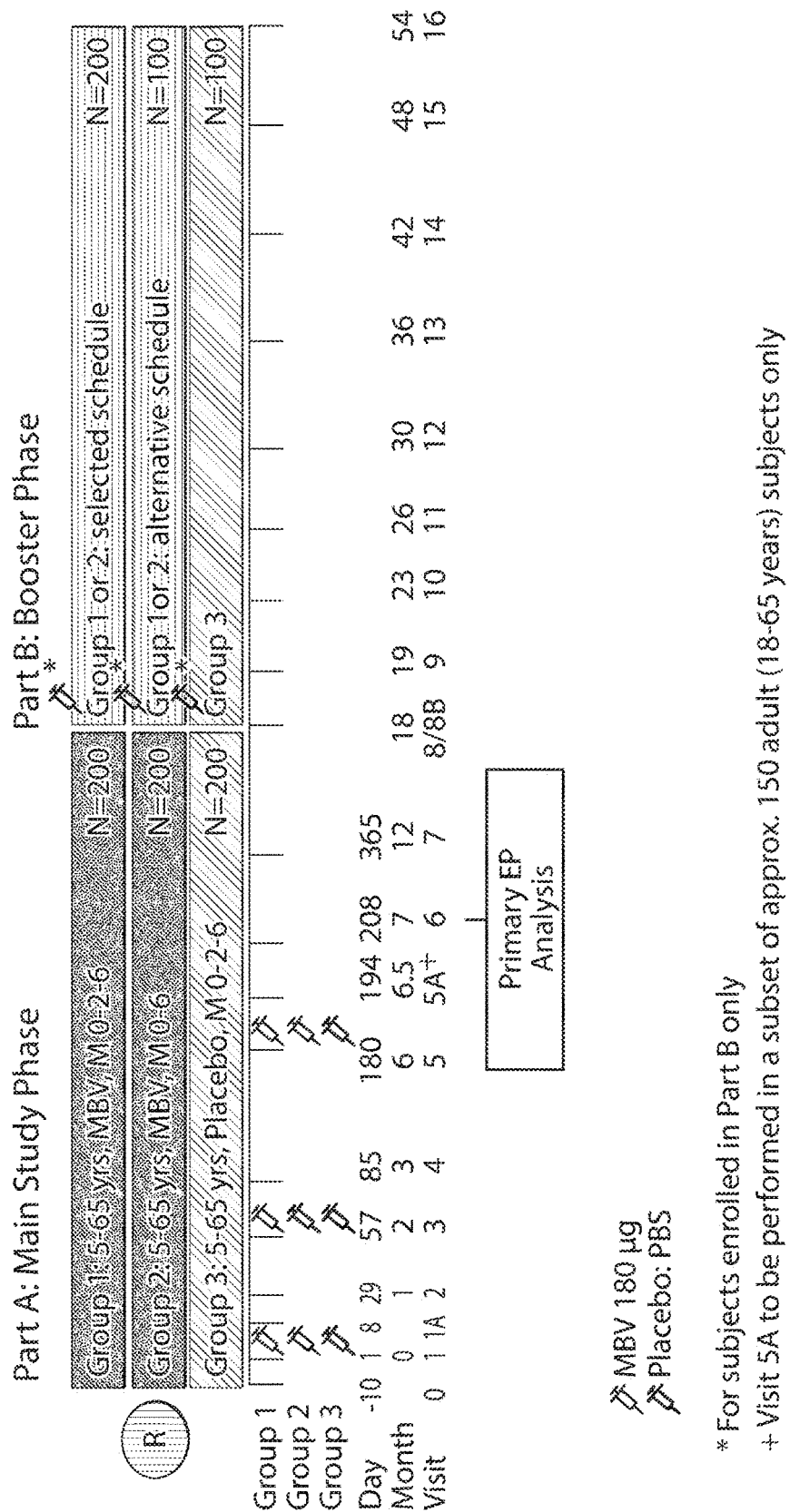
FIG. 20: Study design of Phase 2 clinical trial for the multivalent *Borrelia* vaccine investigating three-dose or two-dose primary immunization schedule of the vaccine, and booster dose, in a study population aged 5 to 65 years.

The study is conducted in two study parts (Part A: Main Study Phase, Part B: Booster Phase). Refer to FIG. 20 for the study design.

In Part A (Main Study Phase) a total of approximately 600 subjects aged 5 to 65 years is randomized 1:1:1 into three study groups: Group 1 (approximately 200 subjects) receive three vaccinations of the multimeric *Borrelia* vaccine adjuvanted with aluminium hydroxide at Month 0-2-6. Group 2 (approximately 200 subjects) receive two vaccinations of the multimeric *Borrelia* vaccine adjuvanted with aluminium hydroxide at Month 0-6 and a placebo injection at Month 2 in order to keep the blind. Group 3 (approximately 200 subjects) receive three placebo injections at Month 0-2-6. Within each study group subjects are enrolled 2:1:1 in three age cohorts (18-65 years, 12-17 years and 5-11 years).

In Part A, all subjects receive three I.M. injections of either MBV or placebo at Month 0-2-6 (i.e. Day 1-57-180). On Day 8/Visit 1A (i.e. 7 days after the first vaccination) a safety visit is performed (phone call for subjects aged 18-65, in-person visit for subjects aged 5-17 years). In-person visits are scheduled for all age cohorts one month after each vaccination. Blood samples for immunogenicity assessments are collected at the screening visit, Day 85, Day 180, Day 194 (in a subset of adult subjects), Day 208, Day 365/Month 12 and at Month 18.

Based on safety and immunogenicity data from Day 208/Visit 6 of Part A (i.e. 1 month after the third immunization), data is used to guide the decision for Part B booster.

In Part B (Booster Phase) eligible subjects from the Group that received selected primary schedule in Part A (either Group 1 or 2) receive a booster dose of the multimeric *Borrelia* vaccine adjuvanted with aluminium hydroxide at Month 18.

For safety comparison, placebo injections are administered to approximately 100 subjects, who were enrolled in the group that was vaccinated in Part A according to the alternative vaccination schedule, (i.e. either Group 1 or 2 which received vaccinations according to the primary immunization schedule that is not selected for further vaccine development), and to approximately 100 subjects of Group 3. It is targeted to maintain the 2:1:1 age stratification (18-65 years, 12-17 years and 5-11 years) in all study groups. All subjects involved in Part B are followed-up for further 3 years (i.e. up to Month 54) with study visits at Months 19, 23, 26, 30, 36, 42, 48 and 54.

Table 15 shows an overview of study groups and treatments. Treatments administered have an injection volume of 0.5 ml.

TABLE 15

Study Groups and Vaccinations

| | Study Group | Subjects | Age in years | Treatment | Vaccination Schedule |
|---|---|---|---|---|---|
| Part A: Main Study Phase | Group 1 | Total: 200<br>100<br>50<br>50 | <br>18-65<br>12-17<br>5-11 | MBV 180 μg | Month 0-2-6 |
| | Group 2 | Total: 200<br>100<br>50<br>50 | <br>18-65<br>12-17<br>5-11 | MBV 180 μg<br>Placebo | Month 0-6<br>Month 2* |
| | Group 3 | Total: 200<br>100<br>50<br>50 | <br>18-65<br>12-17<br>5-11 | Placebo | Month 0-2-6 |

TABLE 15-continued

Study Groups and Vaccinations

| | Study Group | Subjects | Age in years | Treatment | Vaccination Schedule |
|---|---|---|---|---|---|
| Part B: Booster Phase | Group 1 or 2: Selected Schedule | Total: 200<br>100<br>50<br>50 | <br>18-65<br>12-17<br>5-11 | MBV 180 μg | Month 18 |
| | Group 1 or 2: Alternative Schedule | Total: 100<br>50<br>25<br>25 | <br>18-65<br>12-17<br>5-11 | Placebo | Month 18 |
| | Group 3 | Total: 100<br>50<br>25<br>25 | <br>18-65<br>12-17<br>5-11 | Placebo | Month 18 |

*In order to keep the blind, subjects assigned to Group 2 will receive a placebo at Month 2.

The invention claimed is:

1. A method of eliciting an immune response in a human adult or human child against Lyme disease, comprising administering a composition comprising: (a) a first fusion protein comprising the amino acid sequence of SEQ ID NO: 1 (Lip-S1D1-S2D1), (b) a second fusion protein comprising the amino acid sequence of SEQ ID NO: 2 (Lip-S4D1-S3hybD1), and (c) a third fusion protein comprising the amino acid sequence of SEQ ID NO: 3 (Lip-S5D1-S6D1):
  (i) to a human adult or a human child at least two times or at least three times, wherein each dose of the composition comprises a total protein content of the three fusion proteins of 120 to 200 µg; or
  (ii) to a human child at least two times or at least three times, wherein each dose of the composition comprises a total protein content of the three fusion proteins of 60 to 100 µg,
  wherein the composition comprises the first, second, and third fusion proteins at a 1:1:1 weight ratio.

2. The method of claim 1, wherein the method comprises administering the composition at least three times, wherein:
  (i) each dose of the composition administered to a human adult comprises a total protein content of the three fusion proteins of 135 to 180 µg, or
  (ii) each dose of the composition administered to a human child comprises a total protein content of the three fusion proteins of 67.5 to 90 µg.

3. The method of claim 2, wherein:
  (i) each dose of the composition administered to a human adult comprises a total protein content of the three fusion proteins of 135 or 180 µg, or
  (ii) each dose of the composition administered to a human child comprises a total protein content of the three fusion proteins of 67.5 or 90 µg.

4. The method of claim 1, wherein the method comprises administering the composition at least three times, wherein the second administration is at least 6 weeks and at most 3 months after the first administration; and/or the third administration is at least 5 months and at most 7 months after the first administration.

5. The method of claim 4, wherein the second administration is at least 50 days to at most 70 days after the first administration; and/or the third administration is at least 170 days to at most 190 days after the first administration.

6. The method of claim 1, wherein the method comprises administering the composition at least three times, further comprising administering a fourth dose of the composition at least 15 months and at most 21 months after the first administration.

7. The method of claim 1, wherein the method comprises administering the composition at least two times, wherein:
  (i) each dose of the composition administered to a human adult comprises a total protein content of the three fusion proteins of 135 µg to 180 µg, or
  (ii) each dose of the composition administered to a human child comprises a total protein content of the three fusion proteins of 67.5 µg to 90 µg.

8. The method of claim 7, wherein
  (i) each dose of the composition administered to a human adult comprises a total protein content of the three fusion proteins of 135 µg or 180 µg, or
  (ii) each dose of the composition administered to a human child comprises a total protein content of the three fusion proteins of 67.5 µg or 90 µg.

9. The method of claim 1, wherein the method comprises administering the composition at least two times, wherein the second administration is at least 5 months to at most 7 months after the first administration.

10. The method of claim 9, wherein the second administration is at least 170 days to at most 190 days after the first administration.

11. The method of claim 1, wherein the method comprises administering the composition at least two times, further comprising administering a third dose of the composition at least 15 months and at most 21 months after the first administration.

12. The method of claim 1, wherein the first, second, and third fusion proteins represent at least 60%, at least 70%, or at least 80% of all proteins in the composition.

13. The method of claim 1, wherein the composition further comprises an adjuvant.

14. The method of claim 1, wherein the composition further comprises an aluminum adjuvant.

15. The method of claim 1, wherein the human adult is 18 years or older.

16. The method of claim 1, wherein the human child is 5-17 years old.

17. The method of claim 1, wherein the human child is a young child who is 0-4 years old.

18. The method of claim 1, wherein the composition is administered in a volume of 0.2 milliliter (mL) to 1.0 mL.

19. The method of claim 1, wherein the immune response elicited comprises an anti-OspA serotype 1, an anti-OspA serotype 2, an anti-OspA serotype 3, an anti-OspA serotype 4, anti-OspA serotype 5 and/or an anti-OspA serotype 6 antibody response with bactericidal activity.

20. The method of claim 1, wherein the immune response elicited comprises antibodies against *Borrelia* OspA serotypes 1, 2, 3, 4, 5 and 6.

21. The method of claim 15, wherein the human adult is 18-65 years old, and/or an elderly subject who is 50 years or older.

22. The method of claim 16, wherein the human child is 12-17 years old or 5-11 years old.

23. The method of claim 17, wherein the human child is a young child who is 1-4 years old or 2-4 years old.

24. The method of claim 18, wherein the composition is administered in a volume of 0.2 mL, 0.25 mL, 0.3 mL, 0.4 mL, 0.5 mL, 0.6 mL, 0.7 mL, 0.8 mL, or 1.0 mL.

* * * * *

SEQUENCE LISTING

```
<160> NUMBER OF SEQ ID NOS: 8

<210> SEQ ID NO 1
<211> LENGTH: 320
<212> TYPE: PRT
<213> ORGANISM: Artificial Sequence
<220> FEATURE:
<223> OTHER INFORMATION: Synthetic
<220> FEATURE:
<221> NAME/KEY: LIPID
<222> LOCATION: (1)..(1)

<400> SEQUENCE: 1

Cys Ser Ser Phe Asn Glu Lys Gly Glu Val Ser Glu Lys Ile Ile Thr
1               5                   10                  15

Arg Ala Asp Gly Thr Arg Leu Glu Tyr Thr Gly Ile Lys Ser Asp Gly
                20                  25                  30

Ser Gly Lys Ala Lys Glu Val Leu Lys Asn Phe Thr Leu Glu Gly Lys
                35                  40                  45

Val Ala Asn Asp Lys Thr Thr Leu Val Val Lys Cys Gly Thr Val Thr
            50                  55                  60

Leu Ser Lys Asn Ile Ser Lys Ser Gly Glu Val Ser Val Glu Leu Asn
65                  70                  75                  80

Asp Thr Asp Ser Ser Ala Ala Thr Lys Lys Thr Ala Ala Trp Asn Ser
                85                  90                  95

Gly Thr Ser Thr Leu Thr Ile Thr Val Asn Ser Lys Lys Thr Lys Asp
                100                 105                 110

Leu Val Phe Thr Lys Glu Asn Thr Ile Thr Val Gln Gln Tyr Asp Ser
            115                 120                 125

Asn Gly Thr Lys Leu Glu Gly Ser Ala Val Glu Ile Thr Lys Leu Asp
        130                 135                 140

Glu Ile Cys Asn Ala Leu Lys Gly Thr Ser Asp Lys Asn Asn Gly Ser
145                 150                 155                 160

Gly Ser Lys Glu Lys Asn Lys Asp Gly Lys Tyr Ser Phe Asn Glu Lys
                165                 170                 175

Gly Glu Leu Ser Ala Lys Thr Met Thr Arg Glu Asn Gly Thr Lys Leu
            180                 185                 190

Glu Tyr Thr Glu Met Lys Ser Asp Gly Thr Gly Lys Ala Lys Glu Val
```

```
                195                 200                 205
Leu Lys Asn Phe Thr Leu Glu Gly Lys Val Ala Asn Asp Lys Val Thr
    210                 215                 220

Leu Glu Val Lys Cys Gly Thr Val Thr Leu Ser Lys Glu Ile Ala Lys
225                 230                 235                 240

Ser Gly Glu Val Thr Val Ala Leu Asn Asp Thr Asn Thr Thr Gln Ala
                245                 250                 255

Thr Lys Lys Thr Gly Ala Trp Asp Ser Lys Thr Ser Thr Leu Thr Ile
            260                 265                 270

Ser Val Asn Ser Lys Lys Thr Thr Gln Leu Val Phe Thr Lys Gln Asp
        275                 280                 285

Thr Ile Thr Val Gln Lys Tyr Asp Ser Ala Gly Thr Asn Leu Glu Gly
    290                 295                 300

Thr Ala Val Glu Ile Lys Thr Leu Asp Glu Leu Cys Asn Ala Leu Lys
305                 310                 315                 320
```

<210> SEQ ID NO 2
<211> LENGTH: 322
<212> TYPE: PRT
<213> ORGANISM: Artificial Sequence
<220> FEATURE:
<223> OTHER INFORMATION: Synthetic
<220> FEATURE:
<221> NAME/KEY: LIPID
<222> LOCATION: (1)..(1)

<400> SEQUENCE: 2

```
Cys Ser Ser Phe Asn Ala Lys Gly Glu Leu Ser Glu Lys Thr Ile Leu
1               5                   10                  15

Arg Ala Asn Gly Thr Arg Leu Glu Tyr Thr Glu Ile Lys Ser Asp Gly
            20                  25                  30

Thr Gly Lys Ala Lys Glu Val Leu Lys Asp Phe Ala Leu Glu Gly Thr
        35                  40                  45

Leu Ala Ala Asp Lys Thr Thr Leu Lys Val Thr Cys Gly Thr Val Val
    50                  55                  60

Leu Ser Lys His Ile Pro Asn Ser Gly Glu Ile Thr Val Glu Leu Asn
65                  70                  75                  80

Asp Ser Asn Ser Thr Gln Ala Thr Lys Lys Thr Gly Lys Trp Asp Ser
                85                  90                  95

Asn Thr Ser Thr Leu Thr Ile Ser Val Asn Ser Lys Lys Thr Lys Asn
            100                 105                 110

Ile Val Phe Thr Lys Glu Asp Thr Ile Thr Val Gln Lys Tyr Asp Ser
        115                 120                 125

Ala Gly Thr Asn Leu Glu Gly Asn Ala Val Glu Ile Lys Thr Leu Asp
    130                 135                 140

Glu Leu Cys Asn Ala Leu Lys Gly Thr Ser Asp Lys Asn Asn Gly Ser
145                 150                 155                 160

Gly Ser Lys Glu Lys Asn Lys Asp Gly Lys Tyr Ser Phe Asn Glu Lys
                165                 170                 175

Gly Glu Val Ser Glu Lys Ile Leu Thr Arg Ser Asn Gly Thr Thr Leu
            180                 185                 190

Glu Tyr Ser Gln Met Thr Asp Ala Glu Asn Ala Thr Lys Ala Val Glu
        195                 200                 205

Thr Leu Lys Asn Gly Ile Lys Leu Pro Gly Asn Leu Val Gly Gly Lys
    210                 215                 220

Thr Lys Leu Thr Val Thr Cys Gly Thr Val Thr Leu Ser Lys Asn Ile
```

```
225                 230                 235                 240

Ser Lys Ser Gly Glu Ile Thr Val Ala Leu Asn Asp Thr Glu Thr Thr
                245                 250                 255

Pro Ala Asp Lys Lys Thr Gly Glu Trp Lys Ser Asp Thr Ser Thr Leu
                260                 265                 270

Thr Ile Ser Lys Asn Ser Gln Lys Thr Lys Gln Leu Val Phe Thr Lys
                275                 280                 285

Glu Asn Thr Ile Thr Val Gln Asn Tyr Asn Arg Ala Gly Asn Ala Leu
                290                 295                 300

Glu Gly Ser Pro Ala Glu Ile Lys Asp Leu Ala Glu Leu Cys Ala Ala
305                 310                 315                 320

Leu Lys

<210> SEQ ID NO 3
<211> LENGTH: 321
<212> TYPE: PRT
<213> ORGANISM: Artificial Sequence
<220> FEATURE:
<223> OTHER INFORMATION: Synthetic
<220> FEATURE:
<221> NAME/KEY: LIPID
<222> LOCATION: (1)..(1)

<400> SEQUENCE: 3

Cys Ser Ser Phe Asn Glu Lys Gly Glu Ile Ser Glu Lys Thr Ile Val
1               5                   10                  15

Arg Ala Asn Gly Thr Arg Leu Glu Tyr Thr Asp Ile Lys Ser Asp Lys
                20                  25                  30

Thr Gly Lys Ala Lys Glu Val Leu Lys Asp Phe Thr Leu Glu Gly Thr
                35                  40                  45

Leu Ala Ala Asp Gly Lys Thr Thr Leu Lys Val Thr Cys Gly Thr Val
            50                  55                  60

Thr Leu Ser Lys Asn Ile Ser Lys Ser Gly Glu Ile Thr Val Ala Leu
65              70                  75                  80

Asp Asp Thr Asp Ser Ser Gly Asn Lys Lys Ser Gly Thr Trp Asp Ser
                85                  90                  95

Gly Thr Ser Thr Leu Thr Ile Ser Lys Asn Arg Thr Lys Thr Lys Gln
                100                 105                 110

Leu Val Phe Thr Lys Glu Asp Thr Ile Thr Val Gln Asn Tyr Asp Ser
                115                 120                 125

Ala Gly Thr Asn Leu Glu Gly Lys Ala Val Glu Ile Thr Thr Leu Lys
            130                 135                 140

Glu Leu Cys Asn Ala Leu Lys Gly Thr Ser Asp Lys Asn Asn Gly Ser
145                 150                 155                 160

Gly Ser Lys Glu Lys Asn Lys Asp Gly Lys Tyr Ser Phe Asn Gly Lys
                165                 170                 175

Gly Glu Thr Ser Glu Lys Thr Ile Val Arg Ala Asn Gly Thr Arg Leu
                180                 185                 190

Glu Tyr Thr Asp Ile Lys Ser Asp Gly Ser Gly Lys Ala Lys Glu Val
                195                 200                 205

Leu Lys Asp Phe Thr Leu Glu Gly Thr Leu Ala Ala Asp Gly Lys Thr
                210                 215                 220

Thr Leu Lys Val Thr Cys Gly Thr Val Val Leu Ser Lys Asn Ile Leu
225                 230                 235                 240

Lys Ser Gly Glu Ile Thr Ala Ala Leu Asp Asp Ser Asp Thr Thr Arg
                245                 250                 255
```

Ala Thr Lys Lys Thr Gly Lys Trp Asp Ser Lys Thr Ser Thr Leu Thr
                260                 265                 270

Ile Ser Val Asn Ser Gln Lys Thr Lys Asn Leu Val Phe Thr Lys Glu
            275                 280                 285

Asp Thr Ile Thr Val Gln Arg Tyr Asp Ser Ala Gly Thr Asn Leu Glu
        290                 295                 300

Gly Lys Ala Val Glu Ile Thr Thr Leu Lys Glu Leu Cys Asn Ala Leu
305                 310                 315                 320

Lys

<210> SEQ ID NO 4
<211> LENGTH: 1020
<212> TYPE: DNA
<213> ORGANISM: Artificial Sequence
<220> FEATURE:
<223> OTHER INFORMATION: Synthetic

<400> SEQUENCE: 4
atgaaagcta ctaaactggt actgggcgcg gtaatcctgg ttctactct gctggcaggt     60 tgctcaagct tcaacgaaaa gggcgaagtc agcgaaaaaa tcattacccg cgcagacggc    120
acccgcctgg aatacaccgg catcaaatcg gacggcagcg gcaaagcgaa agaagttctg    180
aaaaacttta ccctggaagg caaagtcgca atgataaaaa ccaccctggt ggtgaaatgc    240
ggcaccgtta cgctgagcaa aaacattagt aaatccggtg aagtctctgt ggaactgaat    300
gataccgaca gctctgcggc caccaagaaa accgcagctt ggaactcagg cacctcgacg    360
ctgaccatta cggttaatag caagaaaacc aaagatctgg tcttcacgaa agaaaacacc    420
atcacggtgc agcaatatga cagcaatggt accaaactgg aaggctccgc tgtggaaatc    480
acgaaactgg atgaaatctg taatgctctg aaaggtacta gtgacaaaaa caatggctct    540
ggtagcaaag agaaaaacaa agatggcaag tactcattca cgaaaaaggg cgaactgtcg    600
gcgaaaacga tgacgcgtga aacggcacc aaactggaat atacggaaat gaaaagcgat    660
ggcaccggta agcgaaaga agttctgaaa aactttaccc tggaaggcaa agtcgccaat    720
gacaaagtca ccctggaagt gaaatgcggc accgttacgc tgtcaaaaga aattgcaaaa    780
tcgggtgaag tgaccgttgc tctgaacgat acgaatacca cgcaagcgac caagaaaacc    840
ggcgcctggg acagcaaaac ctctacgctg accattagtt taatagcaa gaaaaccacg    900 cagctggtct tcaccaaaca agatacgatc accgtgcaga atacgacag tgcgggtacc    960 aacctggaag gcacggctgt tgaaatcaaa accctggacg aactgtgtaa cgccctgaaa   1020

<210> SEQ ID NO 5
<211> LENGTH: 1029
<212> TYPE: DNA
<213> ORGANISM: Artificial Sequence
<220> FEATURE:
<223> OTHER INFORMATION: Synthetic

<400> SEQUENCE: 5
atgaaagcta ctaaactggt actgggcgcg gtaatcctgg ttctactct gctggcaggt     60 tgctcaagct tcaatgctaa gggcgaactg agcgaaaaaa cgatcctgcg tgcgaatggc    120
acccgtctgg aatacaccga atcaaatcc gatggtacgg gcaaagcaaa ggaagtcctg    180
aaagattttg ctctggaagg tacccctggc gccgacaaaa ccacgctgaa ggtgacgtgc    240
ggcaccgtgg ttctgagcaa acatattccg aactctggtg aaatcaccgt tgaactgaac    300

| | |
|---|---|
| gatagcaatt ctacgcaggc aaccaaaaag acgggcaaat gggacagtaa tacctccacg | 360 |
| ctgaccattt cagtcaactc gaaaaagacc aaaaatattg tgttcacgaa ggaagatacg | 420 |
| atcaccgttc aaaaatatga ctccgcgggc accaacctgg aaggcaatgc cgtcgaaatc | 480 |
| aaaaccctgg atgaactgtg taacgccctg aagggtacta gtgacaaaaa caatggctct | 540 |
| ggtagcaaag agaaaaacaa agatggcaag tactcattca acgaaaaagg cgaagtgagc | 600 |
| gaaaaaattc tgacccgtag caatggcacc accctggaat atagccagat gaccgatgca | 660 |
| gaaaatgcaa ccaaagcagt tgaaaccctg aaaaacggta ttaaactgcc tggtaatctg | 720 |
| gttggtggta aaaccaaact gaccgttacc tgtggcaccg ttaccctgag caaaaacatt | 780 |
| agcaaaagcg gtgaaattac cgtggcactg aatgataccg aaaccacacc ggcagacaaa | 840 |
| aaaaccggtg aatggaaaag cgataccagc accctgacca ttagtaaaaa tagccagaaa | 900 |
| acaaaacagc tggtgtttac caaagaaaac accattaccg tgcagaatta taaccgtgca | 960 |
| ggtaatgcac tggaaggtag tccggcagaa attaaagatc tggcagaact gtgtgcagcc | 1020 |
| ctgaaataa | 1029 |

<210> SEQ ID NO 6
<211> LENGTH: 1023
<212> TYPE: DNA
<213> ORGANISM: Artificial Sequence
<220> FEATURE:
<223> OTHER INFORMATION: Synthetic

<400> SEQUENCE: 6

| | |
|---|---|
| atgaaagcta ctaaactggt actgggcgcg gtaatcctgg gttctactct gctggcaggt | 60 |
| tgctcaagct tcaacgaaaa gggcgaaatc tcagaaaaaa ccatcgtccg cgctaacggc | 120 |
| acccgcctgg aatacaccga catcaaatca gacaagaccg gtaaagcgaa ggaagttctg | 180 |
| aaagatttta cgctggaagg taccctggca gcagacggta aaaccacgct gaaggtgacc | 240 |
| tgcggtacct ttacgctgtc caaaaacatt agtaagtccg gcgaaatcac ggtcgccctg | 300 |
| gatgacaccg atagctctgg caacaaaaag agcggtacct gggattcagg cacctcgacg | 360 |
| ctgaccattt ctaaaaatcg tacgaaaacc aagcagctgg tcttcacgaa agaagatacg | 420 |
| atcaccgtgc aaaactatga cagcgcaggt accaatctgg aaggcaaagc tgtggaaatt | 480 |
| accacgctga agaactgtg taatgctctg aaaggtacta gtgacaaaaa caatggctct | 540 |
| ggtagcaaag agaaaaacaa agatggcaag tactcattca acggcaaagg tgaaacgagc | 600 |
| gaaaagacca tcgtgcgtgc gaacggtacc cgcctggaat atacggacat taaatcggac | 660 |
| ggcagcggca aagcaaagga agtcctgaaa gattttacgc tggaaggtac cctggcagca | 720 |
| gacggtaaaa ccacgctgaa ggtgacgtgc ggcaccgtgg ttctgtcaaa aacattctg | 780 |
| aagtcgggtg aaatcaccgc agctctggat gacagcgata ccacgcgtgc tacgaaaaag | 840 |
| accggtaaat gggatagcaa gacctctacg ctgaccatta gtgtcaactc ccagaaaacg | 900 |
| aagaatctgg tgttccaccaa agaagatacg atcaccgttc aacgctatga cagtgcgggc | 960 |
| accaacctgg aaggcaaagc cgttgaaatt accacgctga agaactgtg taatgctctg | 1020 |
| aaa | 1023 |

<210> SEQ ID NO 7
<211> LENGTH: 21
<212> TYPE: PRT
<213> ORGANISM: Artificial Sequence
<220> FEATURE:
<223> OTHER INFORMATION: Synthetic

```
<400> SEQUENCE: 7

Gly Thr Ser Asp Lys Asn Asn Gly Ser Gly Ser Lys Glu Lys Asn Lys
1               5                   10                  15

Asp Gly Lys Tyr Ser
            20

<210> SEQ ID NO 8
<211> LENGTH: 11
<212> TYPE: PRT
<213> ORGANISM: Artificial Sequence
<220> FEATURE:
<223> OTHER INFORMATION: Synthetic

<400> SEQUENCE: 8

Asn Phe Thr Leu Glu Gly Lys Val Ala Asn Asp
1               5                   10
```